United States Patent [19]

Hayashi et al.

[11] Patent Number: 5,553,303

[45] Date of Patent: Sep. 3, 1996

[54] DATA PROCESSING SYSTEM FOR DYNAMICALLY SWITCHING ACCESS CONTROL PROCESS AND FOR PERFORMING RECOVERY PROCESS

[75] Inventors: Katsumi Hayashi; Kazuhiko Saitou; Hiroshi Ohsato; Masaaki Mitani, all of Numazu; Tomohiro Hayashi; Takashi Obata, both of Mishima; Yutaka Sekine, Numazu; Mitsuhiro Ura, Suntou-gun; Takuji Ishii, Numazu, all of Japan

[73] Assignee: Fujitsu Limited, Japan

[21] Appl. No.: 360,033

[22] Filed: Dec. 20, 1994

Related U.S. Application Data

[62] Division of Ser. No. 745,233, Aug. 14, 1991, Pat. No. 5,408,652.

[30] Foreign Application Priority Data

Aug. 31, 1990  [JP]  Japan ................................. 2-231446
Aug. 31, 1990  [JP]  Japan ................................. 2-231452

[51] Int. Cl.⁶ .................................................. G06F 17/30
[52] U.S. Cl. ................ 395/600; 395/182.13; 364/266.5; 364/282.4; 364/DIG. 1
[58] Field of Search .......................... 395/600, 200.03, 395/182.11, 182.13, 183.07, 600, 650

[56] References Cited

U.S. PATENT DOCUMENTS

| | | | |
|---|---|---|---|
| 4,714,995 | 12/1987 | Materna et al. ........................ | 395/600 |
| 4,829,427 | 5/1989 | Green ..................................... | 395/600 |
| 5,058,000 | 10/1991 | Cox et al. .............................. | 395/200 |
| 5,091,852 | 2/1992 | Tsuchida et al. ...................... | 395/600 |
| 5,129,086 | 7/1992 | Coyle, Jr. et al. ..................... | 395/650 |
| 5,247,664 | 9/1993 | Thompson et al. .................... | 395/600 |
| 5,257,366 | 10/1993 | Adair et al. ............................ | 395/600 |
| 5,278,978 | 1/1994 | Demers et al. ........................ | 395/600 |
| 5,341,478 | 8/1994 | Travis et al. ........................... | 395/200 |

Primary Examiner—Thomas G. Black
Assistant Examiner—John C. Loomis
Attorney, Agent, or Firm—Staas & Halsey

[57] ABSTRACT

A database processing system using a multi-processor including a plurality of processor modules each having a local memory connected to an external shared memory. The database processing system includes a composite structure definition control part for defining an administrative processor module for controlling an access to a composite structure of a database which has a storage structure independent of a logical structure; and a maintenance/selection control part in an optimum control processor for providing a function of access-controlling a shared process and a local process when an access request arises for a database composite structure, and for dynamically switching the access control process for the composite structure according to the access frequency notified by each processor module. The system may further include an operation continuing control part for providing a controlling function for a recovery process for the composite structure of a database to be locally processed or shared-processed, and for performing a recovery process according to an access control process type for the composite structure of the database when the processor module falls in error, by replacing the erroneous processor module with another single processor module or a plurality of processor modules.

10 Claims, 59 Drawing Sheets

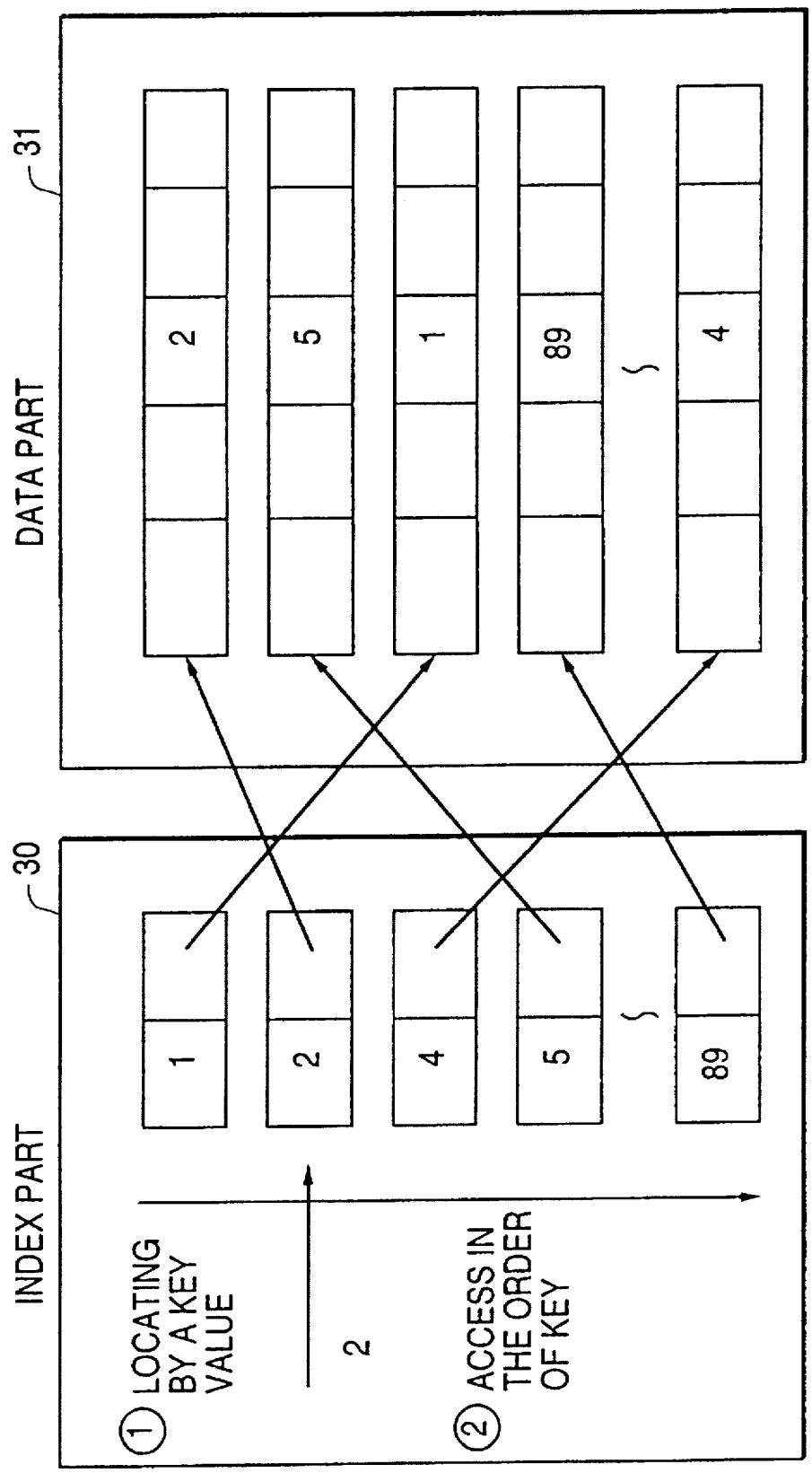

FIG. 9B

|  |  | STARTING KEY | ENCODING | STARTING KEY (HEXADECIMAL NOTATION) |
|---|---|---|---|---|
| RETRIEVAL RANGE 1 | ELEMENT 1 | -20 | → | 7FFFFFFC414220 |
|  | ELEMENT 2 | AB |  |  |
|  |  | ENDING KEY |  | ENDING KEY (HEXADECIMAL NOTATION) |
| RETRIEVAL RANGE 2 | ELEMENT 1 | 500 |  | 800001F4 1 2 3 |
|  | ELEMENT 2 | VWX |  |  |

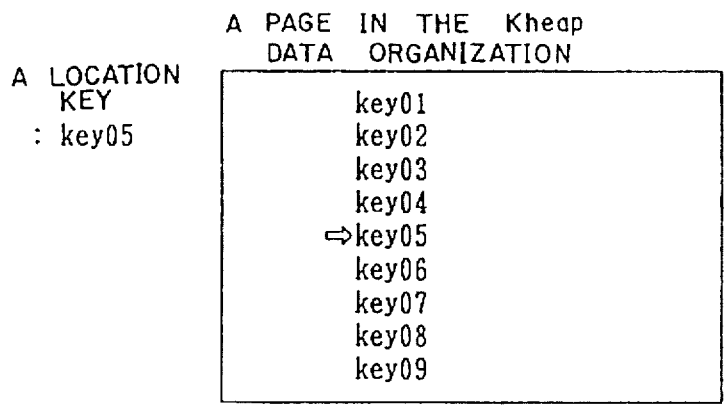
Fig. 9D
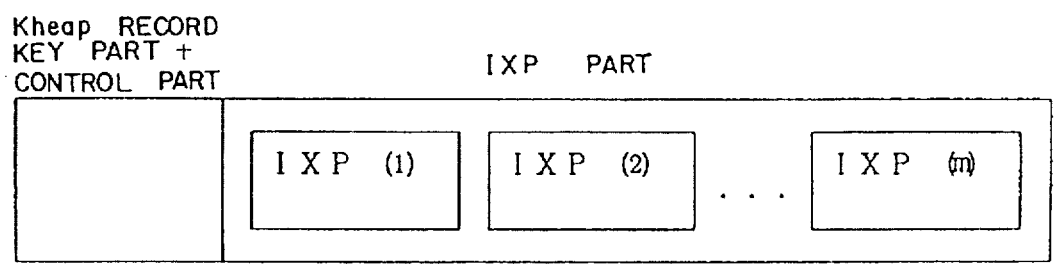
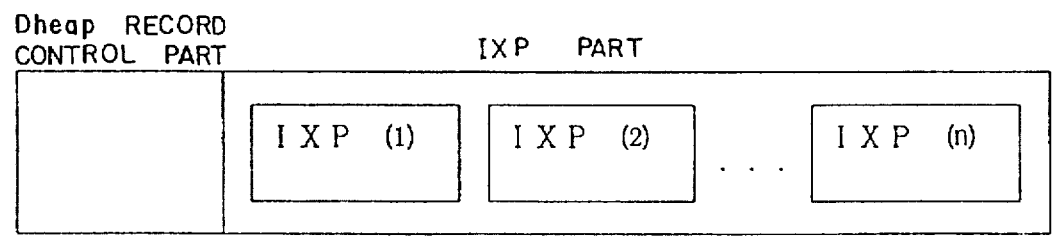
Fig. 9E

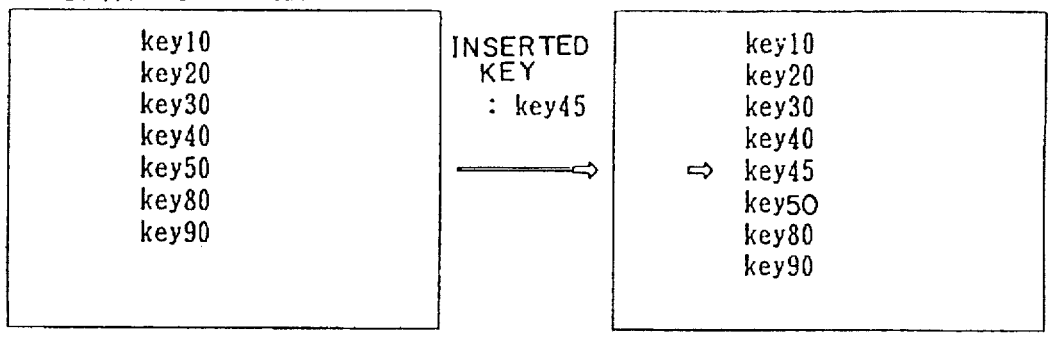
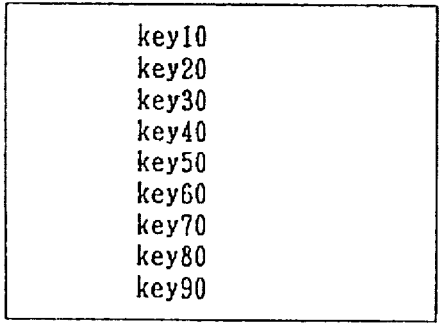
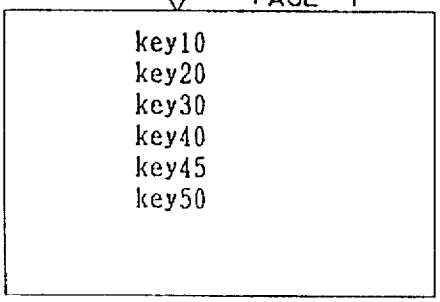 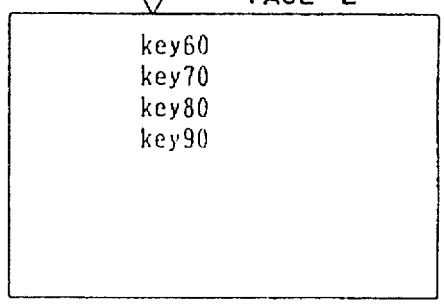
Fig. 11D
Fig. 11E

FIG. 20A
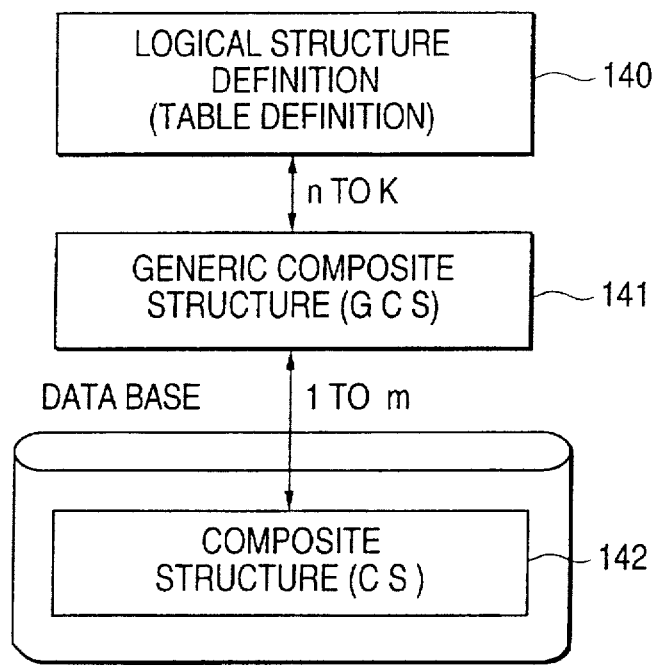
FIG. 20B(a)
SIMPLE MAPPING
FIG. 20B(b)
COMPOUND MAPPING
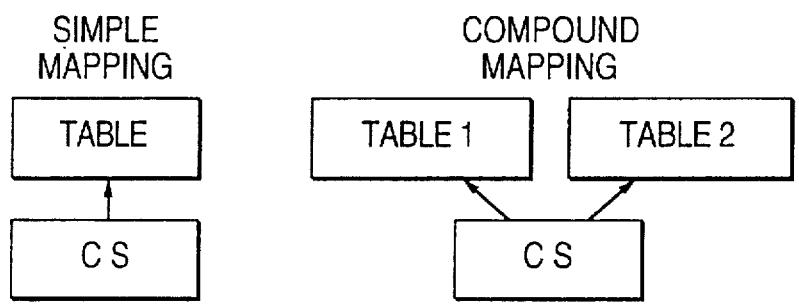
FIG. 20B(c)
COLUMN SELECTION MAPPING
FIG. 20B(d)
DUPLICATE MAPPING
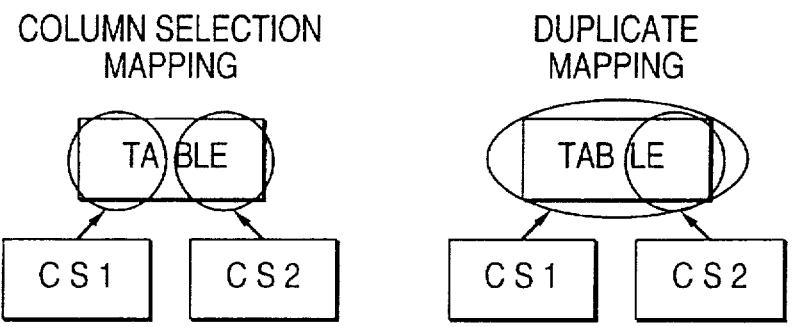

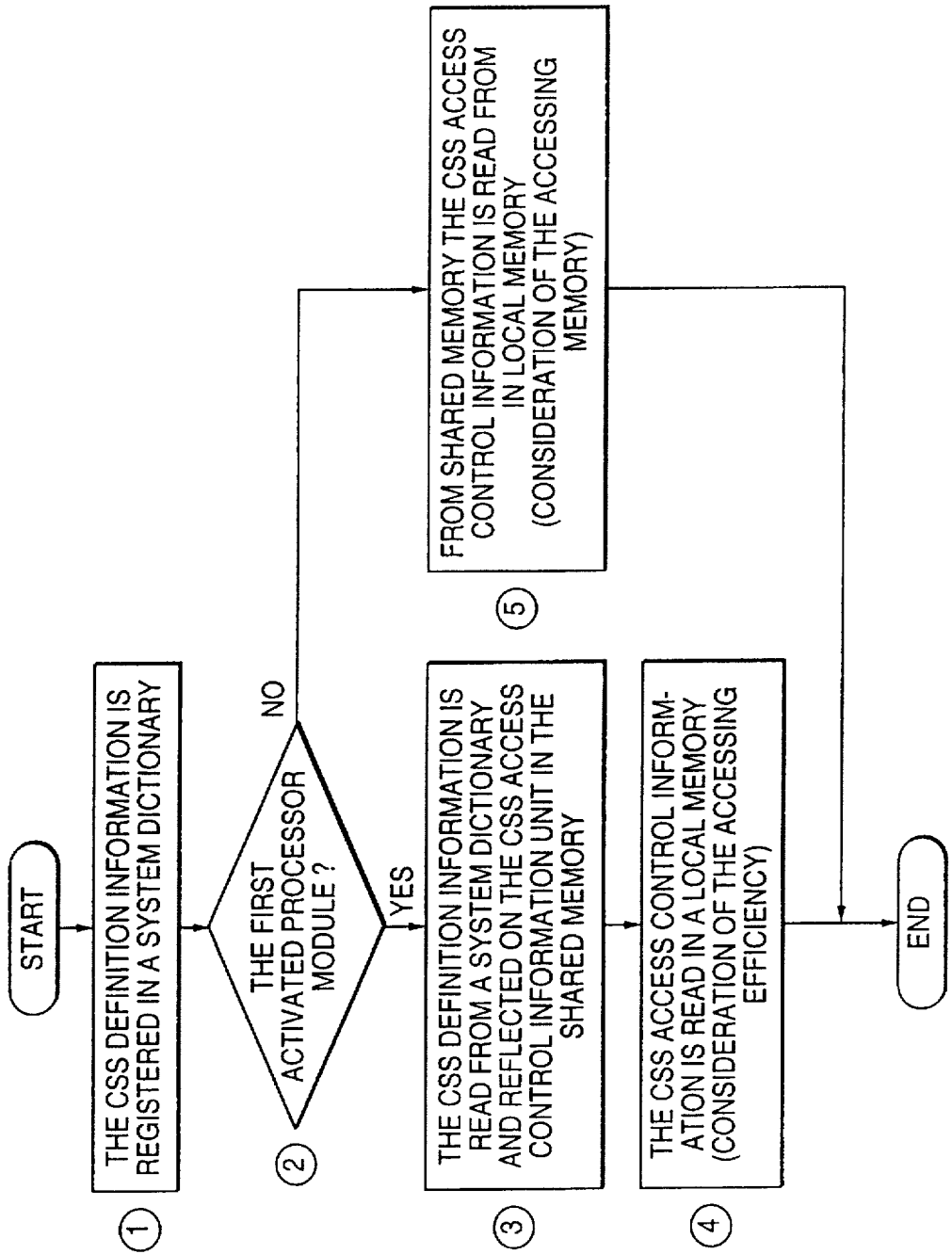

FIG. 24C

| | ③ A LOCAL CSS UNDER CONTROL OF THE CRASHING PM | | ⑩ A LOCAL CSS UNDER CONTROL OF THE NON-CRASHING PM | |
|---|---|---|---|---|
| | ④ RESOURCES CORRESPONDING TO THE LOG OUTPUTTED BY A CRASHING PM | ⑦ RESOURCES CORRESPONDING TO THE LOG OUTPUTTED BY A NON-CRASHING PM | ⑪ RESOURCES CORRESPONDING TO THE LOG OUTPUTTED BY A CRASHING PM | ⑯ RESOURCES CORRESPONDING TO THE LOG OUTPUTTED BY A NON-CRASHING PM |
| ① RESOURCES SPECIFIED BY THE LOG OF THE COMMITTED TRANSACTION | ⑤ AN ACCESS IS PROHIBITED TO THE CORRESPONDING RESOURCES OTHER THAN THOSE USED BY A NON-CRASHING PM | ⑧ AN ACCESS IS PROHIBITED TO THE CORRESPONDING RESOURCES | ⑫ AN ACCESS PROHIBITION REQUEST MESSAGE IS SENT TO A RESOURCE ADMINISTRATIVE PM<br>⇨ MESSAGE TRANSMITTED ⇨<br>⑬ AN ACCESS IS PROHIBITED ONLY TO THE RESOURCES BEING USED BY A CRASHING PM | ⑰ AN ACCESS IS NOT PROHIBITED |
| ② RESOURCES SPECIFIED BY THE LOG OF THE TRANSACTION IN PROGRESS | ⑥ AN ACCESS IS PROHIBITED TO THE CORRESPONDING RESOURCES | ⑨ AN ACCESS IS NOT PROHIBITED | ⑭ AN ACCESS PROHIBITION REQUEST MESSAGE IS SENT TO A RESOURCE ADMINISTRATIVE PM<br>⇨ MESSAGE TRANSMITTED ⇨<br>⑫ AN ACCESS IS PROHIBITED TO THE CORRESPONDING RESOURCES | ⑱ AN ACCESS IS NOT PROHIBITED |

FIG. 24D

| | ③ SHARED CSS | |
|---|---|---|
| | ④ RESOURCES CORRESPONDING TO THE LOG OUTPUTTED BY A CRASHING PM | ⑦ RESOURCES CORRESPONDING TO THE LOG OUTPUTTED BY A NON-CRASHING PM |
| ① RESOURCES SPECIFIED BY THE LOG OF THE COMMITTED TRANSACTION | ⑤ AN ACCESS IS PROHIBITED ONLY TO THE RESOURCES THAT ARE BEING LOCKED BY CRASHING PM AND THAT A COPY OF THE SHARED CSS BUFFER INFORMATION IN A CRASHING PM (THE LATEST DATA) IS NOT REFLECTED IN THE SHARED CSS BUFFER IN A SHARED MEMORY | ⑧ AN ACCESS IS NOT PROHIBITED |
| ② RESOURCES SPECIFIED BY THE LOG OF THE TRANSACTION IN PROGRESS | ⑥ AN ACCESS IS PROHIBITED TO THE CORRESPONDING RESOURCES | ⑨ AN ACCESS IS NOT PROHIBITED |

1

DATA PROCESSING SYSTEM FOR DYNAMICALLY SWITCHING ACCESS CONTROL PROCESS AND FOR PERFORMING RECOVERY PROCESS

This application is a division of application Ser. No. 07/745,233, filed Aug. 14, 1991 now U.S. Pat. No. 5,408,652 allowed.

The present invention relates to a database processing system and a processing procedure generating method for supporting a plurality of storage structures such as relational database management systems, and the like.

The performance of a database depends on a storage structure being adopted. Generally, a storage structure that meets all requirements is impossible. In a highly independent data system, since a switch of a storage structure slightly influences the logic of an application program, different storage structures can be used depending on performance requirements. Therefore, it is required to generate various storage structures according to different performance requirements, and prepare a database processing procedure for these storage structures.

Basic data organizations for forming database storage structures comprise B$^+$tree, hash, and heap organizations. Their feature and performance characteristics are described as follows:

B$^+$tree: Keys are managed in a tree structure where a record assigned a specific key value can be accessed directly. The number of I/Os equals the height of the tree (number of hierarchical steps). The height of the tree depends on the amount of data. Records can be accessed in the order of keys. However, they cannot be accessed in the order they are added.

Hash: A record assigned a specific key value can be accessed directly by relating a key to the data space by a hash function. The number of I/Os at the direct access depends on a hash function regardless of the amount of data. Records cannot be accessed in the order of keys or in the order they are added. A hash that permits data space to be variable is called "a dynamic hash".

Heap: Records cannot be accessed in the order of keys. Records are stored in the order they are added, and accessed in the ascending order they are stored. That is, they are in a sequential organization.

The description of the above basic data organization is given in the following documents:

1) "The Ubiquitous B-Tree", DOUGLAS COMER, ACM Computing Surveys Vol. 11, No. 2.
2) "Hash Table Method", W. D. Maurer, T. G. Lewis, ACM Computing Surveys Vol. 7, No. 1.
3) "Dynamic Hashing Schemes", R. J.ENBODY, ACM Computing Surveys Vol. 20, No.2.
4) "Foundation of Database System" Chapter 7 Organization of Database, Uemura, Ohm Publishing Co., 1979.

FIG. 1A shows an example of the prior art technology.

The data storage structure in the database management system is realized in the combination of a few basic data organizations as shown in FIG. 1A such as storage structure I as a combination of basic data organization A and B, and storage structure II as a combination of basic data organization A and C. However, in the prior art technology, a basic data organization is embedded in a storage structure. Thus, each of the accessing procedures I, II, III, . . . is prepared individually for the corresponding storage structure I, II, III, . . . and the like.

As described above, in the conventional database management system, a basic data organization is embedded in a storage structure, and an accessing procedure is prepared for the whole storage structure. In the optimizing process, a query described in a logical structure language is converted to a processing procedure of a database stored in accordance with the storage structure definition, when an acceptable accessing procedure for each storage structure is embedded in the optimizing program.

Accordingly, it costs a lot for a database management system to support a new storage structure. Actually, no database systems to which a few (about one to three) storage structures are applied are used commercially. Storage structures are provided as fixed to a limited range.

However, in practice, more storage structures are required to meet the access request to various data bases. It is desired that, depending on types of data such as those frequently referred to, updated, deleted, or added, those rarely updated, or those only sequentially referred to, an appropriate storage structure can be selected for meeting the performance requirements as a combination of basic data organizations. The access efficiency and storage efficiency largely depend on a storage structure.

FIG. 1B shows an example of a local process of the prior art technology; and FIG. 1C shows an example of a shared process of the prior art technology.

In the prior art technology, when relational database management is performed in a multi-processor system provided with a plurality of processors, an integrity guarantee process is performed on resources of relational database either by a local process within each processor module or by a shared process within a whole system.

In the local process shown in FIG. 1B, a processor module PM1 controls a product master table 90 and an order table of Branch Office A 91; a processor module PM2 controls an order table of Branch Office B 92; . . . and a processor module PMn controls an order control table of Branch Office Z 93.

Then, for example, when the processor module PM2 requires information in the product master table 90, it issues a process request to the processor module PM1 through the inter-processor communication, and receives the access result of the product master table 90 through the inter-processor communication.

On the other hand, in the shared process shown in FIG. 1C, data stored in a database entity storage 100 are loaded into a shared memory 10 which can be accessed commonly by processor modules, and an integrity guarantee covering the whole system is performed through a symmetrical process.

In the prior art technology, a recovery process from an abnormal condition, a crash for example, and the continuation of operation in a discretional procession module are controlled based on either the local process or the shared process, and these processes could not be concurrently performed for a recovery process from am abnormal condition or a high speed operation continuation in a multiprocessing system.

In the local process, integrity guarantee can be realized by means such as an inter-processor communication, etc. such that resources under the control of one processor module can be accessed by another processor module. This system has a large overhead and it also has the problem that resources subject to accesses from a plurality of processor modules may cause inefficient process performance.

However, in the shared process, the integrity guarantee must be performed for the whole system. Accordingly, (resources accessed only by a specific processor module) can be a bottleneck in the process flow, because they often use shared inter-processor information.

SUMMARY OF THE INVENTION

An object of the present invention is to solve the above problems and efficiently provide a desired storage structure as a combination of a few basic data organizations without preparing a large number of storage structures directly.

Another object of the present invention is to solve this problem, to efficiently control an access to a database, and to permit high speed operation to continue even when there is a clash of processor modules.

Process requirements in the database processing system can be classified according to response requirements and the scale of process which can be performed at one time. Specifically, the present invention works efficiently in realizing a process of high performance and reliability in processes where real time response is required (i.e. in most database processes).

A feature of the present invention resides in a database processing system for supporting a plurality of storage structures comprising a dictionary for storing information such. as basic data organizations relating to the combination of basic data organizations forming each type of storage structure, library parts names relating to said combination, and assembly pattern names, an access parts library for storing information such as access parts to basic data organizations which are access methods to each of the basic data organizations, and library parts relating to the combination of said access parts and an optimizing unit for generating procedures for processing a database by referring to the dictionary and access parts library in response to an query to a database and by combining the access parts to basic data organizations forming a storage structure and the library parts relating to the combination of the access parts, wherein an access schedule can be generated in the optimizing process according to the storage structure of a database comprising basic data organizations.

Another feature of the present invention resides in a database processing system using a multiprocessor comprising a plurality of processor modules each having a local memory with a shared memory connected to it; the database processing system comprising a composite structure definition control part for defining an administrative processor module for controlling an access to a composite structure of a database which has a storage structure independent of a logical structure, and a maintenance/selection control part in an optimum control processor for providing the function of access-controlling a shared process performed symmetrically and a local process performed asymmetrically when an access request arises for a database composite structure, and for dynamically switching the access control process for each composite structure according to the access frequency notified by earth processor module.

BRIEF EXPLANATION OF THE DRAWINGS

FIG. 3 shows an example of a storage structure of the Btree secondary indexes for explaining an embodiment of the present invention;

FIGS. 9A, 9B, 9C, 9D, 9E, 9F, 9G and 9H, 10, 11A, 11B, 11C, 11D, 11E, 11F, 11G, 11H, 11I, 11J, 11K, 12A, 12B, 12C, and 12D, 13, 14A and 14B, 15A, 15B, 15C, 15D, 15E, and 15F, and 16A, 16B, 16C, 16D, 16E, 16F, 16G, and 16H show the first to eighth examples of database processing procedures generated by an embodiment of the present invention;

FIGS. 20A and 20B are an explanatory view of a composite structure to which an embodiment of the present invention is applied;

FIG. 22 is a processing example of the CSS definition control unit shown in FIG. 17;

FIG. 24A, 24B, 24C, and 24D are a processing example of the continuing operation control unit shown in FIG. 17.

DETAILED DESCRIPTION OF THE EMBODIMENT

Figure 1A:
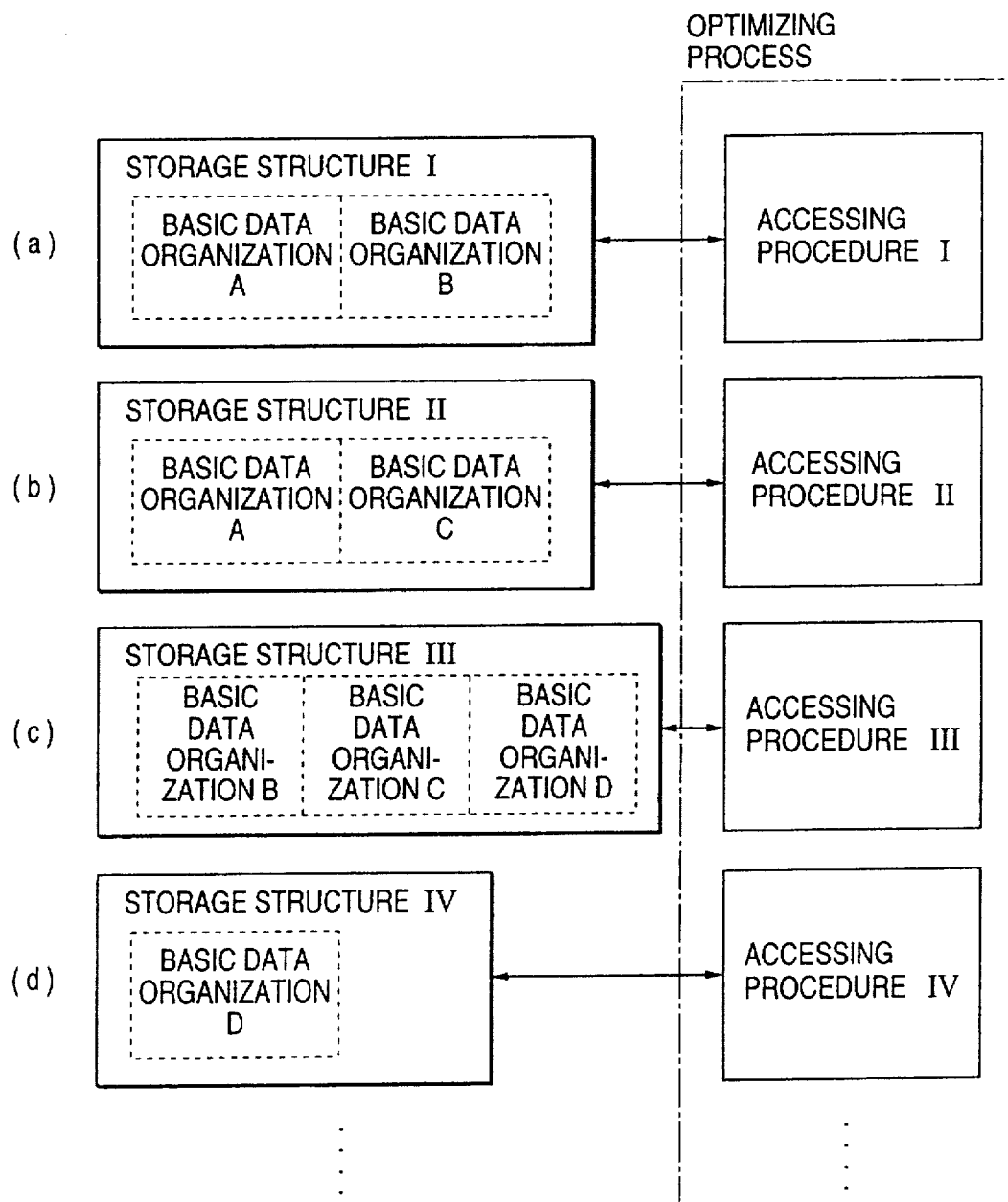
FIG. 1A shows an example of the prior art technology.
Figure 1B:
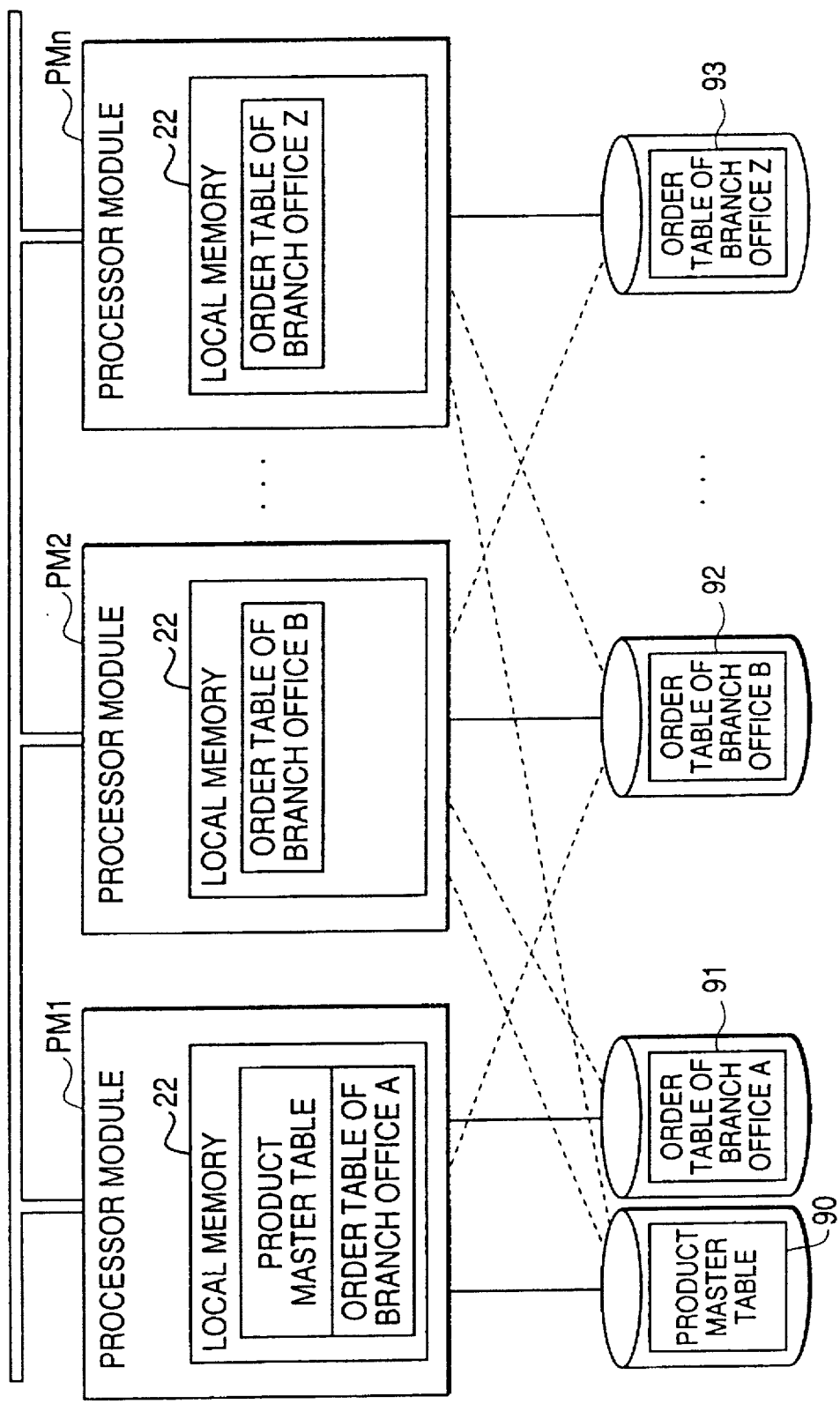
FIG. 1B is an example of the local control process of the p art technology.
Figure 1C:
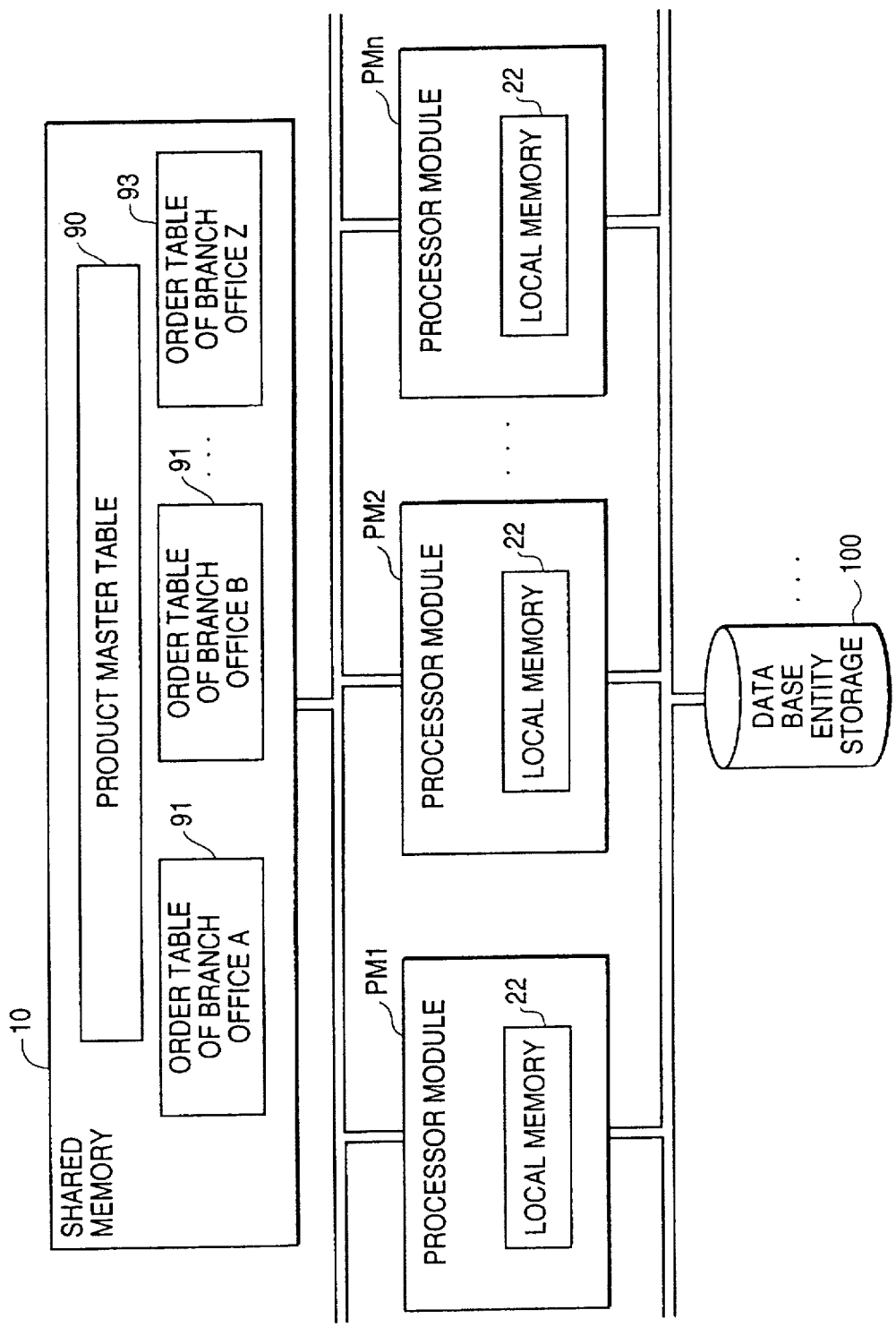
FIG. 1C is an example of the shared control process of the prior art technology.
Figure 2A:
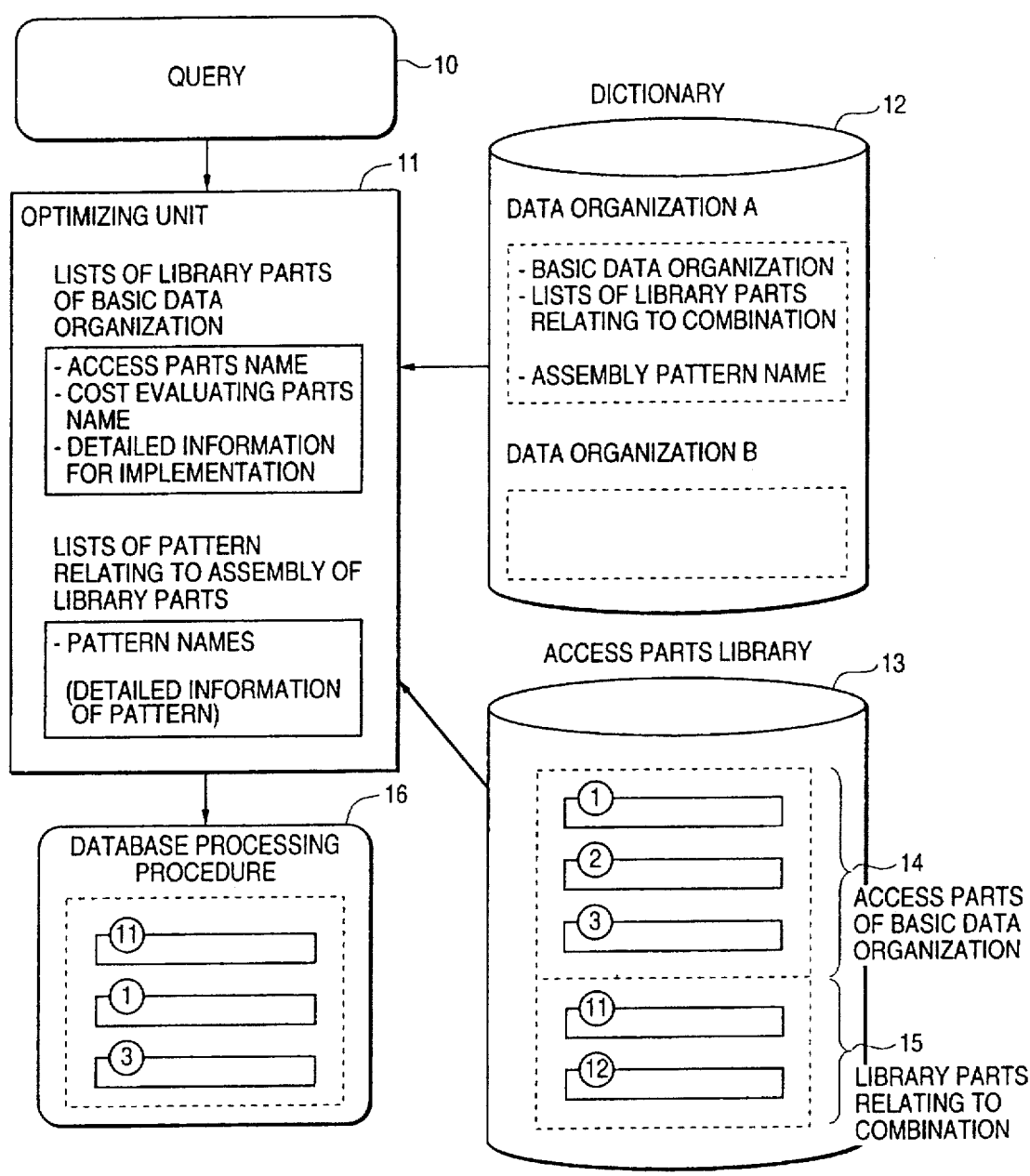
FIG. 2A is an explanatory view of the principle of the present invention.
Figure 2B:
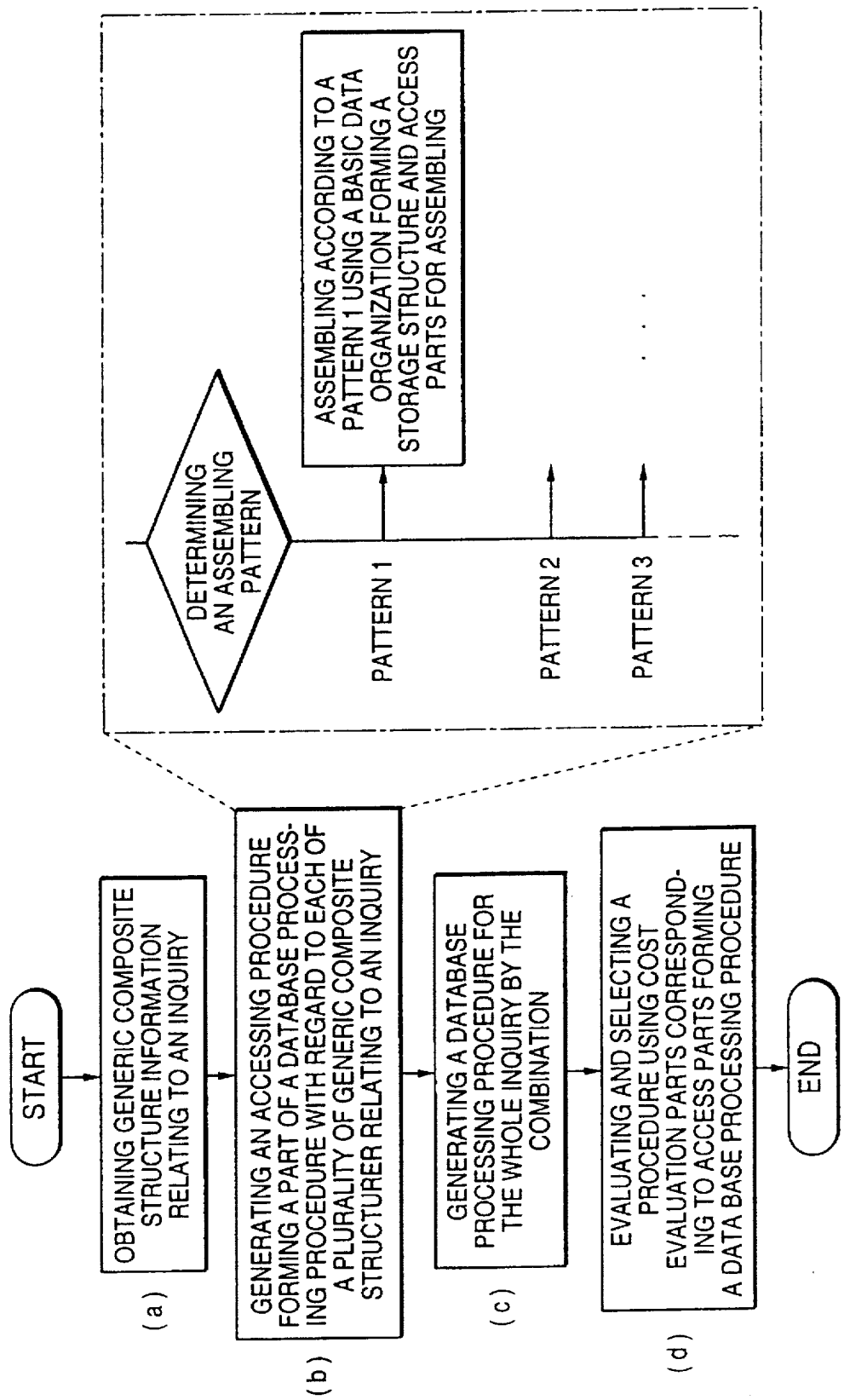
FIG. 2B shows an example of a database processing procedure generating method of the present invention.

FIG. 2A is an explanatory view of the principle of the present invention and FIG. 2B shows an example of a database processing procedure generating method.

An optimizing unit 11 generates an optimum database processing procedure 16 for meeting the requirements given by a query 10 described in a logical structure language.

A dictionary 12 stores definition information of storage structures and, in the present invention, stores the information relating to the combination of basic data organizations forming a storage structure. An access parts library 13 stores access parts 14 to basic data organizations as access methods to each basic data organization such as a $B^+$tree, heap, hash, etc. Library parts 15, relating to the combination of basic data organizations, are stored for expressing combinations of these organizations.

An optimizing unit 11 refers to a dictionary 12 and an access parts library 13 in response to a query 10 to a database, and then prepares a database processing procedure 16 by arranging access parts 14 to basic data organizations forming storage structures and library parts 15 relating to the combination of basic data organizations.

Thus, various storage structures of a database can be generated as combinations of basic data organizations.

A process for generating a database processing procedure 16 is performed as shown in FIG. 2B.

(a) Storage structure definition information relating to a query comprising information of basic data organizations forming storage structures, library parts names, and assembly pattern names both relating to the combination are accessed in a dictionary 12 shown in FIG. 2A. An assembly pattern refers to information indicating+how the access parts 14 to basic data organizations which are selected according to the information of the dictionary 12 and the library parts 15 relating to the combination are combined and positioned.

(b) Next, with regard to each of a plurality of storage structures relating to a query, an accessing procedure forming a part of a database processing procedure 16 is generated by the access parts 14 to the basic data organizations and the library parts 15 relating to the combination. That is, an accessing procedure is generated for each assembly pattern by the access parts 14 to the basic data organizations and the library parts 15 relating to the combination.

(c) Then, a database processing procedure for the whole query is generated by the combination of the accessing procedures generated in process step (b).

(d) The procedure execution cost is evaluated using cost evaluating parts for evaluating the execution cost for the access parts 14 to the basic data organizations used for database processing procedures 16, and then the optimum procedure is selected from among available database processing procedures 16.

The storage structure in the database management system can be realized by the combination of basic data organizations such as a B$^+$tree, heap, and hash. The present invention adopts this configuration and generates a storage structure by combining basic data organizations.

A procedure for accessing the data stored based on the above definition of a storage structure comprises the access parts 14 to basic data organizations and the library parts 15 for representing the combination.

Access parts to a storage structure are not prepared as a result of the combination of the access parts 14 to basic data organizations and the library parts 15 relating to the combination, but is dynamically assembled by the optimizing unit 11 when a database processing procedure is executed. An assembling process can be patterned by the relation of records between basic data organizations forming a storage structure, such as the relation represented by a pointer connecting a record in a specific basic data organization to a record in another basic data organization, and by the kind of operation to a storage structure such as an access by a key value and a key-sequential access, etc.

According to the above described configuration, a new storage structure can be added only by accessing parts to basic data organizations, requiring no consideration of a combination result and greatly reducing the trouble of adding an exclusive storage structure.

In an embodiment of the present invention, basic data organizations comprise the following structures:

Btree: A data organization comprising a non-leaf part of a B$^+$tree organization Kheap: A data organization comprising a leaf part of a B$^+$tree organization Dheap: A heap data organization comprising fixed length records Nheap: A heap data organization Dhash: A data organization in a dynamic hash organization Various storage structures can be produced by combining these basic data organizations. The detailed information for implementing the access parts relating to these storage structures and the assembling logic for patterned access parts are included in the processing logic of the optimizing unit 11 shown in FIG. 2A.

Information relating to storage structures comprises basic data organizations as components, access parts for the combination of basic data organizations, and an identifier of pattern information for the above assembly. This information is stored in the dictionary 12.

In response to the query 10, the optimizing unit 11 prepares cost evaluating parts for selecting the optimum procedure for the access parts 14 to basic data organizations and the library parts 15 relating to the combination respectively using a plurality of available database processing procedures 16.

The optimizing unit 11 generates a database processing procedure 16 by assembling the access parts 14 to basic data organizations specified by the definition of the target storage structure and the library parts 15 relating to the combination according to the specified pattern. At this time, the generated database processing procedure 16 is evaluated by the corresponding cost evaluating parts, and then the optimum procedure is selected.

The storage structures comprising the above described basic data organizations in an embodiment of the present invention including Btree secondary indexes, a dense Btree structure, and a dynamic hash structure are explained as follows:

(Btree secondary indexes)

Figure 4:
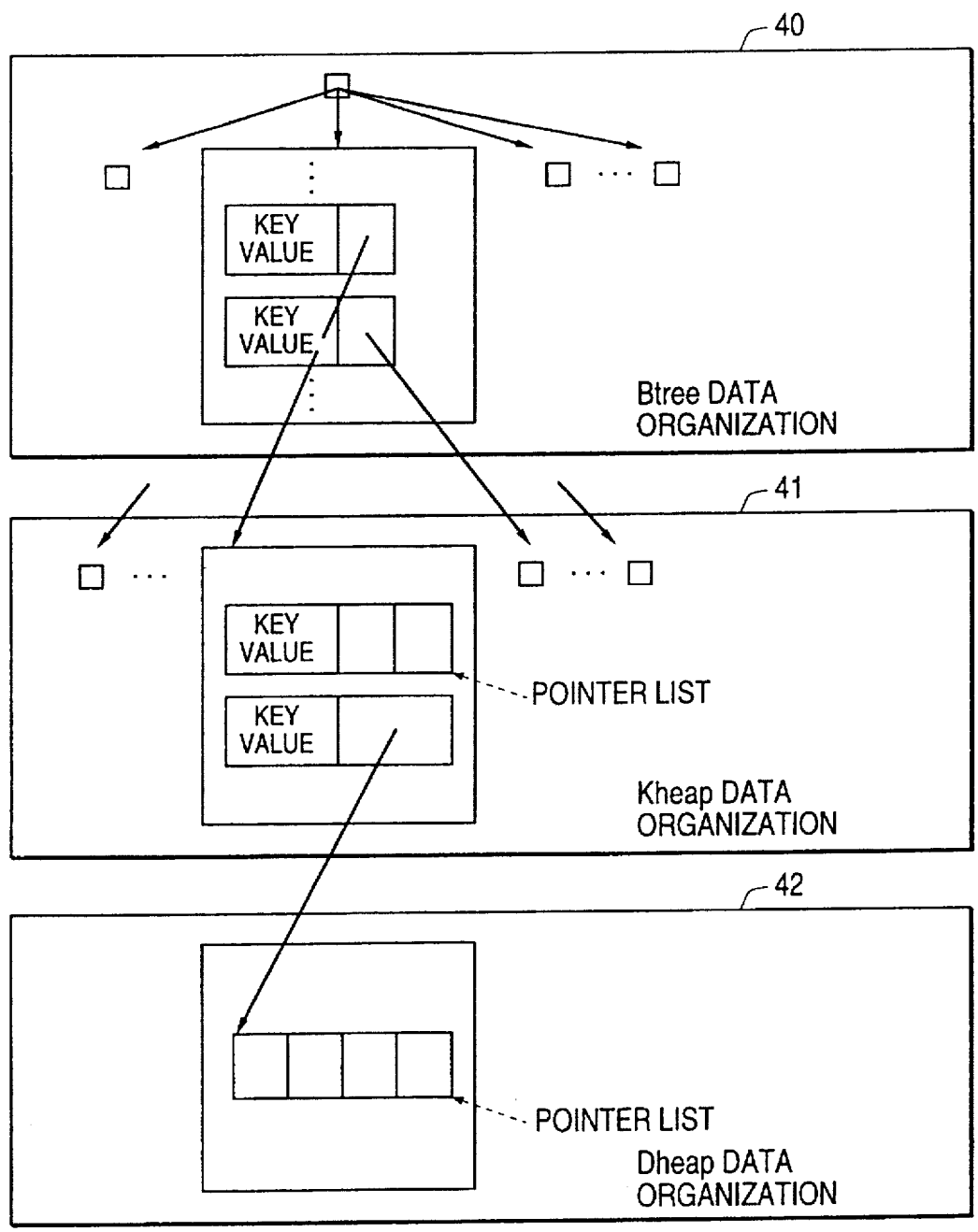
FIG. 4 shows the relation between the Btree secondary indexes and basic data organizations.

FIG. 3 shows an example of a storage structure of the Btree secondary indexes for explaining an embodiment of the present invention; and FIG. 4 shows the relation between the Btree secondary indexes and basic data organizations.

Btree secondary indexes are used as indexes. As shown in FIG. 3, these indexes comprise an index part 30 and a data part 31. The data part 31 comprises index data (a pointer to a record contained in another storage structure). The index part 30 uses the Btree data organization and the index data part uses the Kheap data organization. The Dheap data organization is adopted for the overflow of the index data.

The Btree secondary index may refer to a plurality of records having an equal key value. That is, it may set a plurality of pointers associated with an index record (key value +pointer value). The number of pointers for an index record can be different.

To provide such characteristics, the Btree secondary indexes comprise three basic data organizations including a Btree data organization 40 for positioning a record effectively by a specific key value using a tree structure, a Kheap data organization 41 for effectively taking out a record in the order of key, and a Dheap data organization 42 for containing records with a specific number of pointers separated in fixed lengths when there are too many pointers generated as shown in FIG. 4.

When a record in a B tree data organization 40 is accessed by a key value, the page in which the corresponding index record of the Kheap data organization 60 is specified. More concretely speaking, a record in the B tree data organization maintains a page number in which the key value and the index record of the corresponding Kheap data organization are stored. The B tree data organization manages such information by using a tree structure.

In the Kheap data organization 41, records comprising a key value and a pointer list are arranged in the order of key value. Records in the Kheap data organization 41 contain a specific number of pointers, and when the number of pointers greatly increases, they are contained in the Dheap data organization 42. By setting the specific number to an average value of the duplicate number of equal key values in the Btree secondary index, the number of records overflowing into the Dheap data organization 42 can be reduced, thus effecting the I/Os operation.

In the Dheap data organization 42, a record comprising a specific number of pointers is associated by a list.

(Dense Btree structure)

Figure 5:
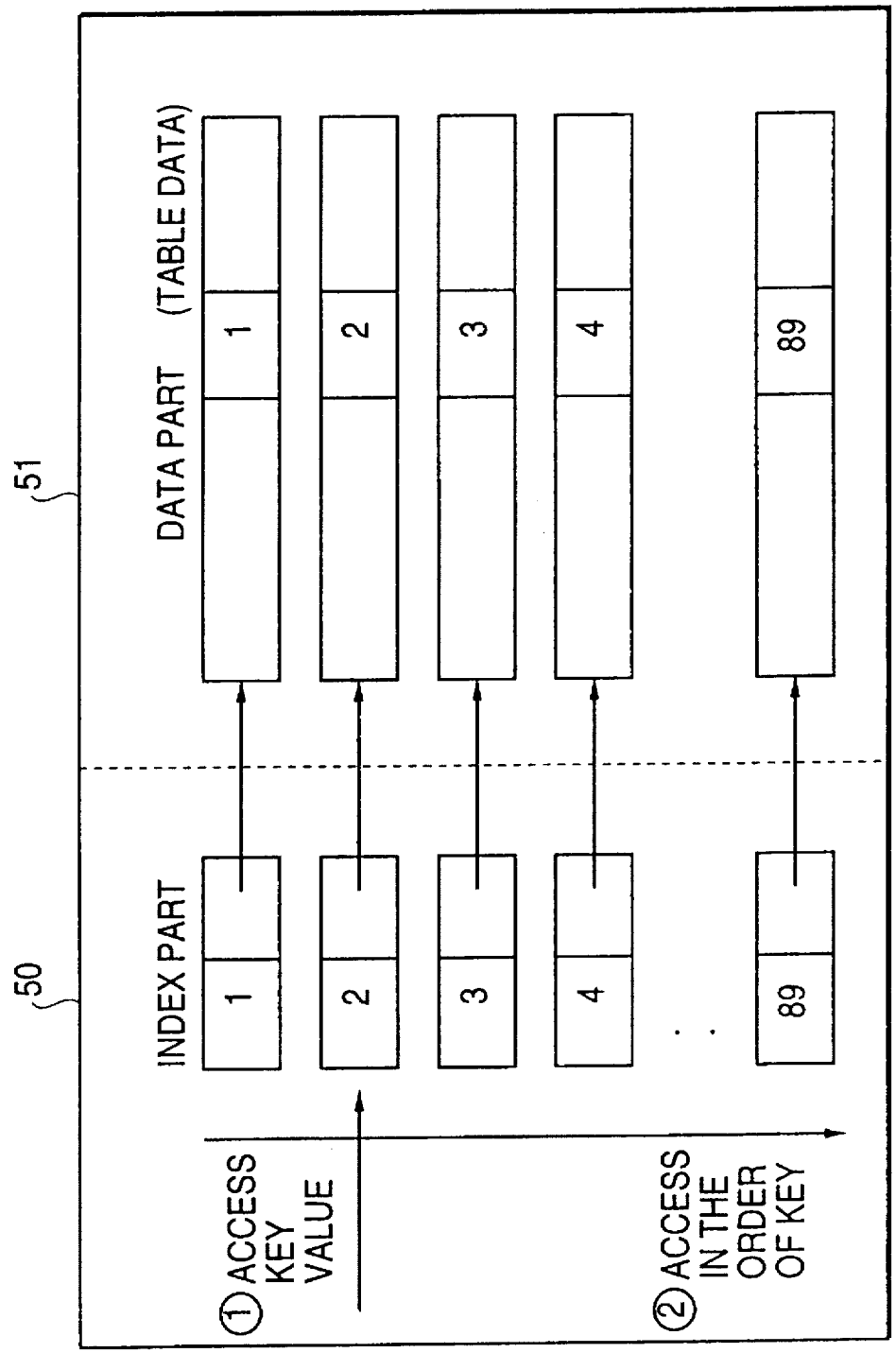
FIG. 5 shows an example of a dense Btree structure for explaining an embodiment of the present invention.
Figure 6:
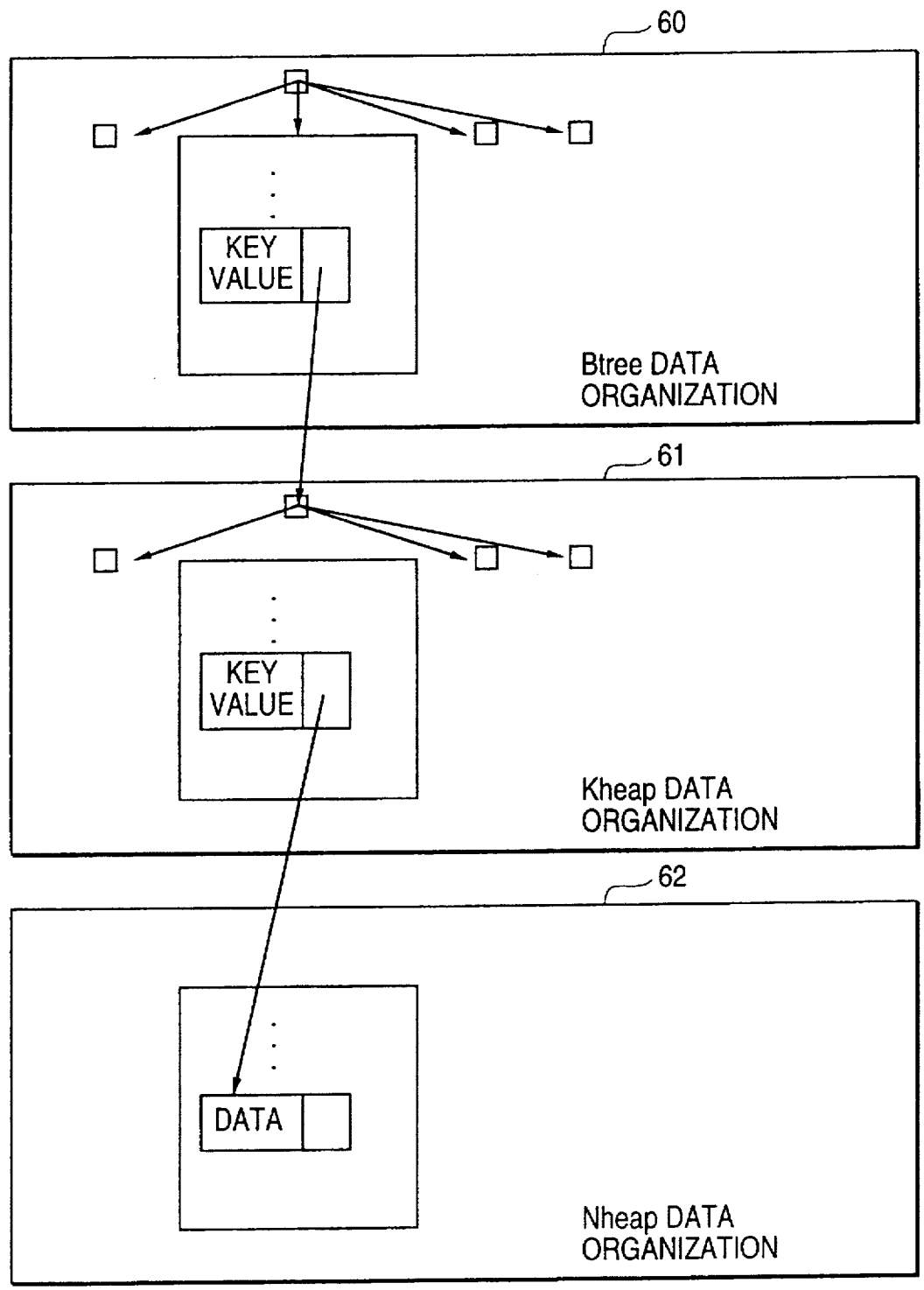
FIG. 6 shows the relation between the dense Btree structure and/Basic data organizations.

FIG. 5 shows an example of a dense Btree structure for explaining an embodiment of the present invention; and FIG. 6 shows the relation between the dense Btree structure and basic data organizations.

The dense Btree structure is used to contain the data in tables. As shown in FIG. 5, a data part 51 contains the data in tables and an index part 50 refers to indexes for the data part 51.

The index part 50 is put in the Btree data organization and the Kheap data organization. The data part 51 is put in the Nheap data organization.

The index part 50 has index records referring to each record in the data part 51. When indexes are generated, records of the data part 51 are stored in the order of key value. When records are added and cannot be stored in the pages of the data part 51, only the overflowing keys are put in another page without splitting the data in two pages, thus obtaining high space utilization.

As shown in FIG. 6, the dense structure comprises three basic organizations of a Btree data organization 60 for effectively positioning records by a specific key value in a tree structure, a Kheap data organization 61 for effectively accessing to a record in the order of key value, and an Nheap data organization 62 for containing data with high space utilization.

When a record in a B tree data organization 60 is accessed by a key value, the page in which the corresponding index record of the Kheap data organization 61 is specified. More concretely speaking, a record in the B tree data organization maintains a page number in which the key value and the index record of the corresponding Kheap data organization are stored. The B tree data organization manages such information by using a tree structure.

In the Kheap data organization 61, records having a key value and a pointer are arranged in the order of key value.

In the Nheap data organization 62, records comprising data in tables are managed.

(Dynamic hash structure)

Figure 7:
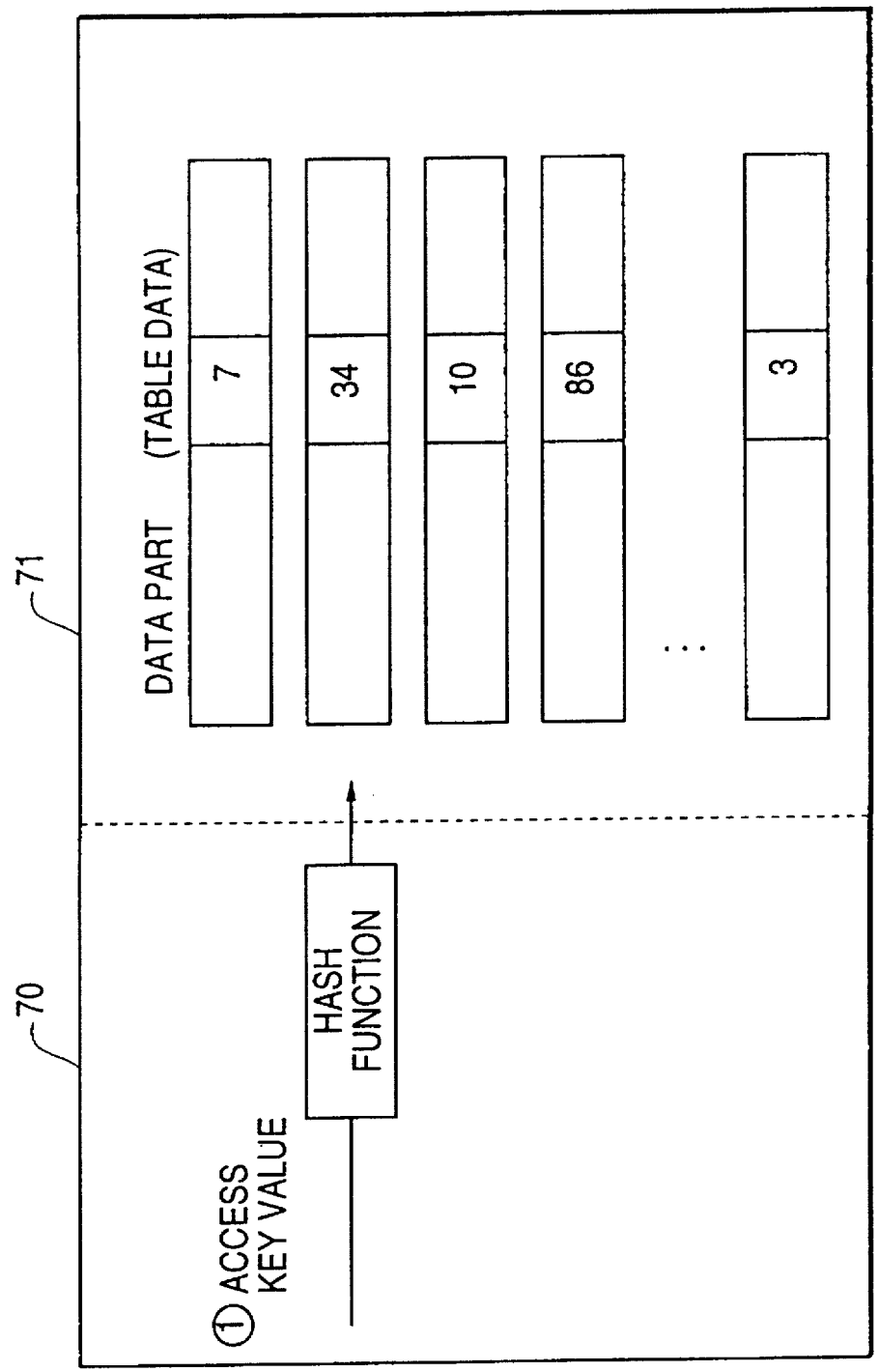
FIG. 7 shows an example of a dynamic hash structure for explaining an embodiment of the present invention.
Figure 8:
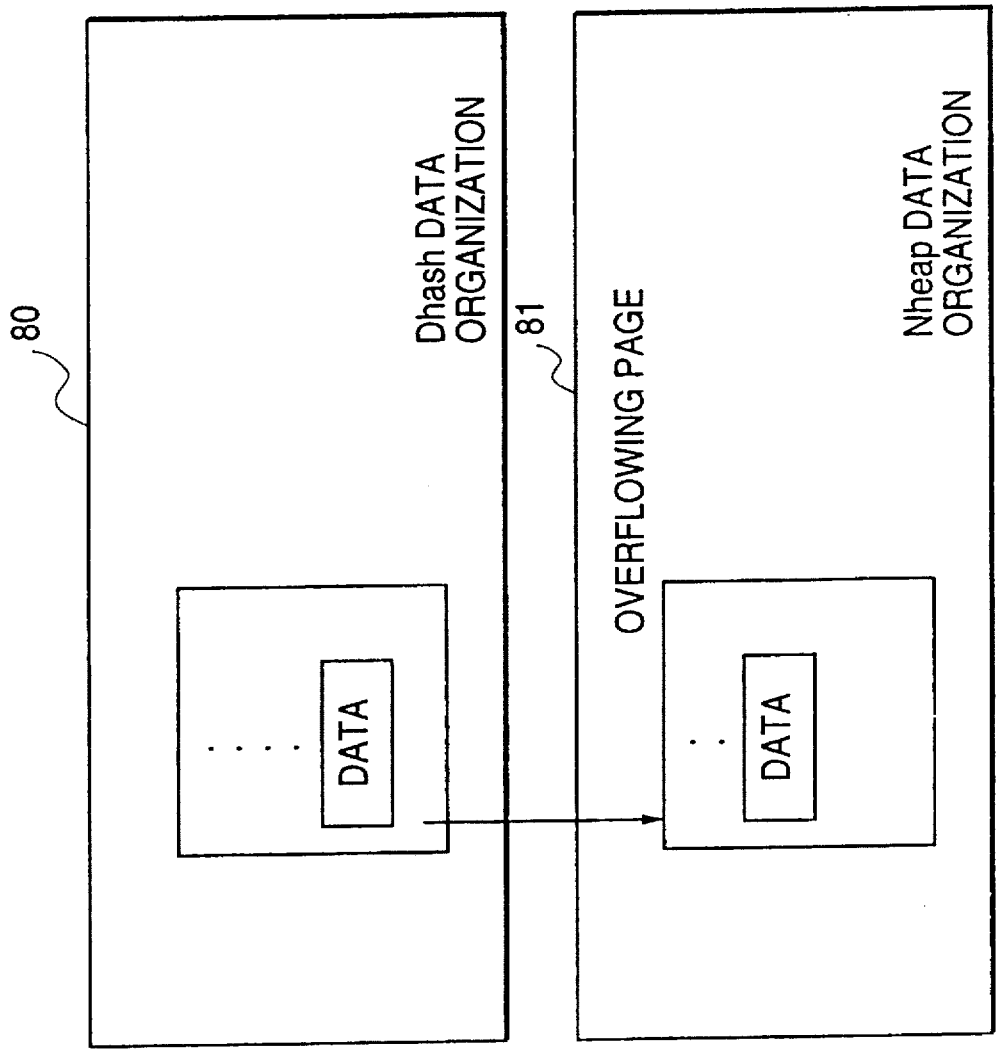
FIG. 8 shows the relation between the dynamic hash structure and basic data organizations.

FIG. 7 shows an example of a dynamic hash structure for explaining an embodiment of the present invention and FIG. 8 shows the relation between the dynamic hash structure and basic data organizations.

The dynamic hash structure is used for storing the data in tables. The dynamic hash structure comprises a prime organization corresponding to the data space associated by a hash function and an overflow organization for storing overflowing records when data cannot be stored in a specific prime organization. Prime pages are put in the Dhash data organization, and overflow pages are put in the Nheap data organization. A record can be stored in a prime data organization or an overflow data organization.

FIG. 7 shows an example of its storage structure. A key value is associated with a record in a data part 71 by a hash function 70. Therefore, the arrangement of records of the data part 71 depends on the hash function 70.

As shown in FIG. 8, a dynamic hash structure comprises two basic data organizations including a Dhash data organization 80 for a prime data organization and an Nheap data organization 81 for an overflowing data organization.

In the prime Dhash data organization, records are contained in association with a hash function 70, and multiple-key records are contained in the specific prime organization. Records are contained in the Nheap overflow data organization 81 only when an overflow arises. Therefore, the minimum number of I/Os is 1 when a specific key value is accessed directly, thus permitting a high speed access.

As described above, the Dhash data organization 80 manages prime page associated by a hash function.

The Nheap data organization 81 contains overflowing records that cannot be contained in a prime organization.

To realize the various kinds of storage structures described above, the following access parts 14 to basic data organizations are provided in the access parts library 13 shown in FIG. 2A.

| Basic Data Organization | Access Parts |
| --- | --- |
| Btree Data Organization | Direct access (page number) |
| | Insertion |
| | Reflection of split result |
| | Deletion |
| Kheap Data Organization | Direct location or Addressing in the page |
| | Location of the next record in the page |
| | Location of the next page |
| | Insertion |
| | Deletion |
| | Update |
| | Update of a pointer |
| Dheap Data Organization | Location of a record |
| | Addition |
| | Deletion |
| | Update |
| | Update of a pointer |
| Nheap Data Organization | Location of a record |
| | Location of the next record in the page |
| | Location of the next page |
| | Access to a spaced page |
| | Addition |
| | Deletion |
| | Update |
| Dhash Data Organization | Direct access (in the page) |
| | Location of a record |
| | Location of the next record in the page |
| | Location of the next page |
| | Access of a spaced page |
| | Insert |
| | Deletion |
| | Update |

The contents of these access parts are as follows:

(Btree data organization)

* Direct access (page number): A page number containing the index data of Btree is accessed.
* Insertion: A Btree record is inserted.
* Reflection of split result: When a Btree data organization is split, the result is reflected in the Btree part.
* Deletion: A Btree record is deleted.

(Kheap data organization)

* Direct location in the page: A record having a specific key in the page is located.
* Location of the next record in the page: The next key value record in the page is located.
* Insertion: A Kheap record is inserted.

* Deletion: A Kheap record is deleted.
* Update: The data part of a Kheap record (index data) is updated.
* Update of a pointer: The pointer part of a Kheap record (pointer to the Dheap part) is updated.

(Dheap data organization)
* Location of a record: A record at the specified position is located.
* Addition: A Dheap record is added.
* Deletion: A Dheap record is deleted,
* Update: The data part of a Dheap record (index data) is updated.
* Update of a pointer: The pointer part of a Dheap record (pointer to the next Dheap record) is updated.

(Nheap data organization)
* Location of a record: A record at the specified position is located.
* Location of the next record in the page: The next record in the page is located.
* Location of the next page: The next page is located.
* Access of a spaced page: A new page is accessed.
* Addition: An Nheap record is added to the page.
* Deletion: An Nheap record is deleted.
* Update: The content of an Nheap record is updated.

(Dhash data organization)
* Direct access (page number): A page number corresponding to a specific key is accessed by a hash function.
* Location of a record: A record at the specified position is located.
* Location of a record in the page: The next record is located in the page.
* Location of the next page: The next page is located.
* Access of a spaced page: A new page is accessed.
* Insertion: A Dhash record is added to the page.
* Deletion: A Dhash record is deleted.
* Update: The content of a Dhash record is updated.

The following parts are provided in the access parts library 13 shown in FIG. 2A as library parts 15 relating to the combination.

| Storage Structure | Library Parts |
| --- | --- |
| Btree Secondary Index Structure | Assembling key values<br>Assembling an index pointer and a key value<br>Access to an index pointer<br>Adding an index pointer |
| Dense Btree Structure | Assembling key values<br>Access to an data pointer<br>Access to data<br>Direct access to keys |
| Dynamic Hash Structure | Assembling a key value<br>Access to data<br>Direct access to a key<br>Access to the leading page of overflows<br>Access to the next overflowing the page<br>Binding pages<br>Separating pages<br>Binding key management parts<br>Separating key management parts |

The content of the library parts relating to the above described assembly are as follows:

(Btree secondary index structure)
* Assembling a key value: An operational key value of a Btree secondary index is set.
* Assembling an index pointer and a key value: An operational key value for inserting a Btree secondary index record and an index pointer are set.
* Access to an index pointer: An index pointer is accessed in the record in a basic data organization.
* Adding an index pointer: An index pointer is added to a record in a basic data organization.

(Dense Btree structure)
* Assembling a key value: An operational key value is set for a Dense Btree record.
* Access to a data pointer: A pointer to a data part is accessed in the record in a basic data organization.
* Access to data: Data in the data part are accessed in the record in a basic data organization.
* Direct access to a key: Data corresponding to a key value are accessed in the dense Btree.

(Dynamic hash structure)
* Assembling a key value: A key value for a dynamic hash operation is set.
* Access to data: Data in the data part are accessed in the record in a basic data organization.
* Direct access to a key: Data corresponding to a key value are accessed in the dynamic hash.
* Access to the leading page of overflows: The leading page containing the records which overflow the prime data organization and are stored in the overflowing data organization is accessed.
* Access to the next overflowing page: The next overflowing page is accessed in the pages in the overflowing data organization.
* Binding pages: A page in the prime data organization and one in the overflowing data organization are bound.
* Separating pages: A page in the prime data organization and one in the overflowing data organization are separated.
* Binding records to the key management part: Records are bound to the key management part.
* Separating records from the key management part: Records are separated from the key management part.

Assembly pattern examples for assembling access parts 14 to basic data organizations and library parts 15 relating to the combination are as follows:

| | Operation for | |
| --- | --- | --- |
| Storage Structure | Storage Structure | Assembly Pattern |
| Sequential access in the key range | Btree secondary index structure | Access pattern a in the order of key range |
| | Dense Btree structure | Access pattern b in the order of key range |
| Direct access to key | Btree secondary index structure | Direct access pattern a of key |
| | Dense Btree structure | Direct access pattern b of key |
| | Dynamic hash structure | Direct access pattern c of key |
| Insertion | Btree secondary index structure | Insert pattern a |
| | Dense Btree | Insert pattern b |

| | Operation for | |
|---|---|---|
| Storage Structure | Storage Structure | Assembly Pattern |
| | structure Dynamic hash structure | Insert pattern c |

FIGS. 9A to 16H show eight examples of database processing procedures 16 which are generated by the optimizing unit 11 shown in FIG. 2A by assembling access parts 14 to basic data organizations and library parts 15 relating to the combination based on the above described assembly patterns.

In these figures, *Btree indicates access parts to the Btree data organization, *Kheap indicates access parts to the Kheap data organization, *Dheap indicates access parts to the Dheap data organization, *Nheap indicates access parts to the Nheap data organization, and *Dhash indicates access parts to the Dhash data organization. Additionally, *IX indicates library parts relating to the assembly for the Btree secondary index structure, *Dense indicates library parts relating to the assembly for the dense Btree structure, and *Dhash Structure indicates library parts relating to the assembly for the dynamic hash structure.

In the explanation in these figures, "index pointer" is abbreviated as "IXP".

Figure 9A:
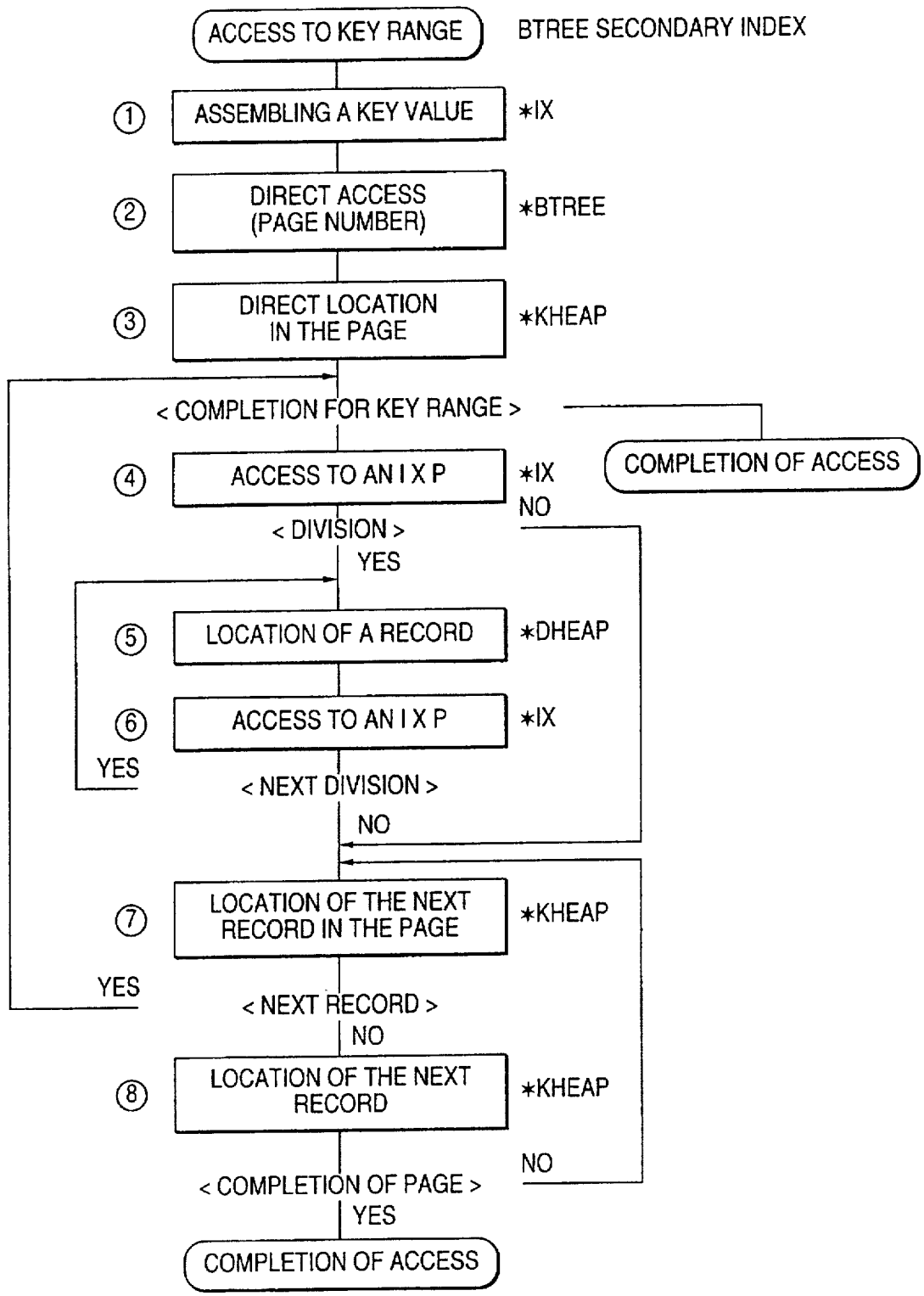

FIG. 9A shows a first example of database processing procedure for accessing data in the order of key ranges.

In FIG. 9A, steps 1, 4, and 6 with *IX show library parts relating to the above combination. Step 2 shows access parts to the Btree data organization; steps 3, 7, and 8 show access parts to the Kheap data organization; and step 5 shows access parts to the Dheap data organization.

The contents of steps 1–8 shown in FIG. 9A are explained briefly as follows:

1 Key values are set corresponding to respective key ranges.

2 Starting page numbers are accessed by the access parts to the Btree data organization.

3 Starting records are located by the access parts to the Kheap data organization.

Determination is made as to whether or not the end of the key range is reached. If yes, the accessing operation is terminated.

4 An index pointer is accessed in the pointer list of the Kheap data organization.

5 If data are split, that is, they are extended to a record of Dheap data organization in addition to a record of the Kheap data organization, records are located by their access parts.

6 An index pointer is accessed in the pointer list of the Dheap data organization.

7 If data are not split, or if data are split and the process is terminated, the next record in the page is located by the access parts to the Kheap data organization. If there are subsequent records, the steps following the process for determining the end of the key range are repeated.

8 If there are no subsequent records, subsequent pages are located until the last page is reached. Then control is returned to step 7 and the processes are repeated.

According to the above procedure, an access can be successfully performed for accessing to data in the order of key ranges in the storage structure of the Btree secondary index as shown in FIGS. 3 and 4.

The respective steps shown in FIG. 9A are explained more in detail

1 Composition of a key value (*IX)

A start-of-retrieval key value and an end-of-retrieval key value are generated to show a retrieval range. The key value can be obtained by encoding a data value for facilitating the comparison with multi-element key values as shown in FIG. 9B.

2 Direct access (page number) (*Btree)

A page number of the Kheap data organization having the key value of the target location is obtained using the retrieval starting key value, starting with the root page in the Btree data organization through the leaf page.

Figure 9C:
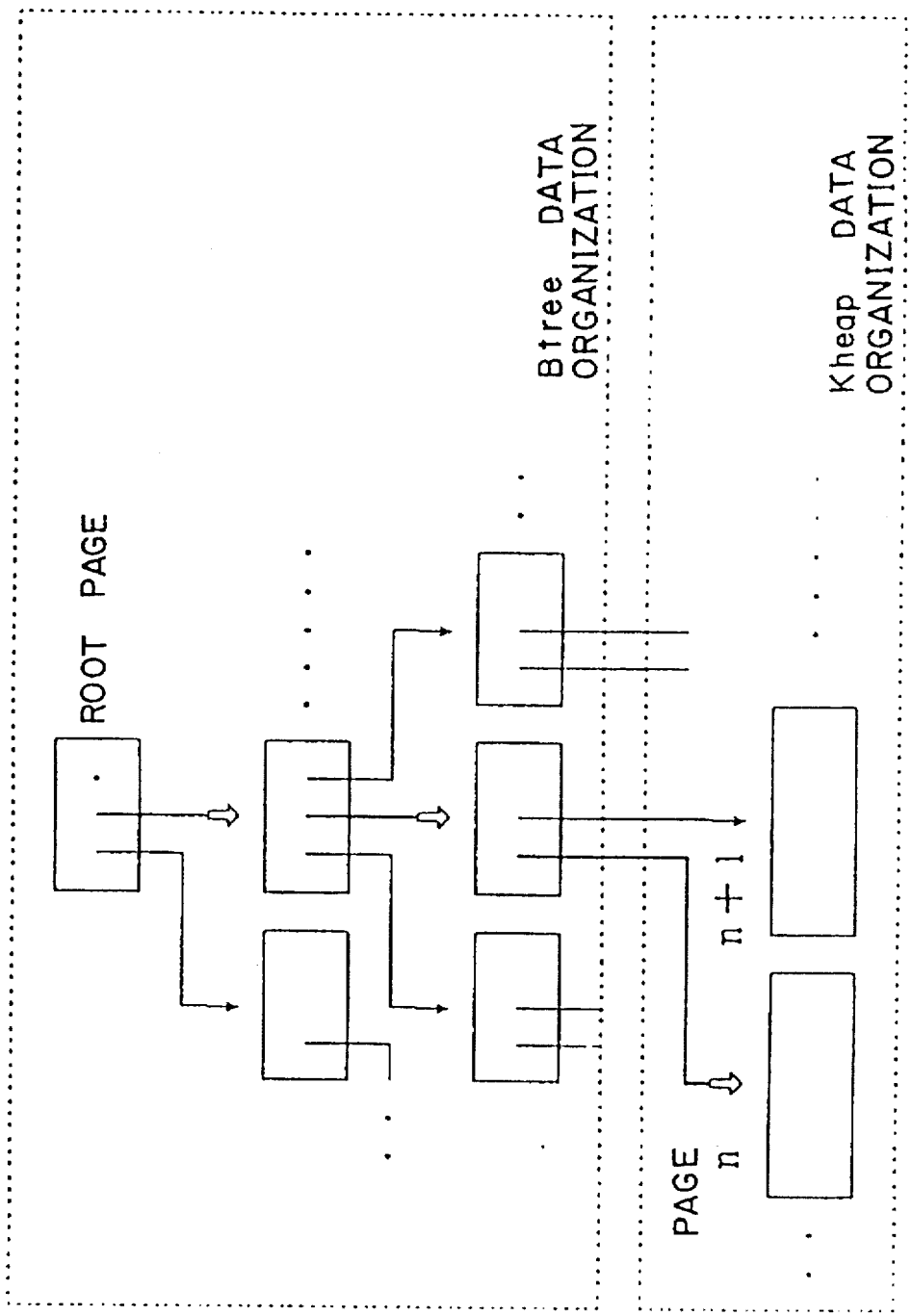

Example of a three layer Btree data organization is shown in FIG. 9C.

"n" is obtained using a retrieval starting key value.

3 Intra-page direct location (*Kheap)

Any record in the Kheap data organization can be located using a specified key value (An intra-page relative position which is location information of a target record can be obtained). As an example of location; A page in the Kheap data organization is shown in FIG. 9D.

4 Obtaining an IXP (*IX)

An index pointer can be obtained in the index pointer part of the located record in the Kheap data organization or the Dheap data organization. As shown in FIG. 9E IXP(1)–IXP(m) or IXP(1)–IDP(n) can be obtained in the IXP part.

5 Locating a record (*Dheap)

Figure 9F:
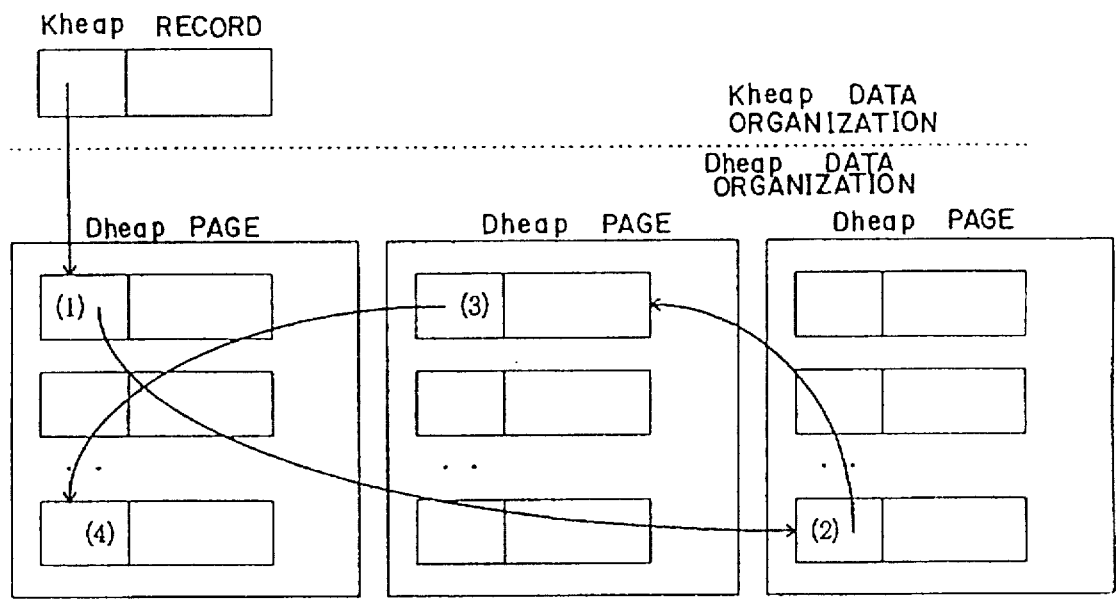

A Dheap record is located using a pointer to a Dheap record (location information is obtained), as shown in FIG. 9F. Dheap records (1)–(4) is sequentially located (A page number and intra-page relative position are obtained).

6 IXP access (*IX)

Refer to 1 described above.

7 Locating the next record in the page (*Kheap)

Figure 9G:
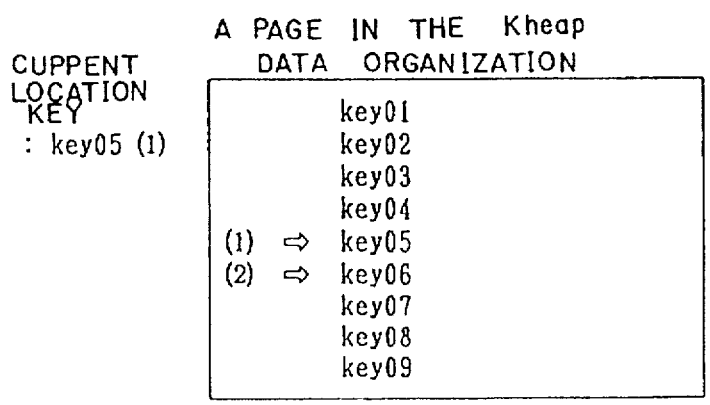

The next record in the page is located in the order of keys from a Kheap record. As an example of location; A page in the Kheap data organization is shown in FIG. 9G. The record (2) is located according to the base record (1).

8 Locating the next page (*Kheap)

Figure 9H:
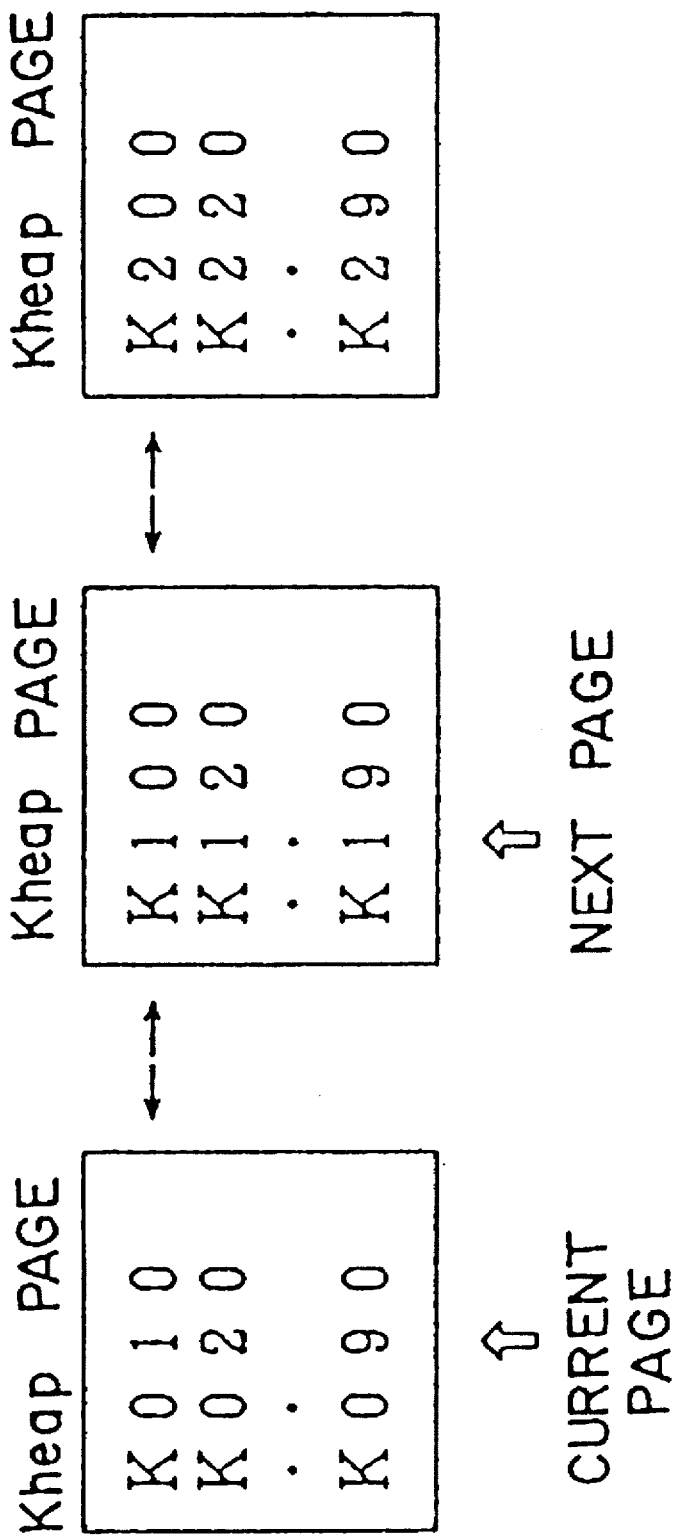

A Kheap page having the next key value in the Kheap data organization can be located as shown in FIG. 9H.

Figure 10:
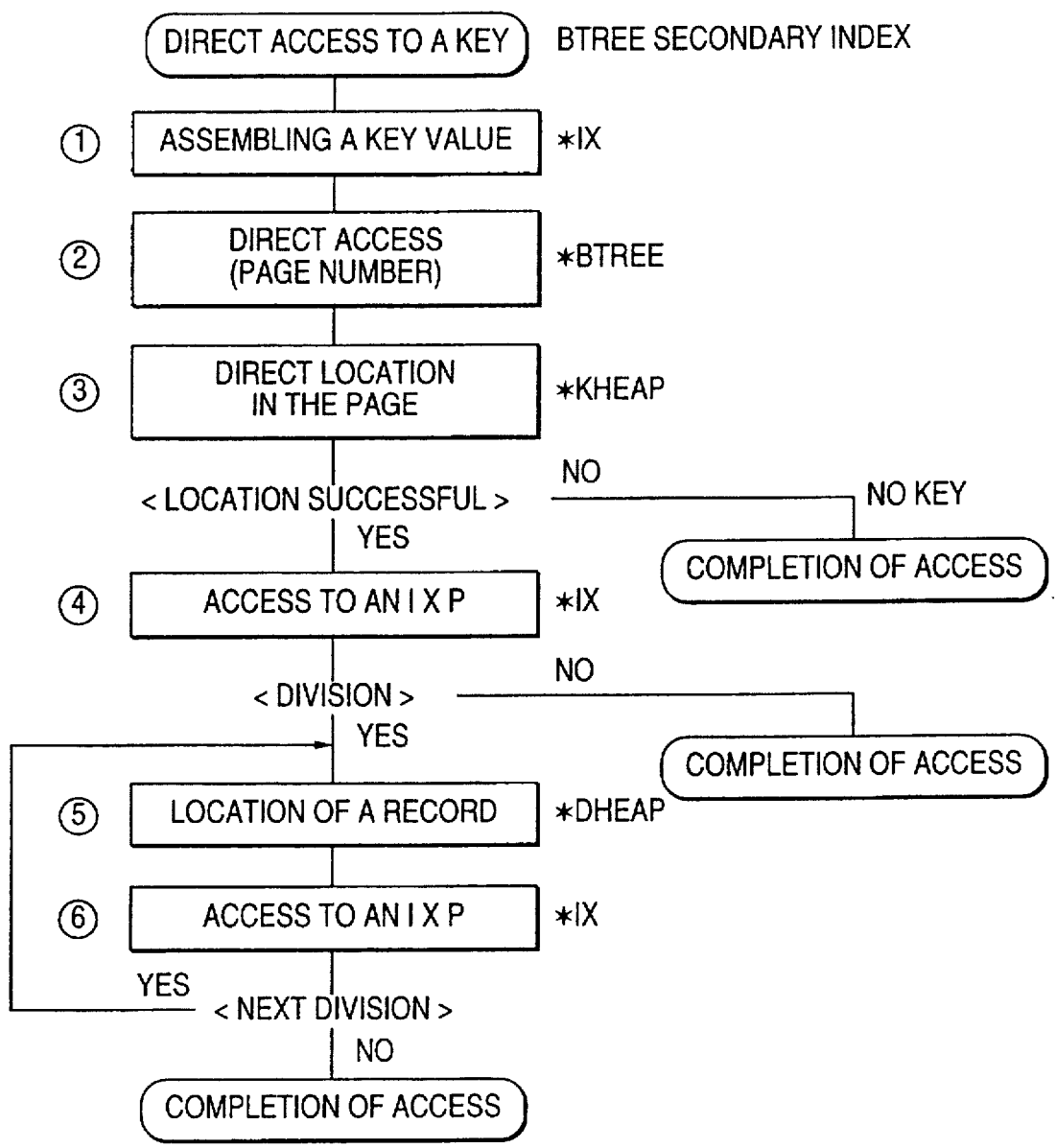

FIG. 10 shows a second example of database processing procedure for directly accessing data with keys for a similar Btree secondary index structure.

In this case, too, a procedure is generated as shown in FIG. 10 by combining access parts to basic data organizations.(steps 2, 3, and 5) and library parts relating to the combination (steps 1, 4, 6) based on an assembly pattern of direct access to keys associated with the Btree secondary index structure. Each of these processes can be anticipated by the above described explanation of the access part to basic data organizations and the library parts relating to the combination. Thus, the detailed explanation will be skipped.

Figure 11A:
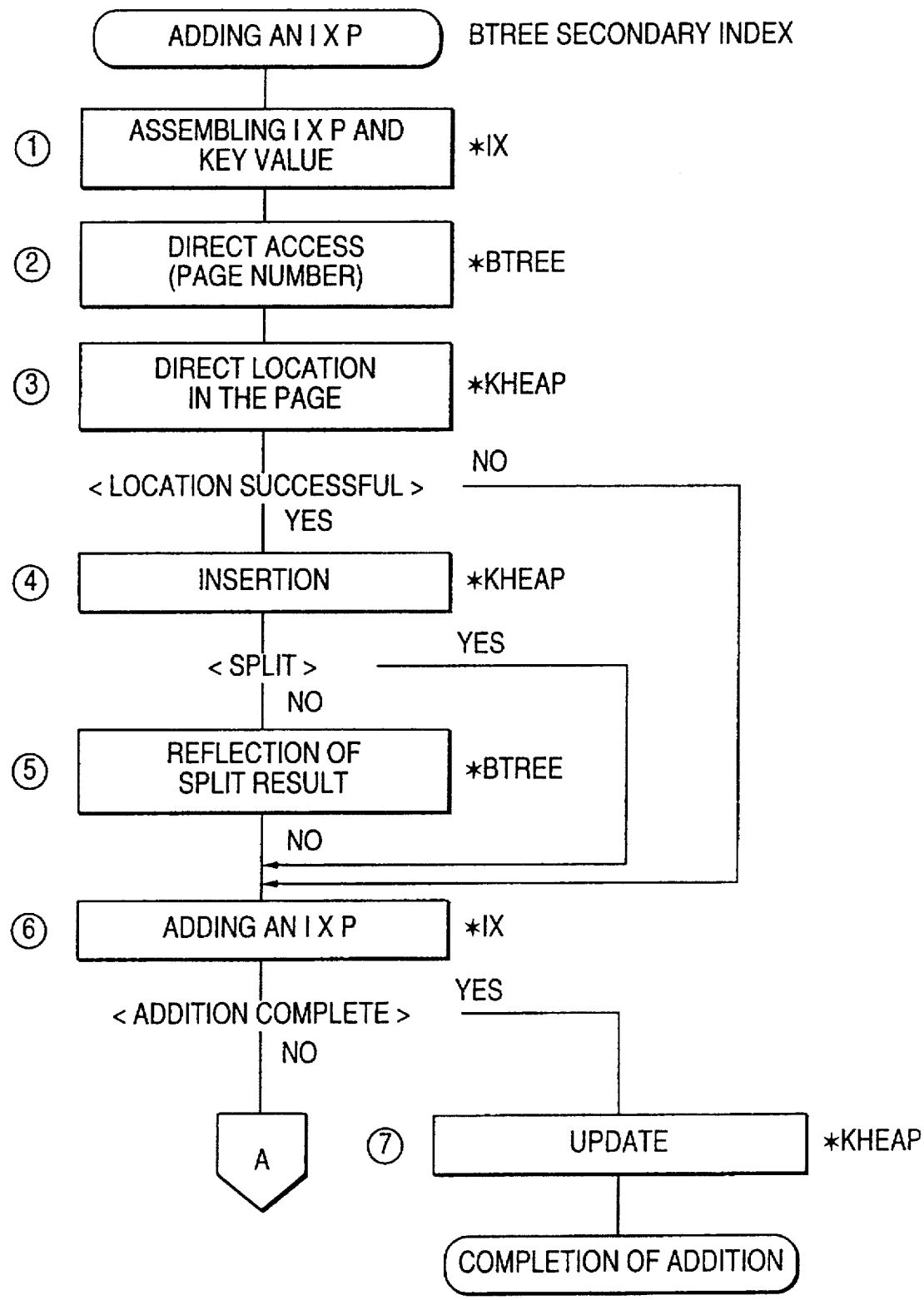

FIG. 11A shows a third example of database processing procedure for adding an index pointer IXP to the Btree secondary index structure.

In this case, too, the procedure can be generated by the optimizing unit 11 shown in FIG. 2A by combining access part to basic data organizations (steps 2, 3, 4, 5, 7, 8, 10, 12, 13, and 14) and library parts relating to the combination (steps 1, 6, 9, and 11) according to the assembly patterns.

Figure 11B:
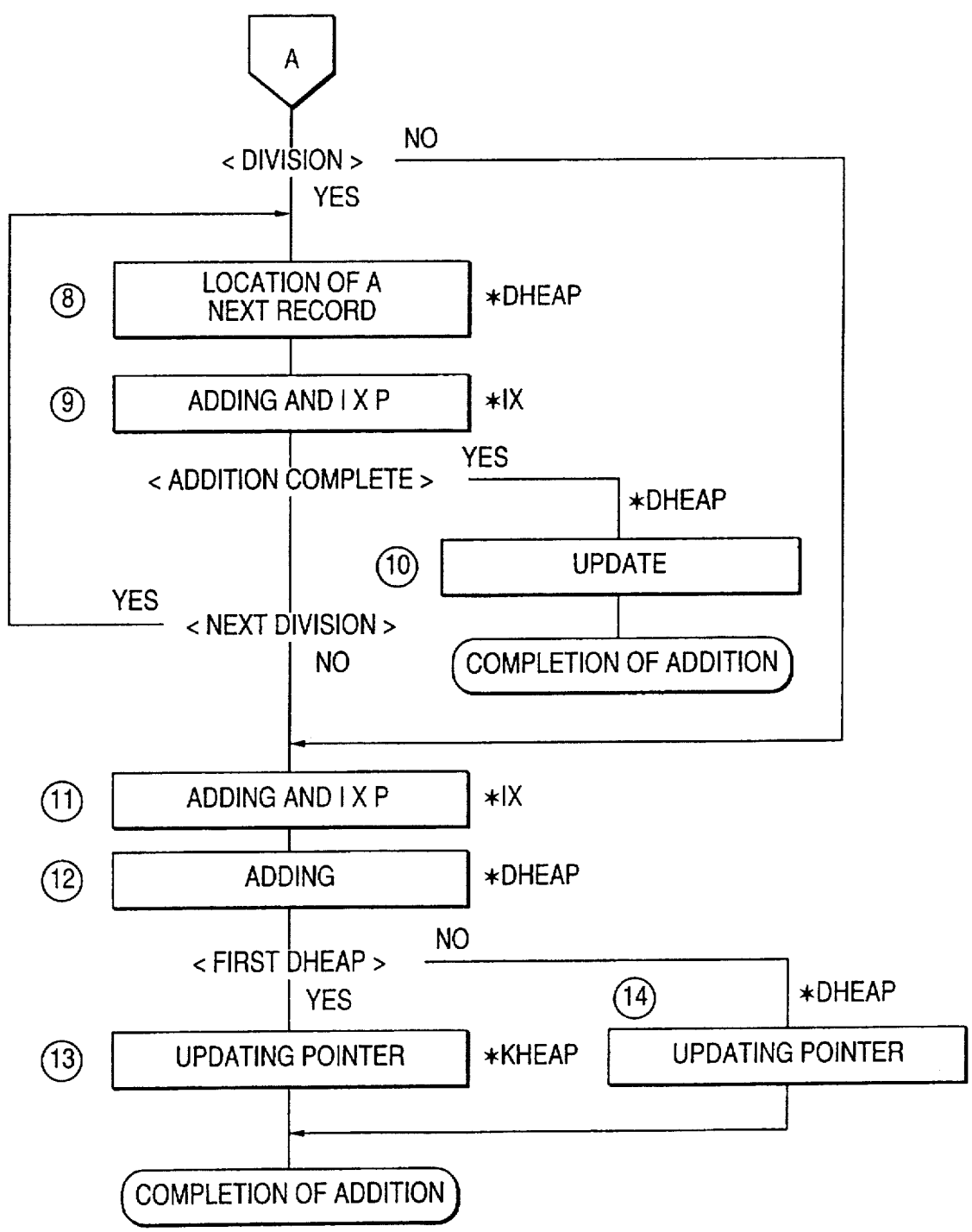
Figure 11C:
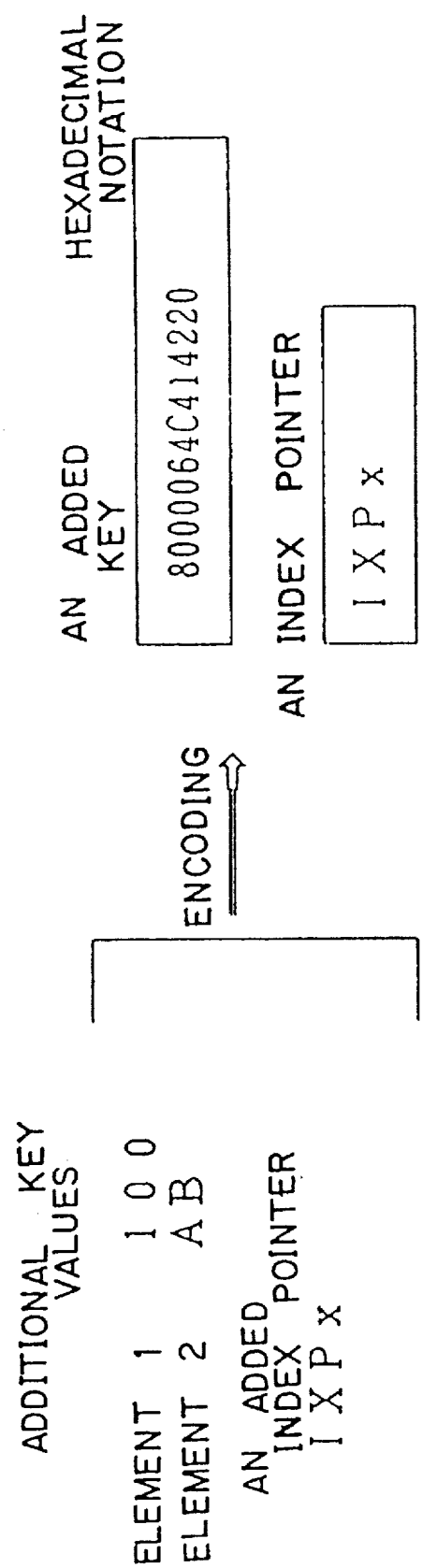
Figure 11F:
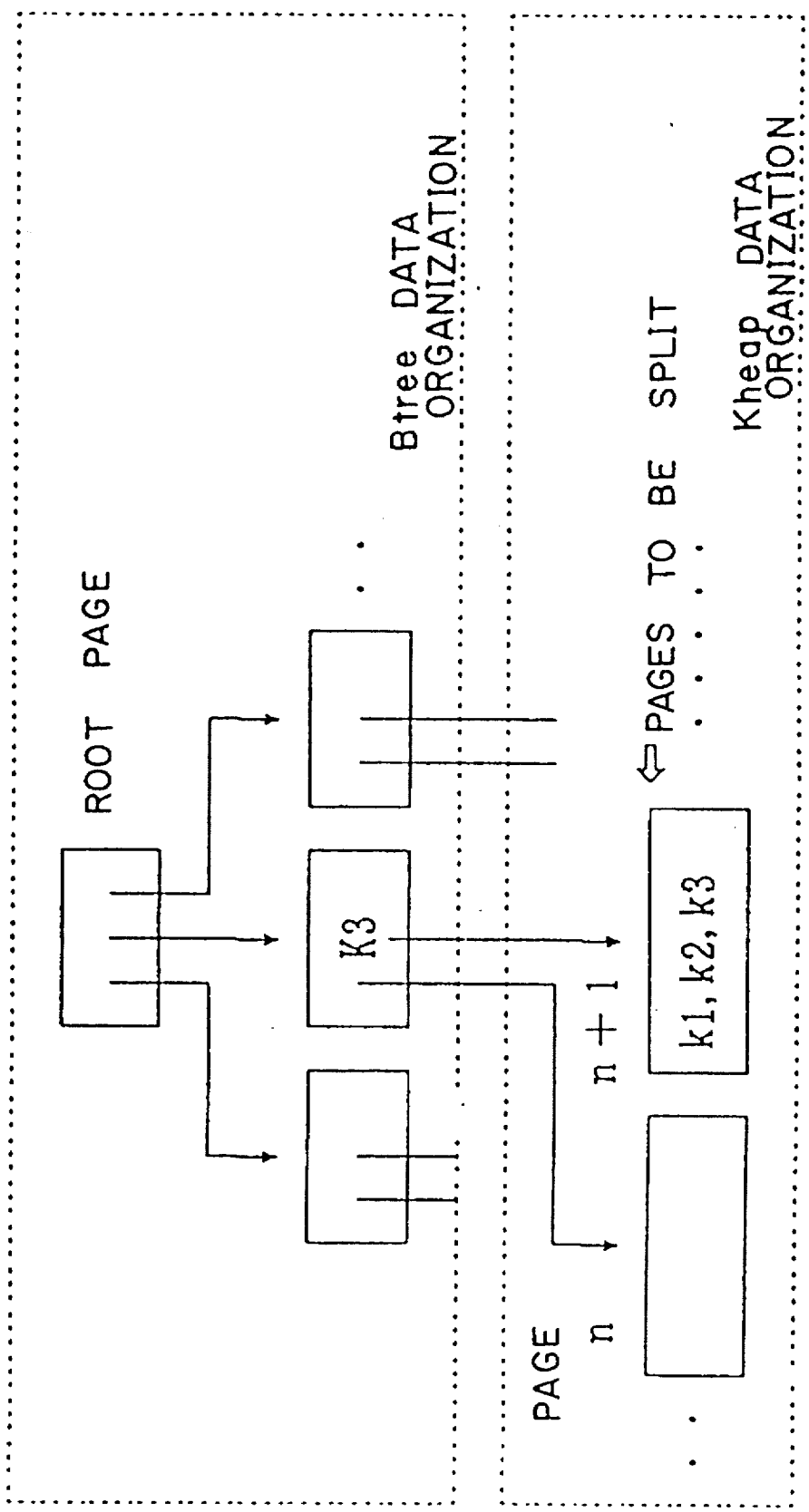
Figure 11G:
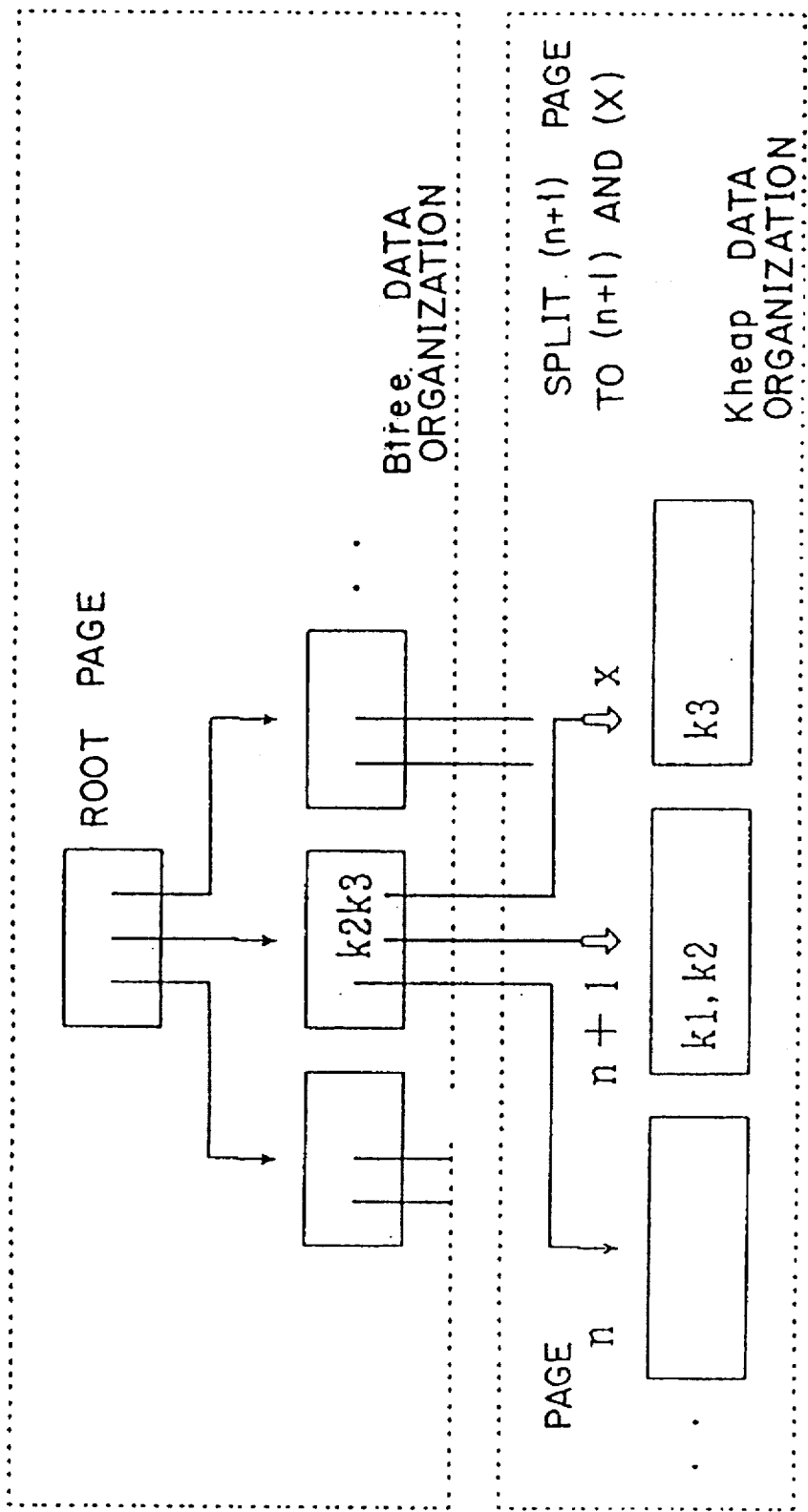
Figure 11H:
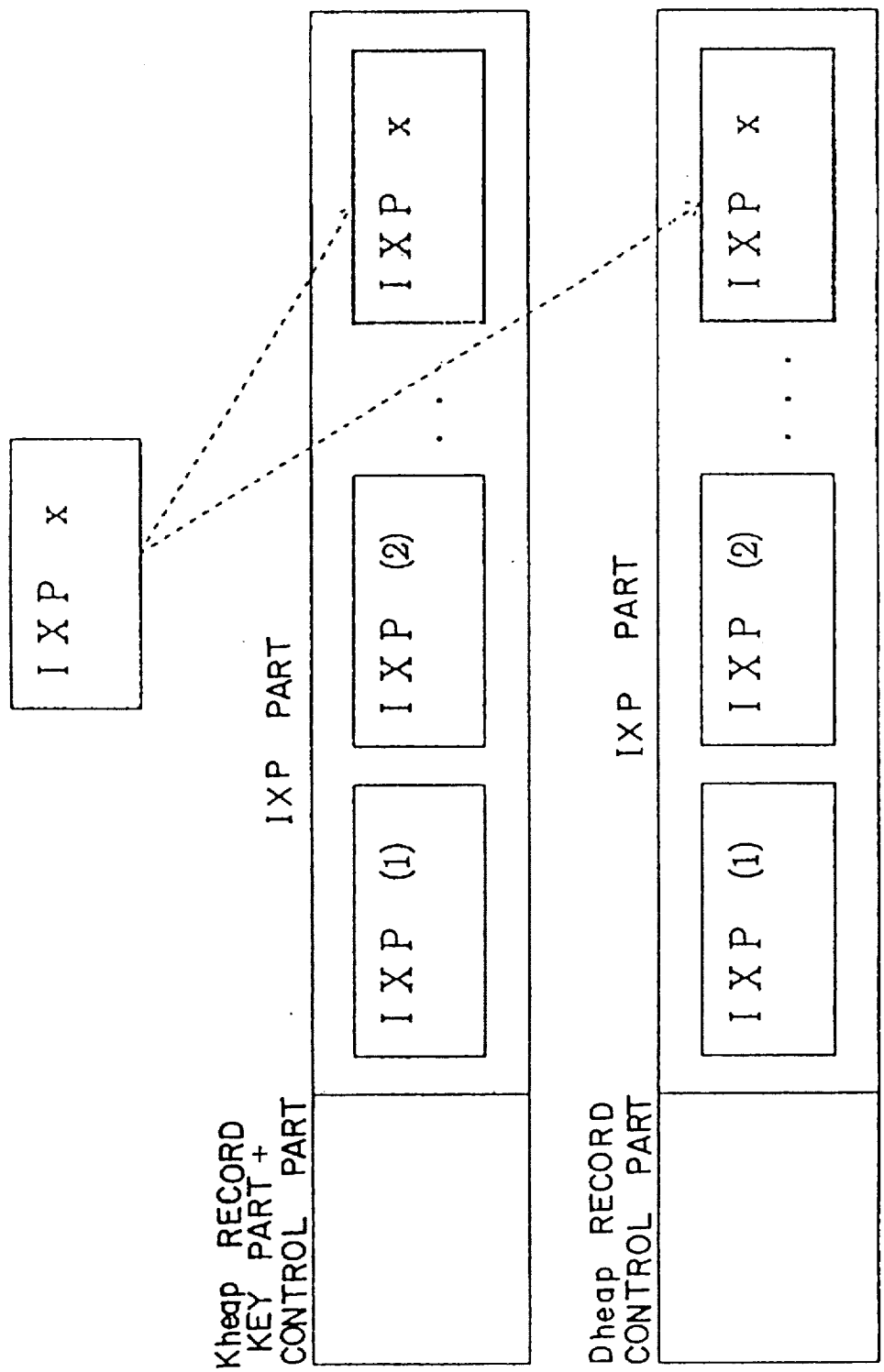
Figure 11:
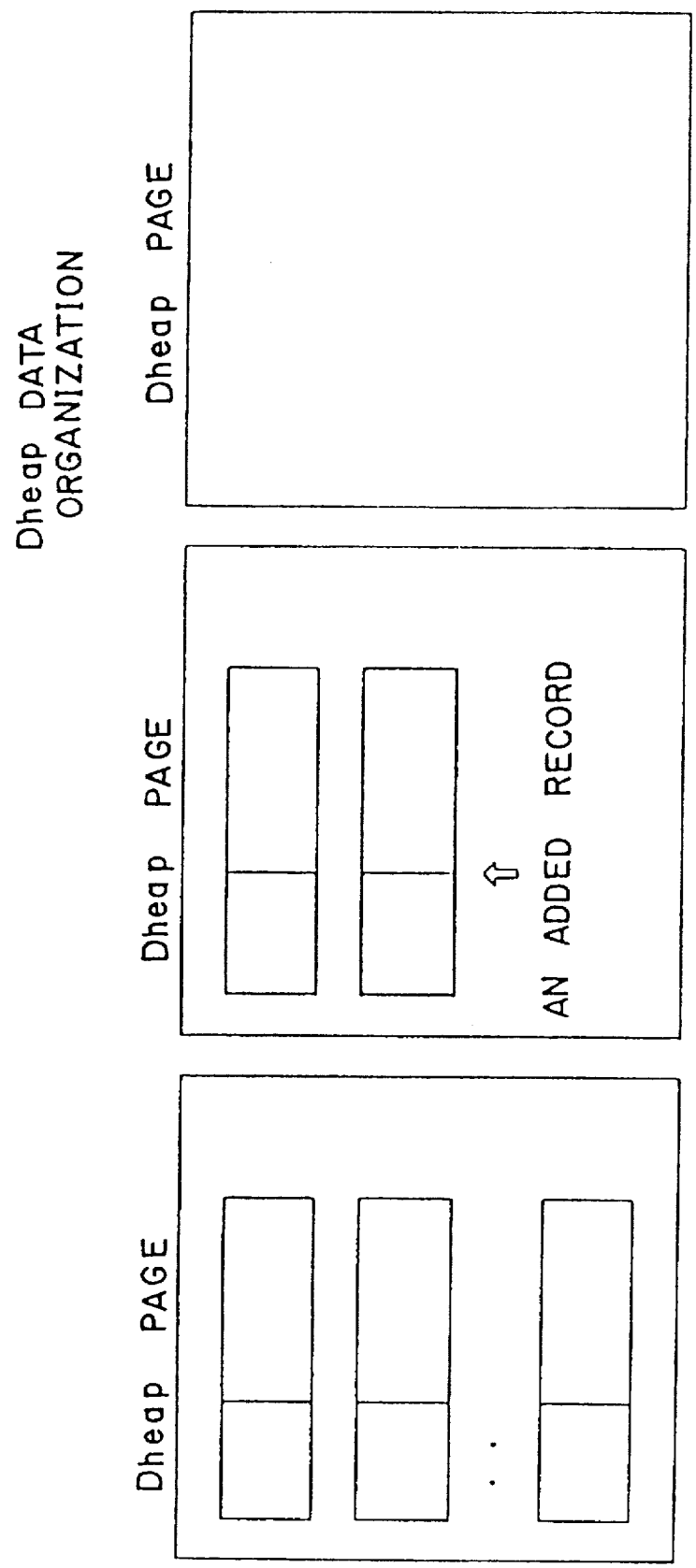
Figure 11:
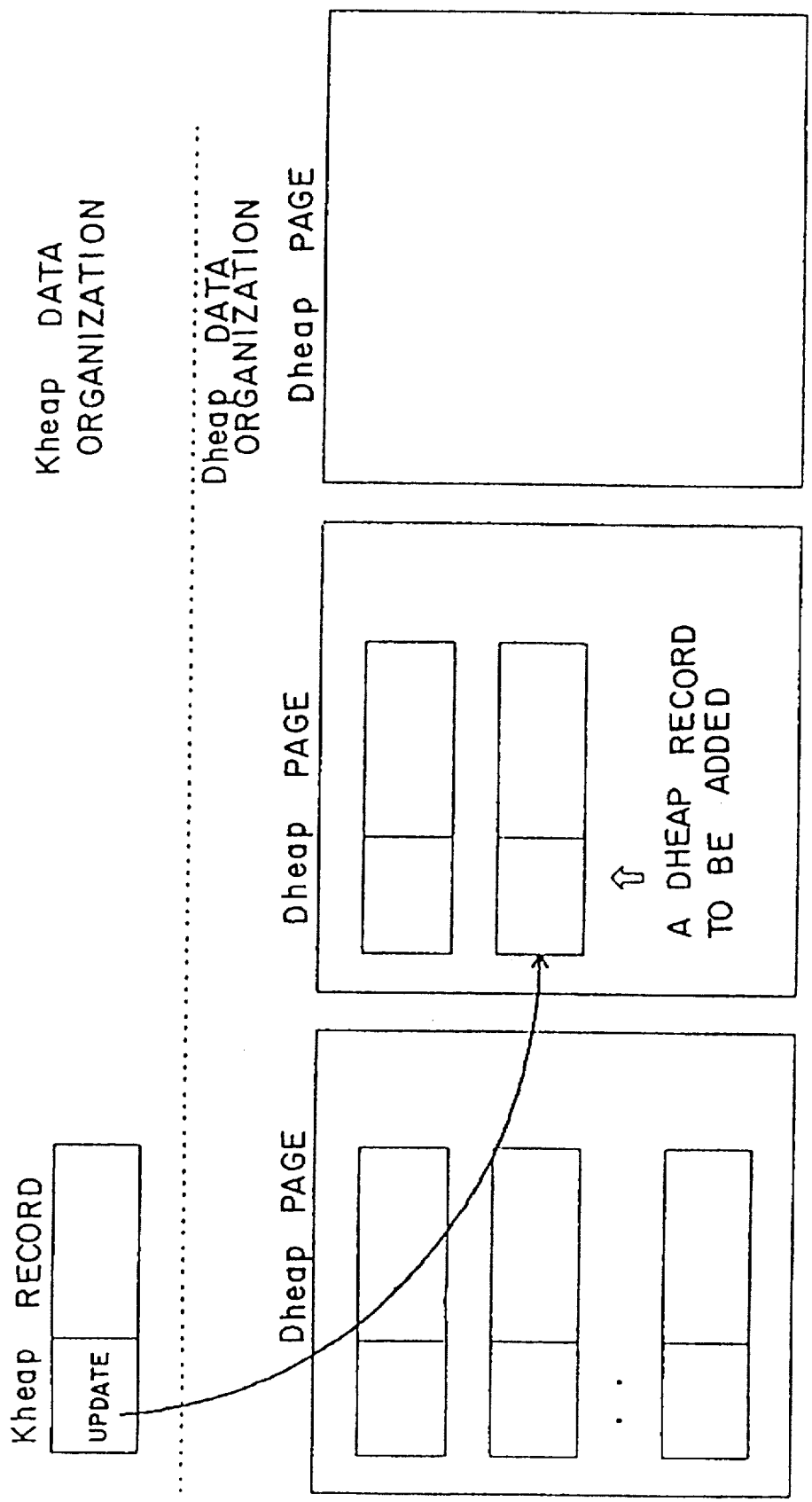

Respective steps shown in FIGS. 11 A and 11 B are explained more in detail.

1 Composition of an index pointer and a key value (*IX)

A retrieval starting and ending key values are generated to show the retrieval range. The key values can be easily obtained by encoding data values as shown in FIG. 11C and composing index pointers to facilitate the comparison with multi-element key values.

FIG. 11C shows example of composing an index key and an index pointer:

2 Direct access (page number)(*Btree)

Refer to FIG. 9C.

3 Intra-page direct location (*Kheap)

Refer to FIG. 9D.

4 Insertion (*Kheap)

The key value of a Kheap record composed as described in 1 above is added to a Kheap data organization. An example of insertion to an existing page is shown in FIG. 11D. A record in inserted between a key 40 and a key 50 after making space for the record to be inserted. An example of split insertion is shown in FIG. 11E. Records in this page should be split into two groups because they cannot be stored in on e Kheap page. Spaces should be made between a key 40 and a key 50 for the record to be inserted.

5 Reflecting a splitting result (*Btree)

When a Kheap page is split, the key value indicating the central point of the split is registered into the existing entries, reserving a new entry and adding an entry having the maximum (maximum before splitting) key value.

If a new entry cannot be contained in the leaf Btree page, data must be splited in the Btree organization.

An example of a three-layer Btree data organization is shown in FIG. 11F. "n" is obtained based on a retrieval starting key value. Reflection of a splitting result is shown in FIG. 11G. In the Btree organization, the entry having the key value K3 which indicates the page "n+1" is modified to the entry "k2", and the entry "k3" indicates the page "x".

6 Addition of an IXP (*IX)

Information to be inserted in the index pointer part in a record in the Kheap data organization or the Dheap data organization is obtained in the working area. Refer to FIG. 11H.

7 Update (*Kheap)

A data part (index pointer part) in the Kheap data organization is updated using the information for inserting an index pointer.

8 Locating a record (*Dheap)

Refer to FIG. 9F.

9 Adding an IXP .(*IX)

Refer to "6".

10 Update (*Dheap)

A data part (index pointer part) in the Dheap data organization is updated using the information for inserting an index pointer.

11 Adding an IXP (*IX)

Refer to "6".

12 Addition (*Dheap)

A new Dheap record is added to the Dheap data organization using the specified data, as shown in FIG. 11 I.

13 Updating a pointer (*Kheap)

A pointer in a Kheap page to a Dheap page is updated to the specified value as shown in FIG. 11J. This is performed when a Dheap record is inserted for the first time.

14 Updating a pointer

Figure 11K:
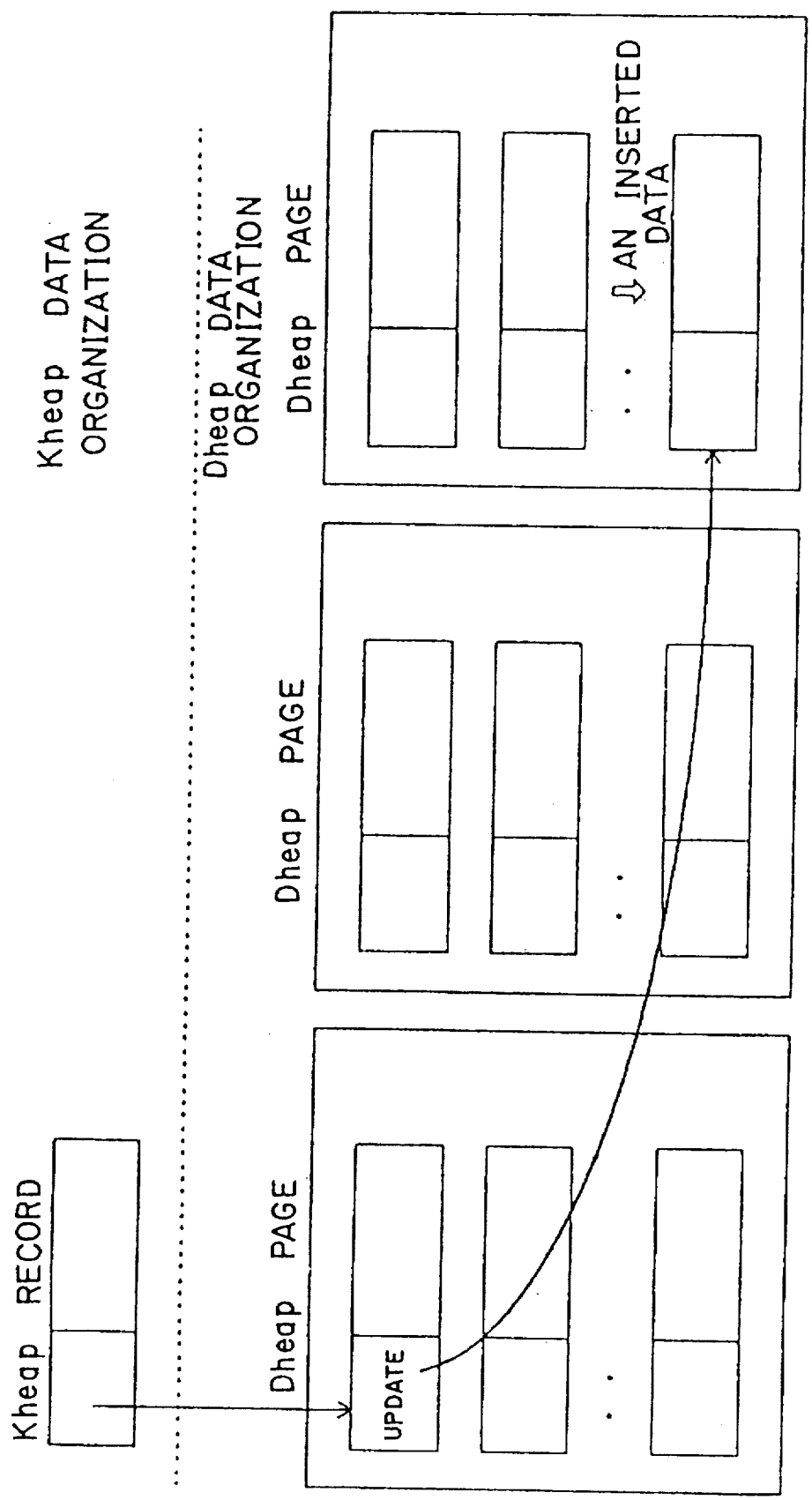

A pointer in a Dheap page to the next Dheap page is updated to the specified value as shown in FIG. 11K. This is performed when the second and the following Dheap records are inserted to a Kheap record.

Figure 12A:
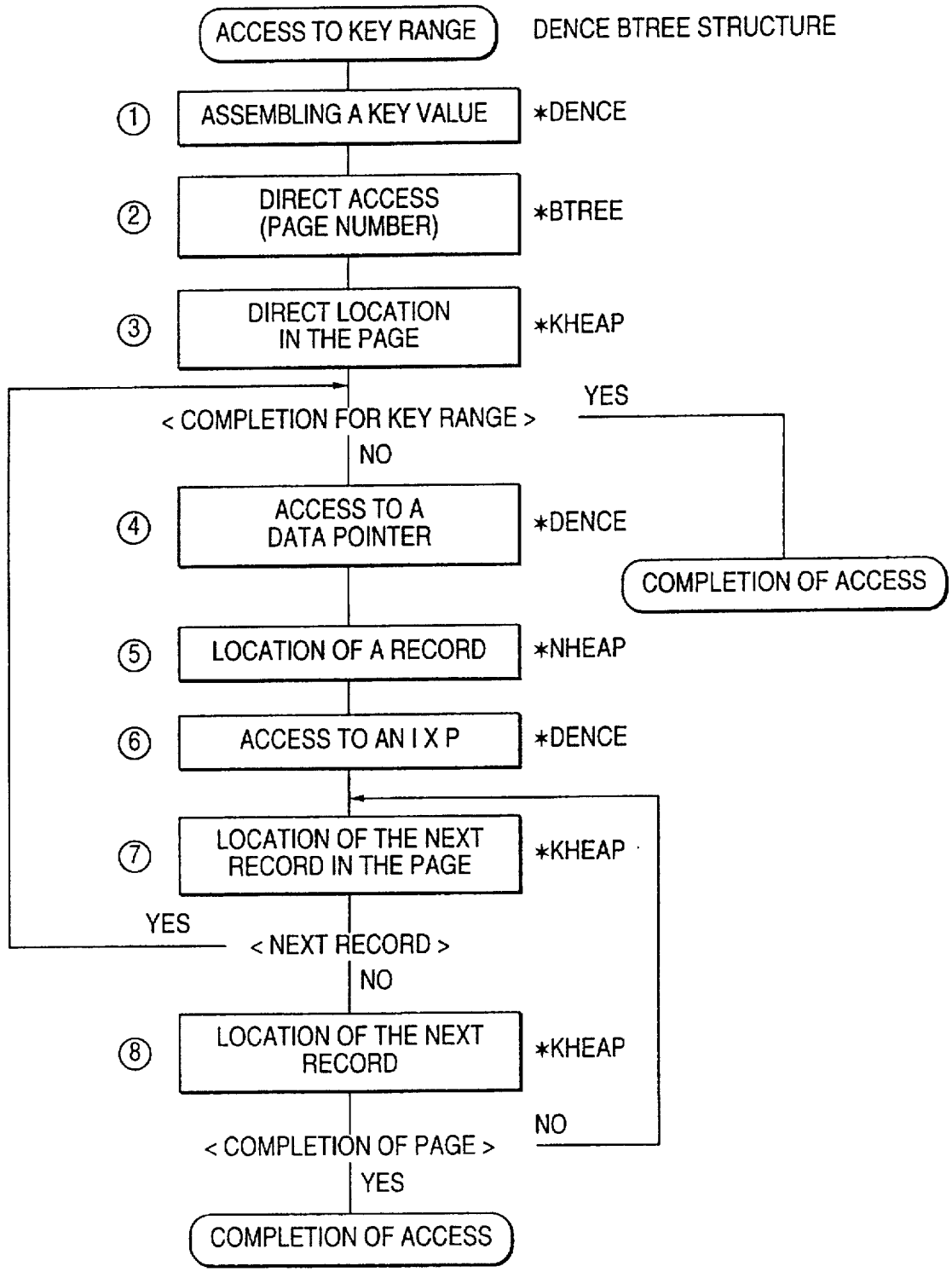

FIG. 12A shows a fourth example of a database processing procedure for accessing to data in the order of key ranges.

To access to data in the dense Btree structure shown in FIGS. 5 and 6 in the order of key ranges, access parts to basic data organization and library parts (*Dense) are arranged as shown in steps 1–8 according to the assembly patters, thus realizing the access to data in the order of key ranges for the dense Btree structure.

Respective steps shown in FIG. 12A are explained in more in detail.

1 Composition of a key value (*Dense)

A start-of-retrieval key value and an end-of-retrieval key value are generated to show the retrieval range. The key value can be obtained by encoding a data value for facilitating the comparison with multi-element key values. For detailed information, refer to the composition of a key value of *IX.

2 Direct access (page number) (*Btree)

Refer to FIG. 9C.

3 Intra-page direct location (*Kheap)

Refer to FIG. 9D.

4 Obtaining a data pointer (*Dense)

Figure 12B:
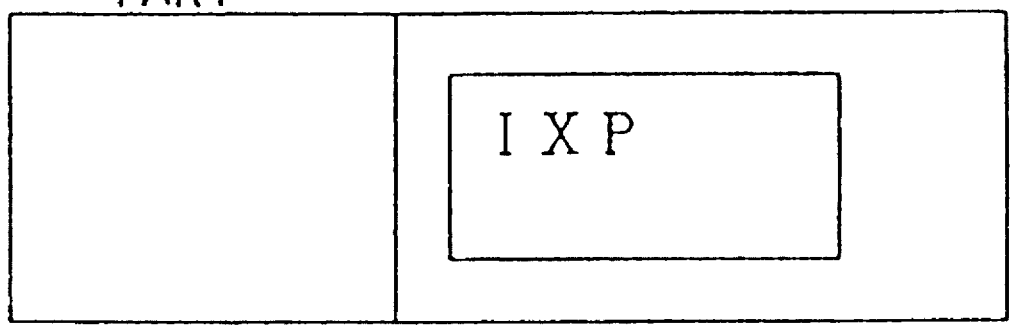

An index pointer can be obtained in the index pointer part of the located record in the Kheap data organization as shown in FIG. 12B.

5 Location of a record (*Nheap)

Figure 12C:
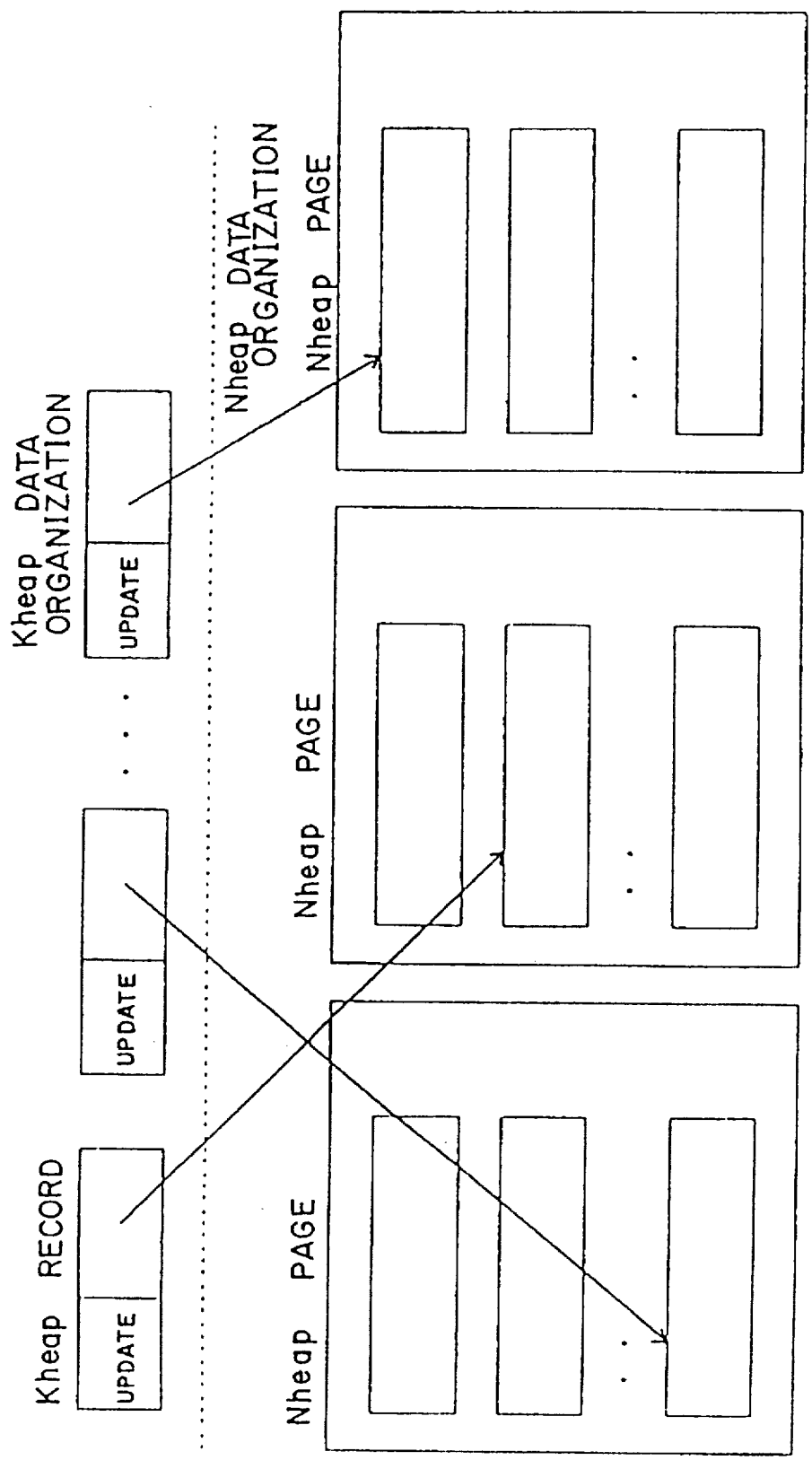

As shown in FIG. 12C, a location is performed for an Nheap record by an index pointer i.e. a pointer to an Nheap record obtained by the above 4. A page number and an intra-page relative information are to be obtained as located information.

6 Obtaining data (*Dense)

Figure 12D:
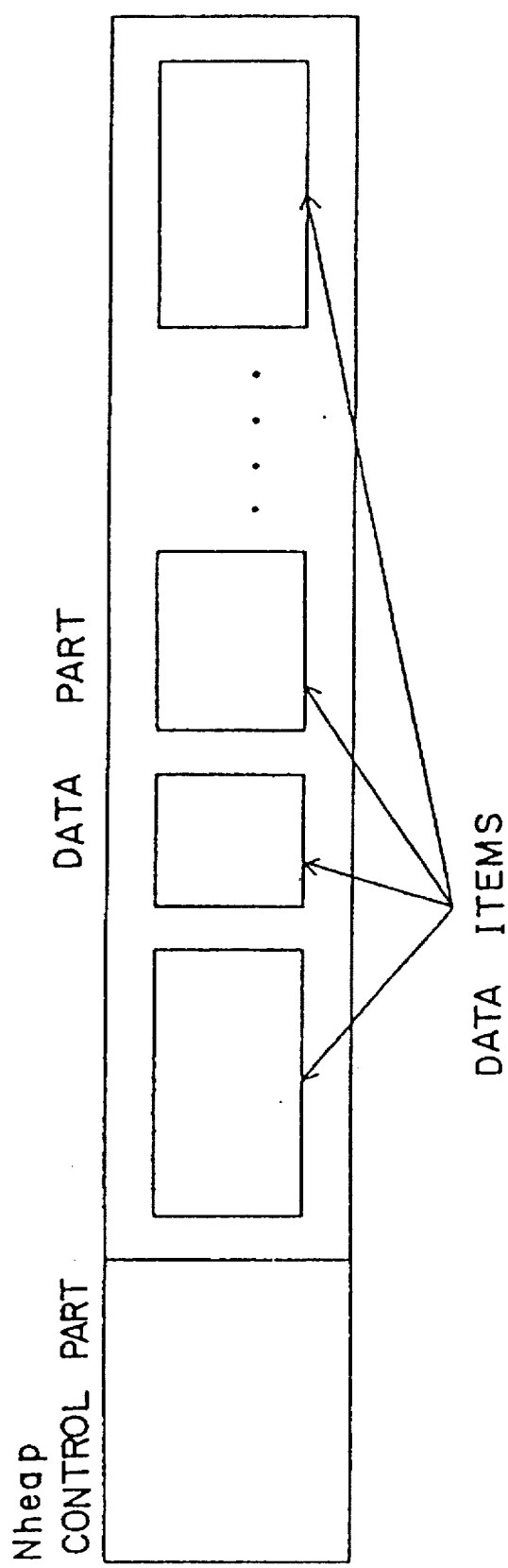

Data having specified data items are obtained in the record data part of the Kheap data organization as shown in FIG. 12D.

7 Location the next record in the page (*Kheap)

Refer to FIG. 9G.

8 Locating the next page (*Kheap)

Refer to FIG. 9H.

Figure 13:
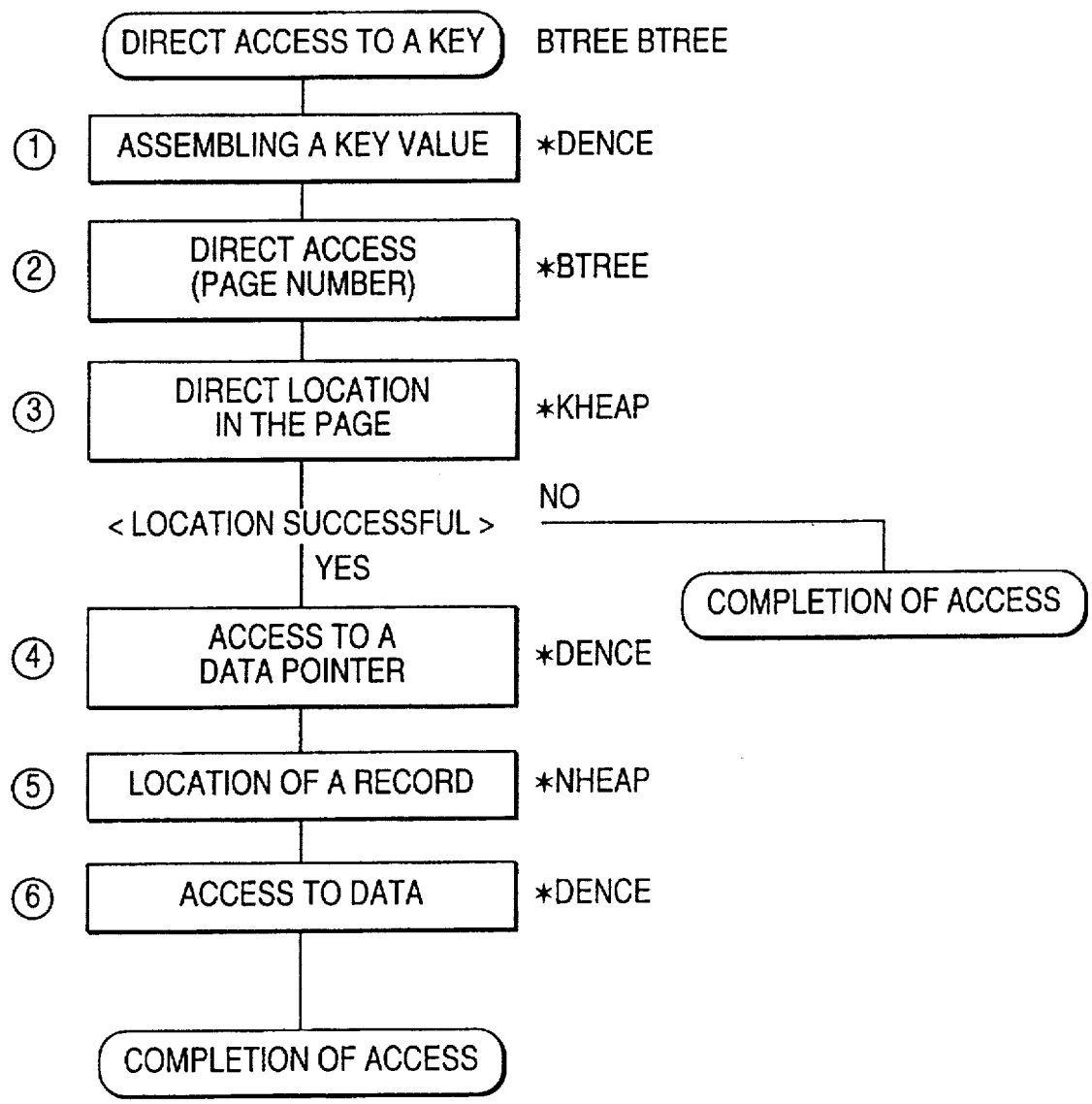

FIG. 13 shows the database processing procedure for accessing to keys directly for the dense Btree structure.

FIG. 12A shows an example of accessing to data in the order of key ranges; FIG. 13 shows an example of accessing to keys directly by changing the combination of access parts to basic data organizations and library parts relating to the combination, thereby providing a fifth example of a database processing procedure.

Figure 14A:
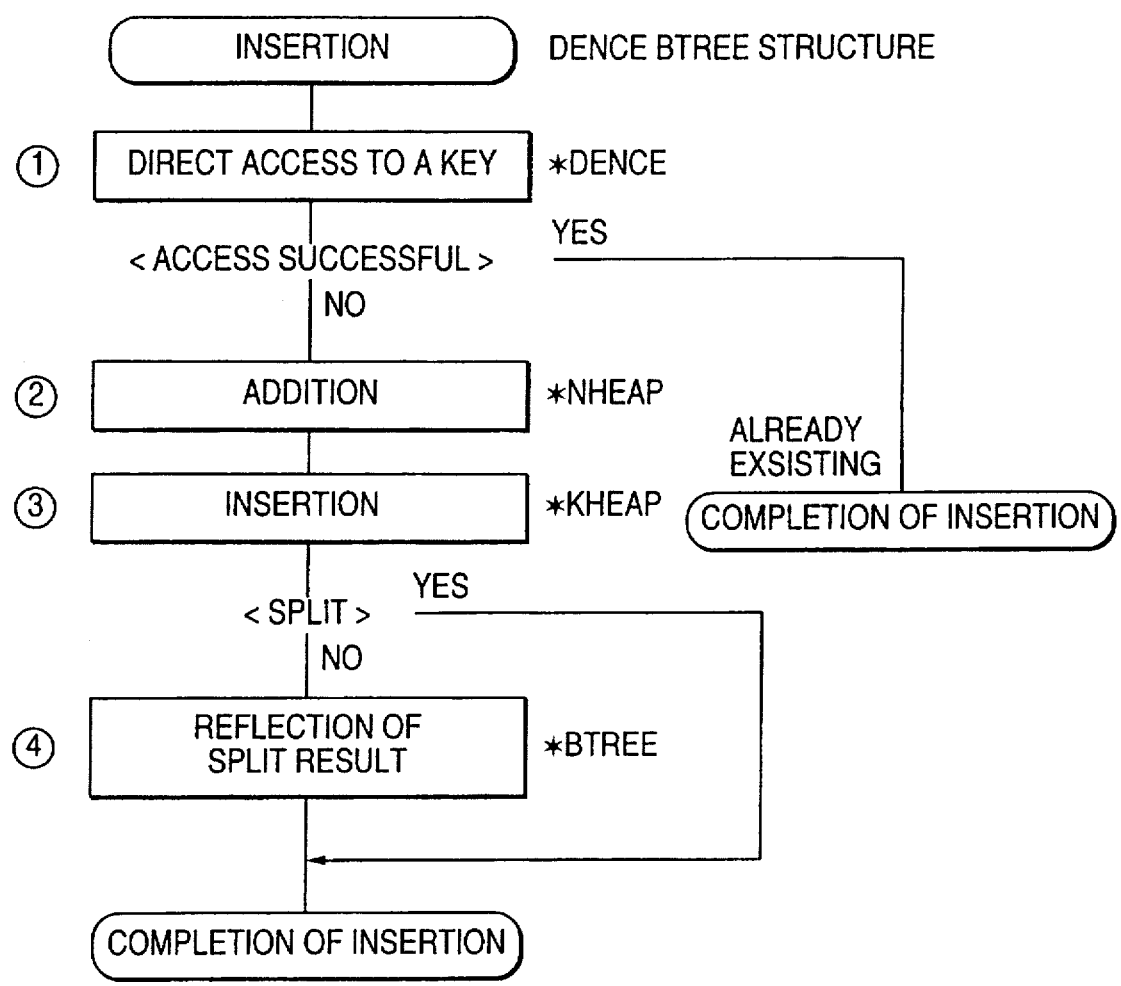

FIG. 14A shows a sixth example of a database processing procedure for inserting data in the dense Btree structure.

The process of each access part is described above and, as shown in FIG. 14A, the process of inserting data in the dense Btree structure can be realized by arranging access parts and library parts relating to the combination.

Figure 14B:
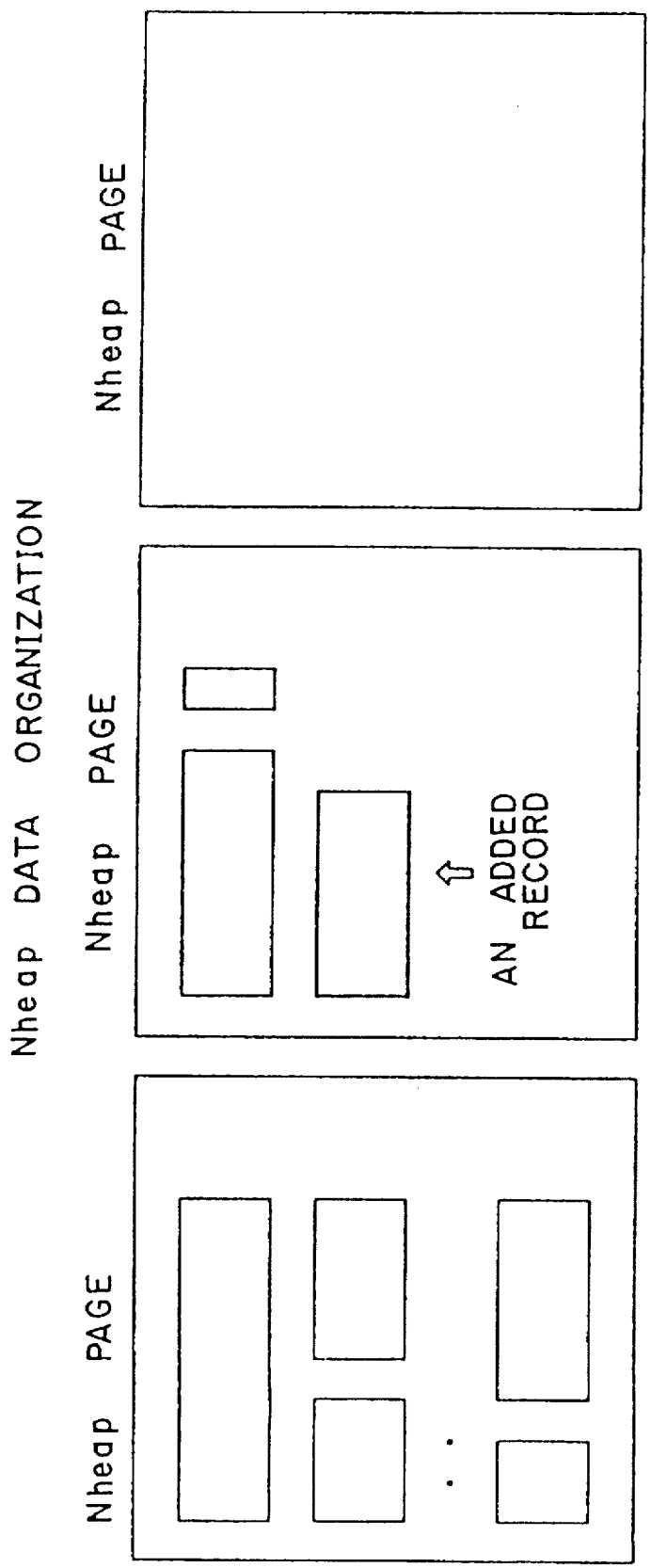

Step 2 of FIG. 14B is shown in FIG. 11B more in detail.

A new Nheap record is added to the Nheap data organization using specified data.

Figure 15A:
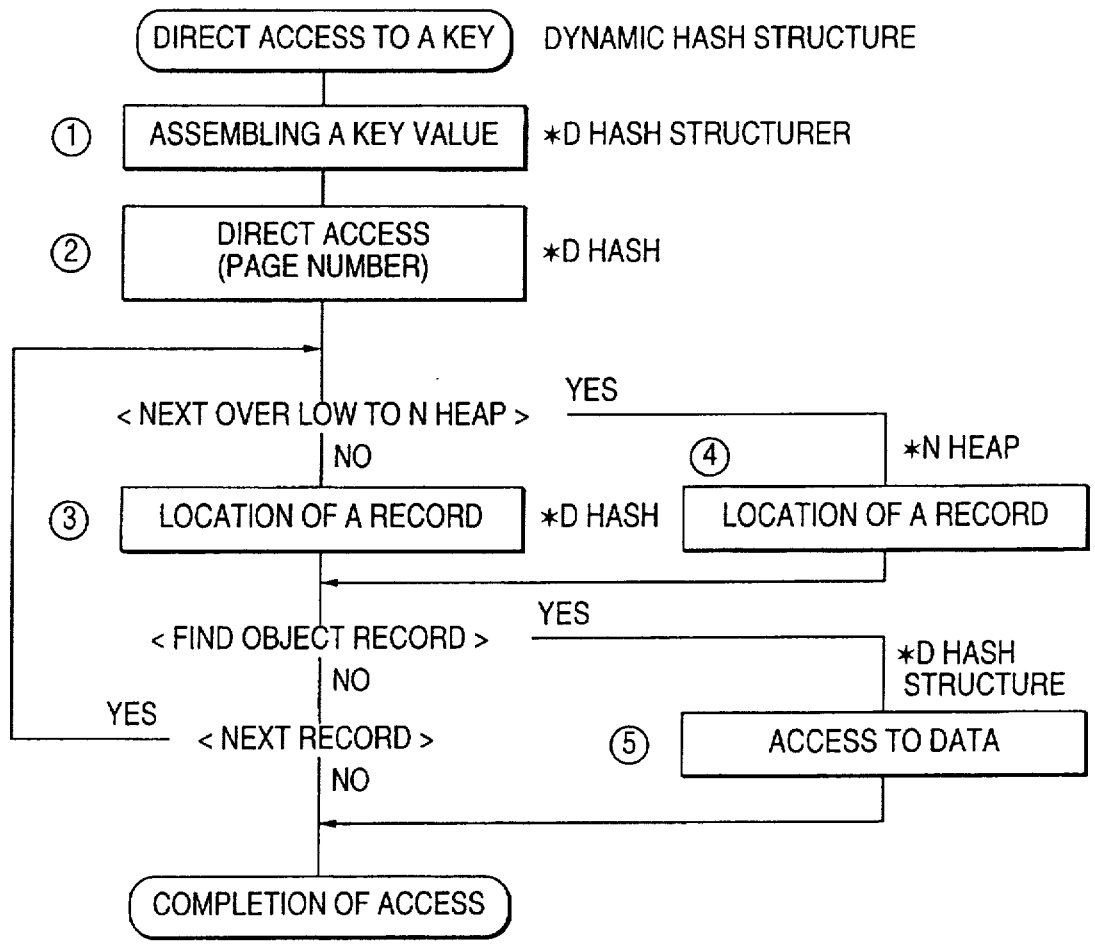

FIG. 15A shows a seventh example of a database processing procedure for directly accessing to keys in the dynamic hash structure.

The access parts (*Dhash) mainly in the Dhash data organization are used as access parts to basic data organizations, and if an overflow arises, access parts in the Nheap data organization (Positioning of records by *Nheap) are used. A process of assembling key values in the dynamic hash structure (step 1 ) and a process of accessing to data (Step 5 ) are used as library parts relating to the combination.

Respective steps of FIG. 15A are explained more in detail.

1 Composition of a key value (*Dhash Structure)

Figure 15B:
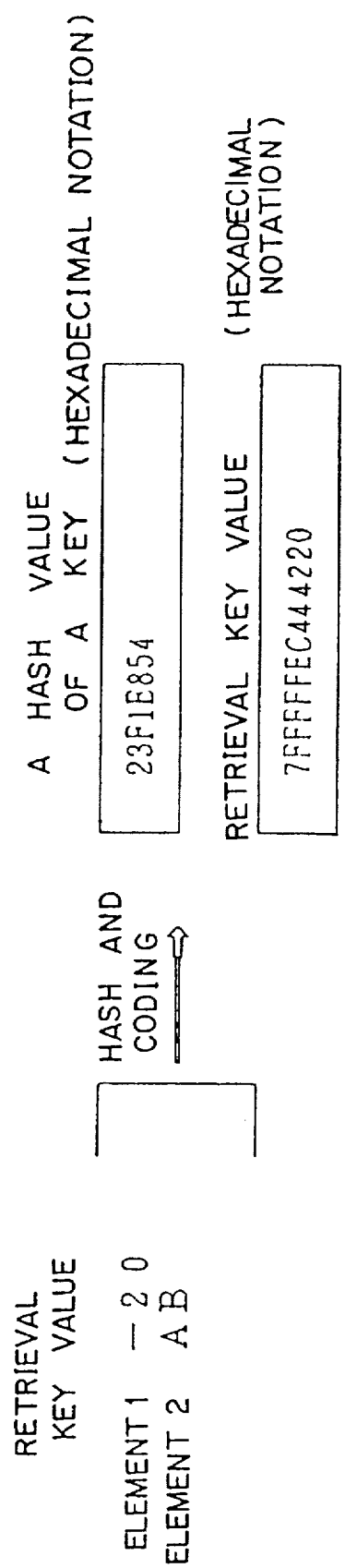

A hash value is generated based on a retrieval key value and a key value. A key value can be obtained by encoding a data value for facilitating the comparison with multielement key values. An example of encoding a multielement key is shown in FIG. 15B.

2 Direct access (page number) (*Dhash)

Figure 15C:
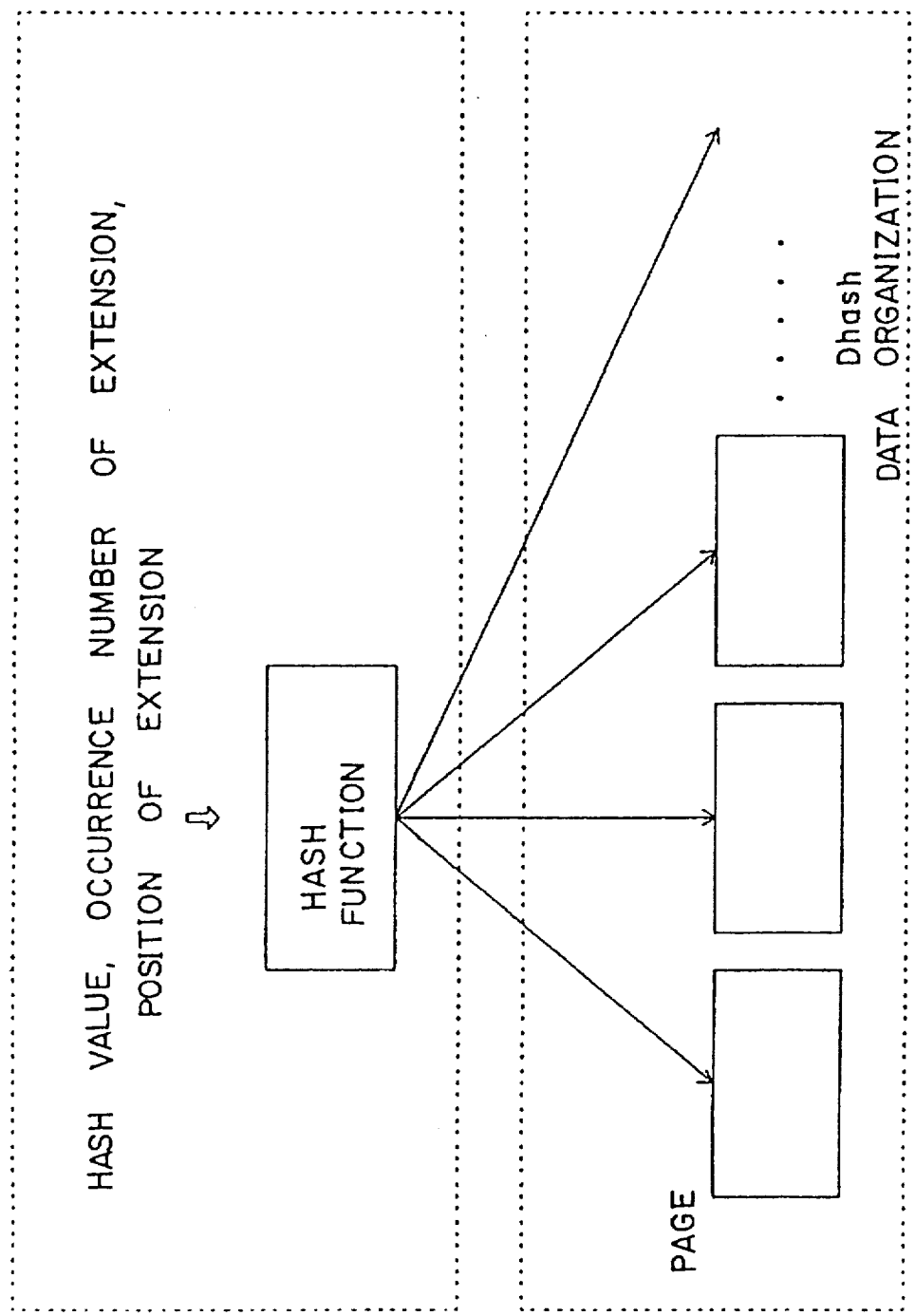

A Dhash data page number corresponding to a retrieval bucket is obtained from a hash function using a hash value, occurrence number of dynamic hash extension, and position of extension, as shown in FIG. 15C.

3 Locating a record (*Dhash)

Figure 15D:
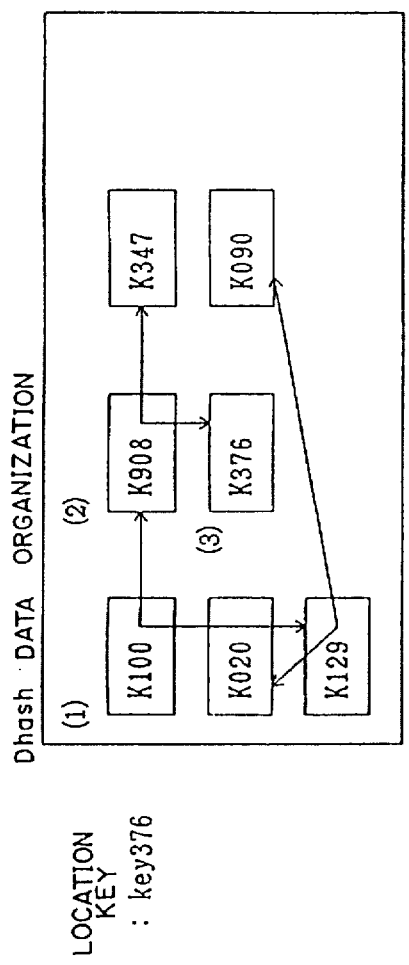

A record having the specified Dhash key is located by searching Dhash records sequentially based on a Dhash key value and a hash value, as shown in FIG.15D. A target record can be located by tracing records from (1) to (3).

4 Locating a record (*Nheap)

Figure 15E:
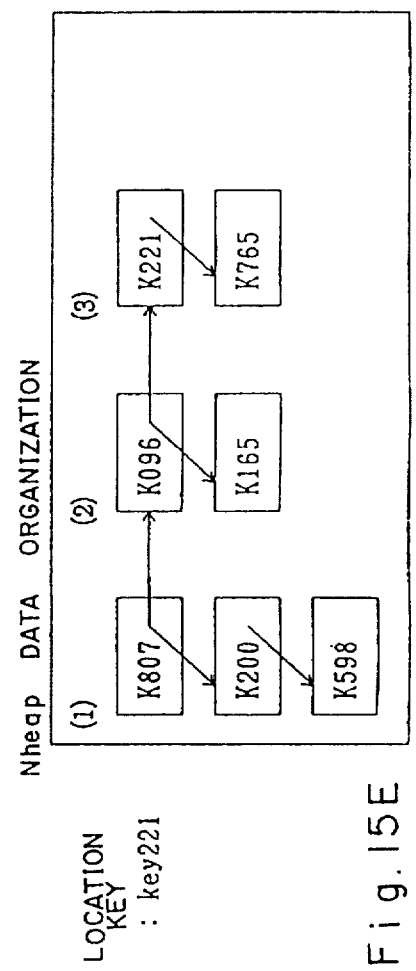

A record having the specified Dhash key is located by searching Nheap records sequentially based on a Dhash key value and a hash value as shown in FIG. 15E. A target record can be located by tracing records from (1) to (3).

5 Obtaining data (*Dhash Structure)

Figure 15F:
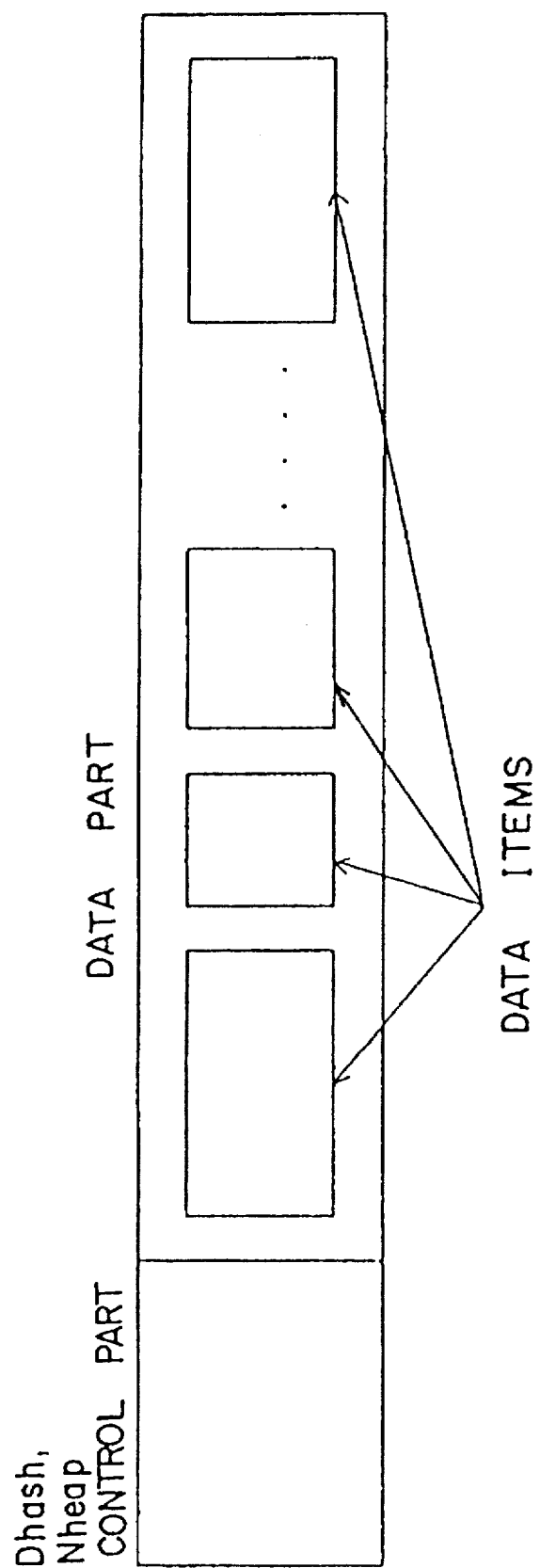

Data having specified data items can be obtained in the record data part of the located record in the Dhash data organization or the Nheap data organization as shown in FIG. 15F.

Figure 16A:
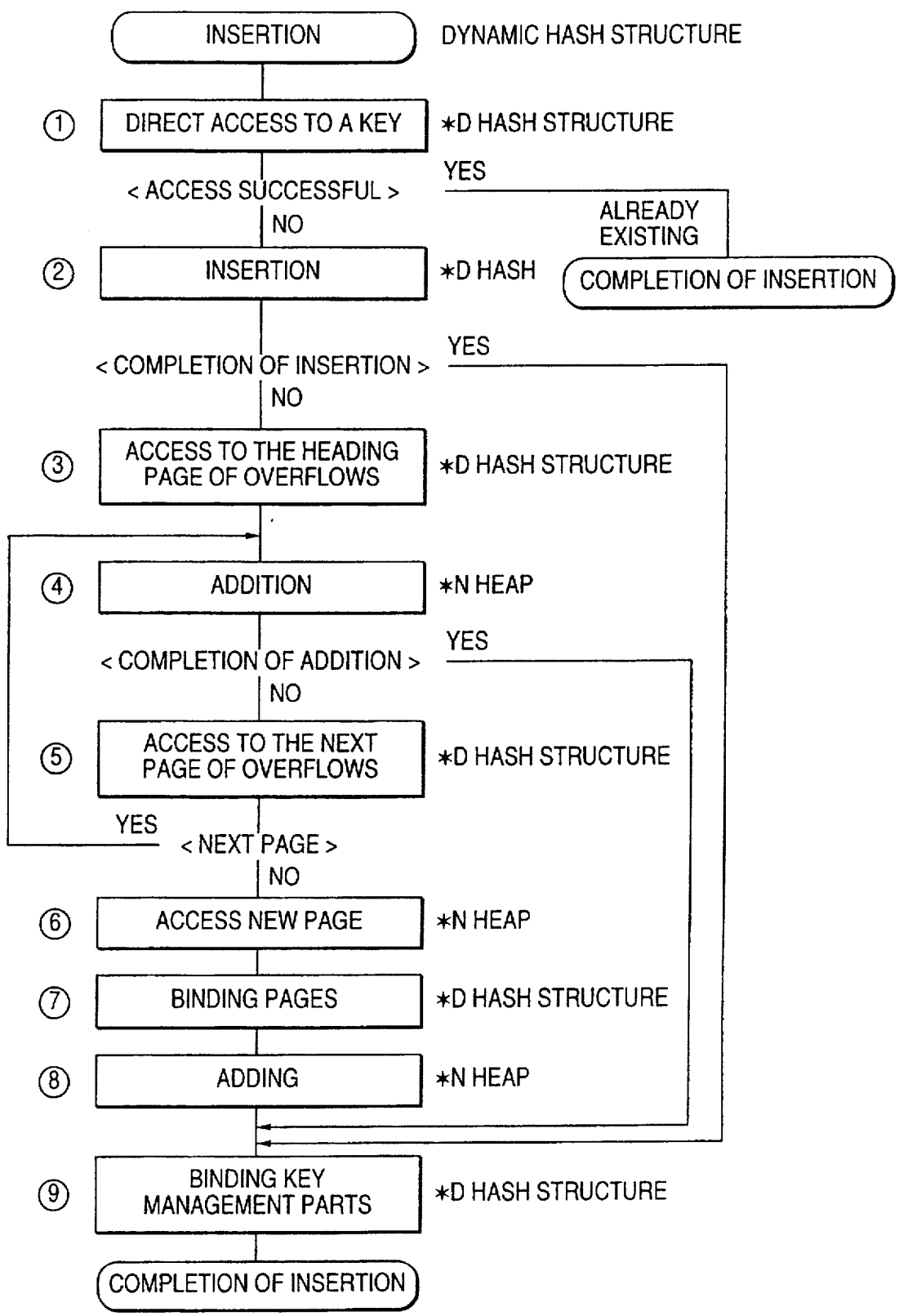

FIG. 16A shows eigth example of a database processing procedure for inserting data in the dynamic hash structure.

In FIG. 16A, steps 1, 3, 5, 7, and 9 show library parts relating to the combination, and the others show access parts for the Dhash data organization and the Nheap data organization. Based on this combination, the inserting process can be realized for the dynamic hash structure explained in FIGS. 7 and 8.

Respective steps shown FIG. 16A are explained more in detail.

1 Direct access to a key (*Dhash Structure)

Refer to FIG. 15C.

2 Insertion (*Dhash)

Figure 16B:
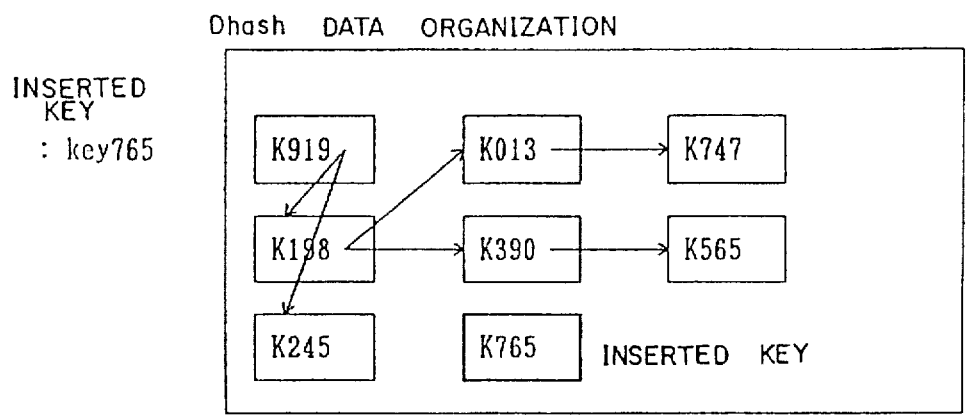

A Dhash record is inserted in a Dhash page using a Dhash key value and a hash value as shown in FIG. 16B. A target record can be located by tracing records sequentially from (1) to (3).

3 Accessing to the leading page of an overflowing part (*Dhash Structure)

Figure 16C:
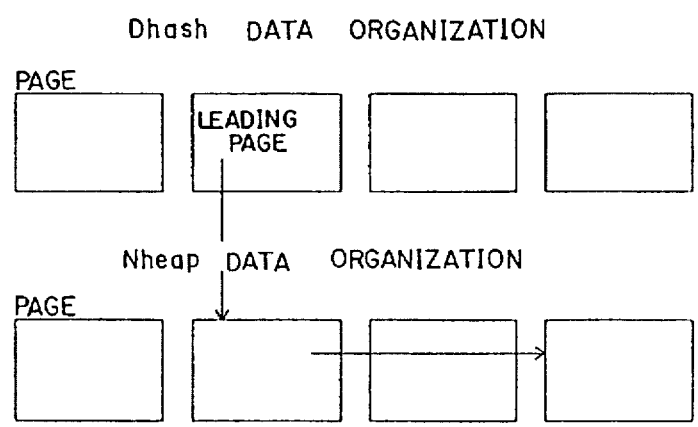

A page number can be obtained when records overflow from a Dhash data organization page to a Nheap data organization page as shown in FIG. 16C.

4 Addition (*Nheap)

Figure 16D:
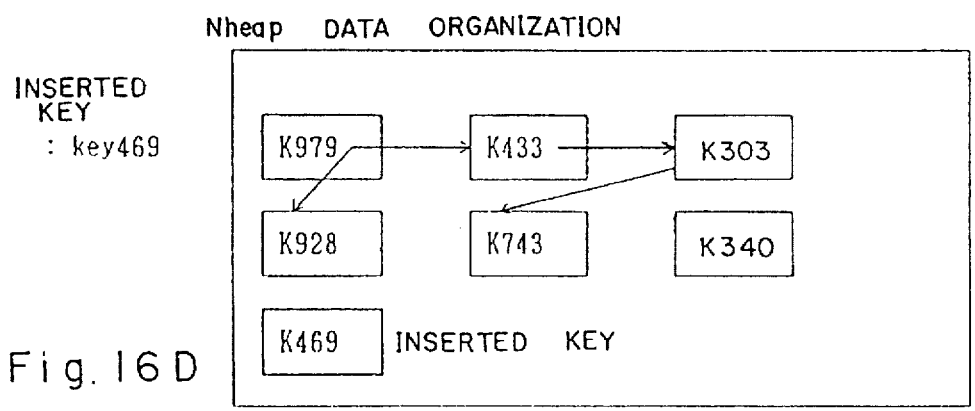

A Dhash record is inserted to a Nheap page based on a Dhash key value and hash value as shown in FIG. 16D.

5 Obtaining the next overflowing page (*Dhash Structure)

Figure 16E:
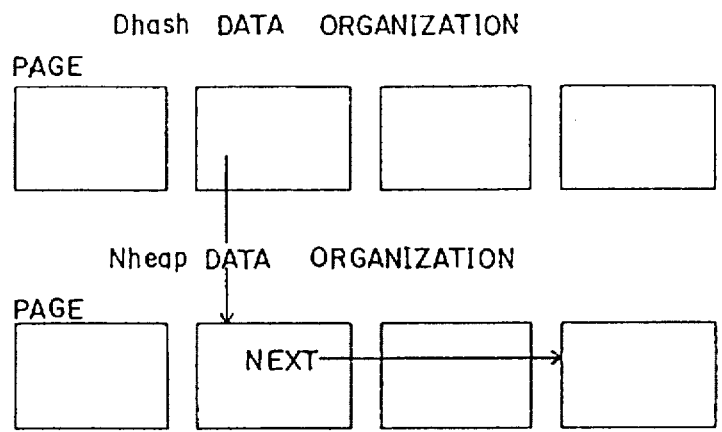

A page number of the next overflowing page in the Nheap data organization can be obtained from the current overflowing page in the Nheap data organization as shown in FIG. 16E.

6 Obtaining a new page (*Nheap)

Figure 16F:
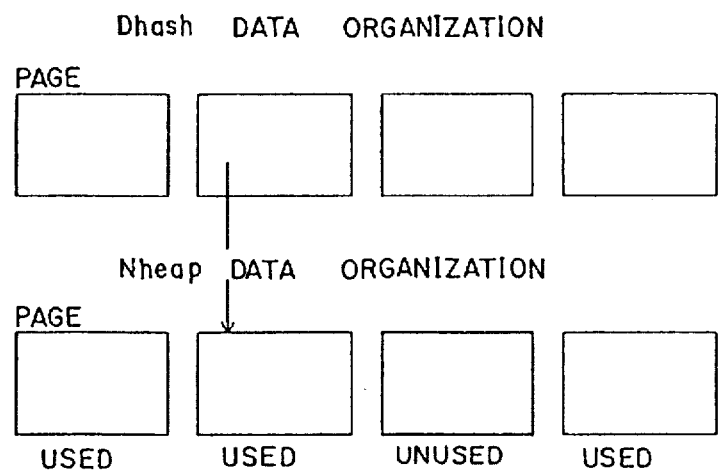

A new page can be obtained from the Nheap data organization as shown in FIG. 16F.

7 Combining pages (*Dhash Structure)

Figure 16G:
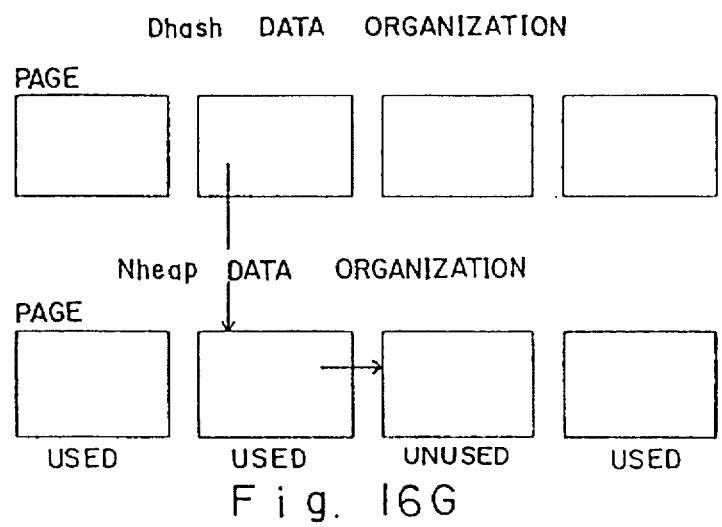

An unused Nheap page is combined with an existing page, as shown in FIG. 16G.

8 Addition (*Nheap)

Refer to "4".

9 Attaching a record to a key managing part (*Dhash Structure)

Figure 16H:
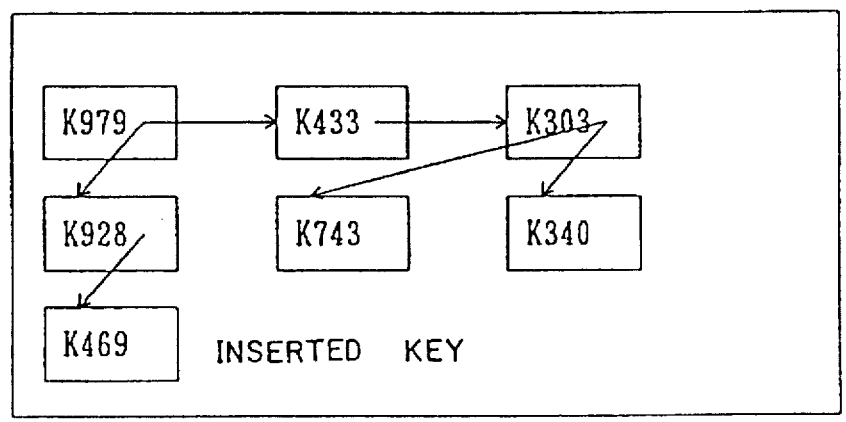

An inserted record is attached to a key management pointer as shown in FIG. 16H.

As described above, a database processing-procedure 16, which is an executable module for accessing to a database, can be generated by the optimizing unit 11 as shown in FIG. 2A by combining access parts 14 to each of the basic data organizations and library parts 15 relating to the combination based on a given assembly pattern.

As described above, the present embodiment generates various storage structures in the database management system by combining a few of their basic data organizations, and generates database processing procedures using the optimum storage structure according to the access characteristics to a database.

Figure 17:
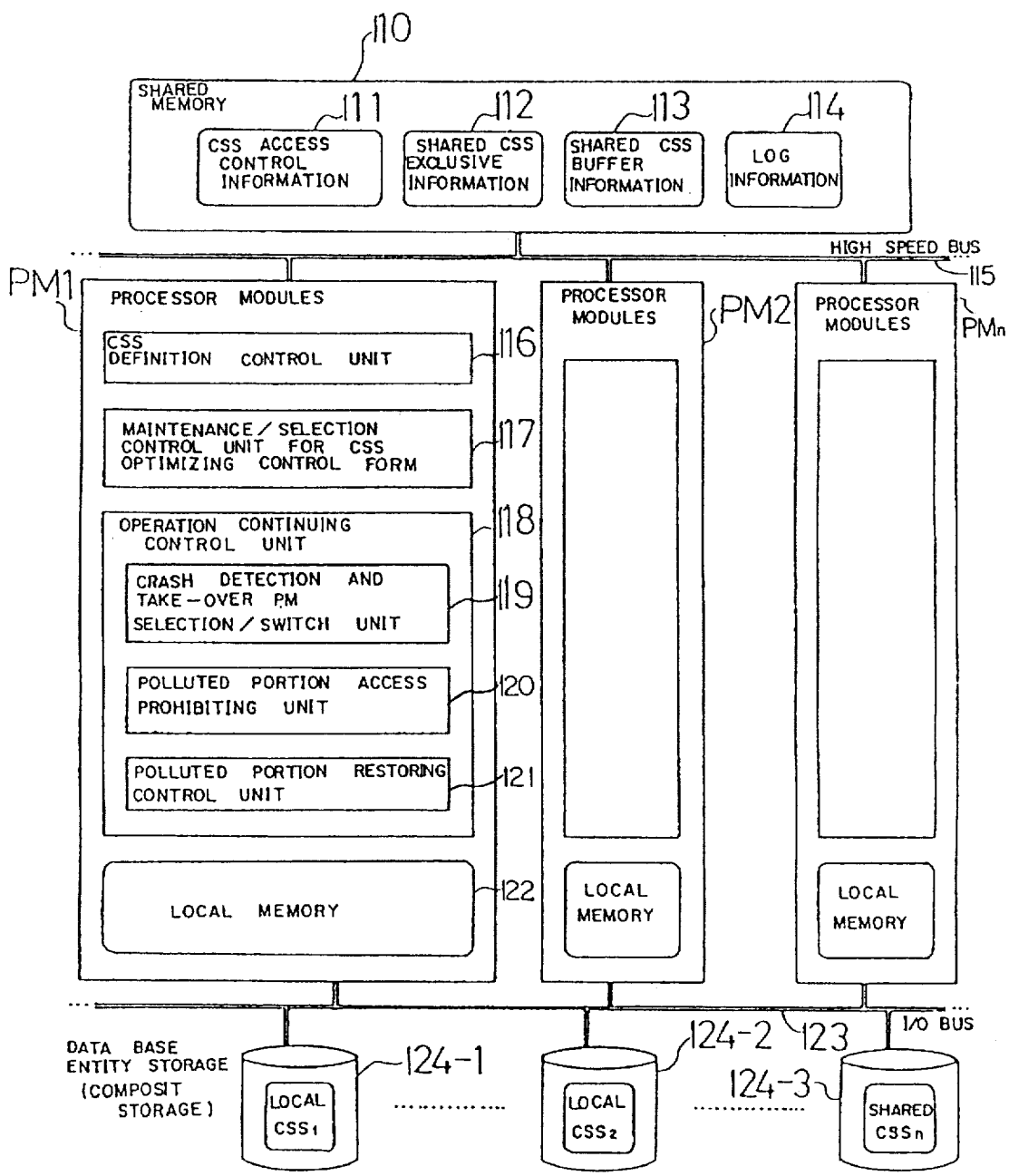
FIG. 17 is an example of a configuration of another embodiment of the present invention.

FIG. 17 shows an example of the configuration of another embodiment of the present invention.

A database processing system to which the present invention is comprises a plurality of processor modules PM1, PM2, . . . each having a local memory 122 with a shared memory 110 connected to it.

A CSS definition control unit 116 defines an administrative processor module for controlling an access to a composite structure of a database which has a storage structure independent of a logical structure.

A maintenance/selection control unit 117 in the optimum control process provides the function of access-controlling a shared process performed symmetrically and a local process performed asymmetrically when an access request arises for a composite data-base structure, and dynamically switches the access control process for each composite structure according to the access frequency notified by each processor module.

An operation continuing control unit 118 provides the controlling function for a recovery process for a composite structure of a database to be locally processed and shareprocessed, and performs a recovery process according to the access control process type for a composite structure of the database when a processor module falls in error. This can be accomplished by replacing the erroneous processor module with another single processor module or a plurality of processor modules.

The present embodiment realizes, in a multi-processor system operation, an efficient operation mode by assigning to each processor module or to all processor modules the access administration job where a composite structure of the database defined by a storage structure defining unit is accessed.

Figure 18:
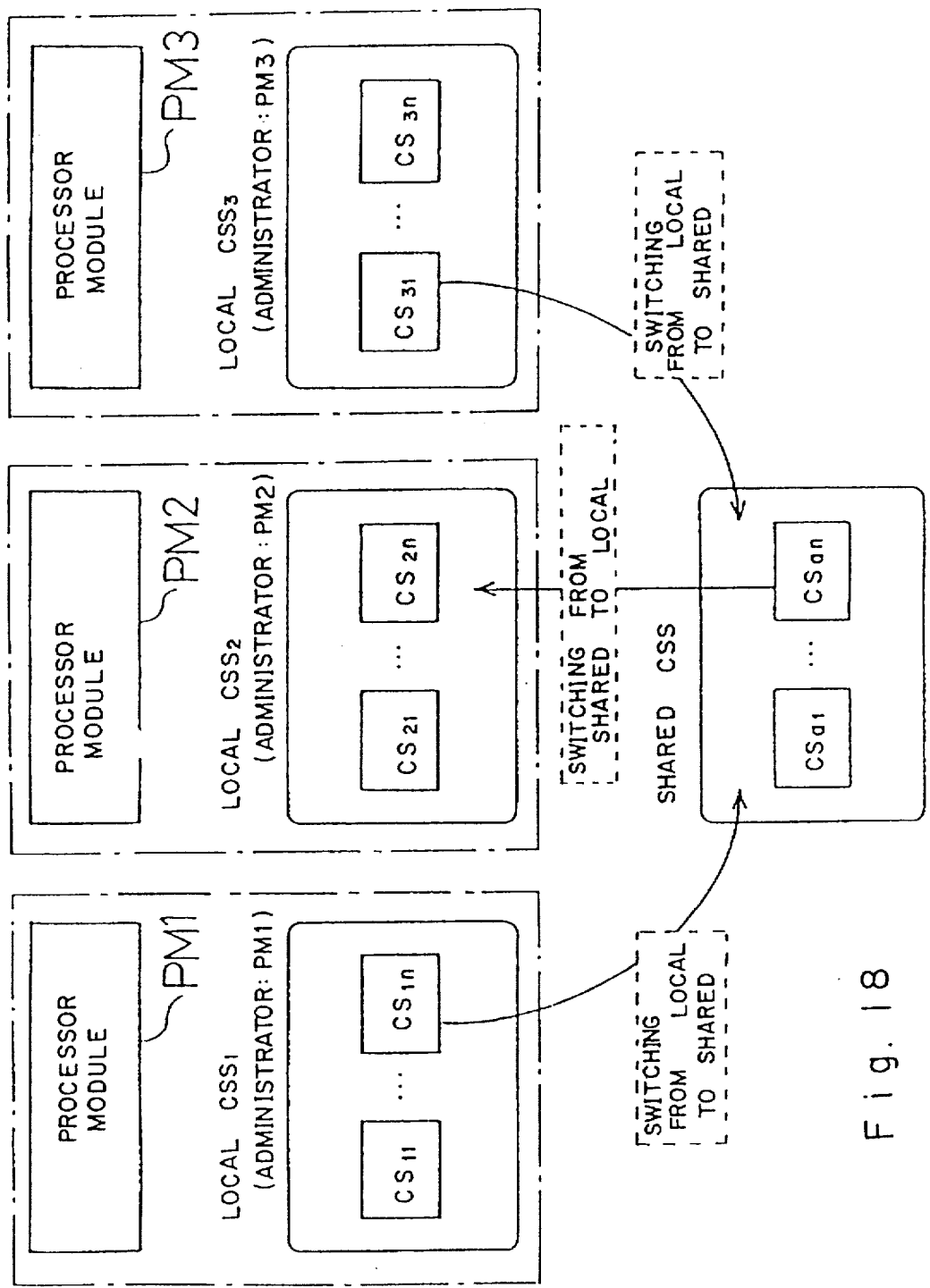
FIG. 18 is an explanatory view of the concept of the integrity guarantee control and the dynamic switching unit of the present invention.
Figure 19:
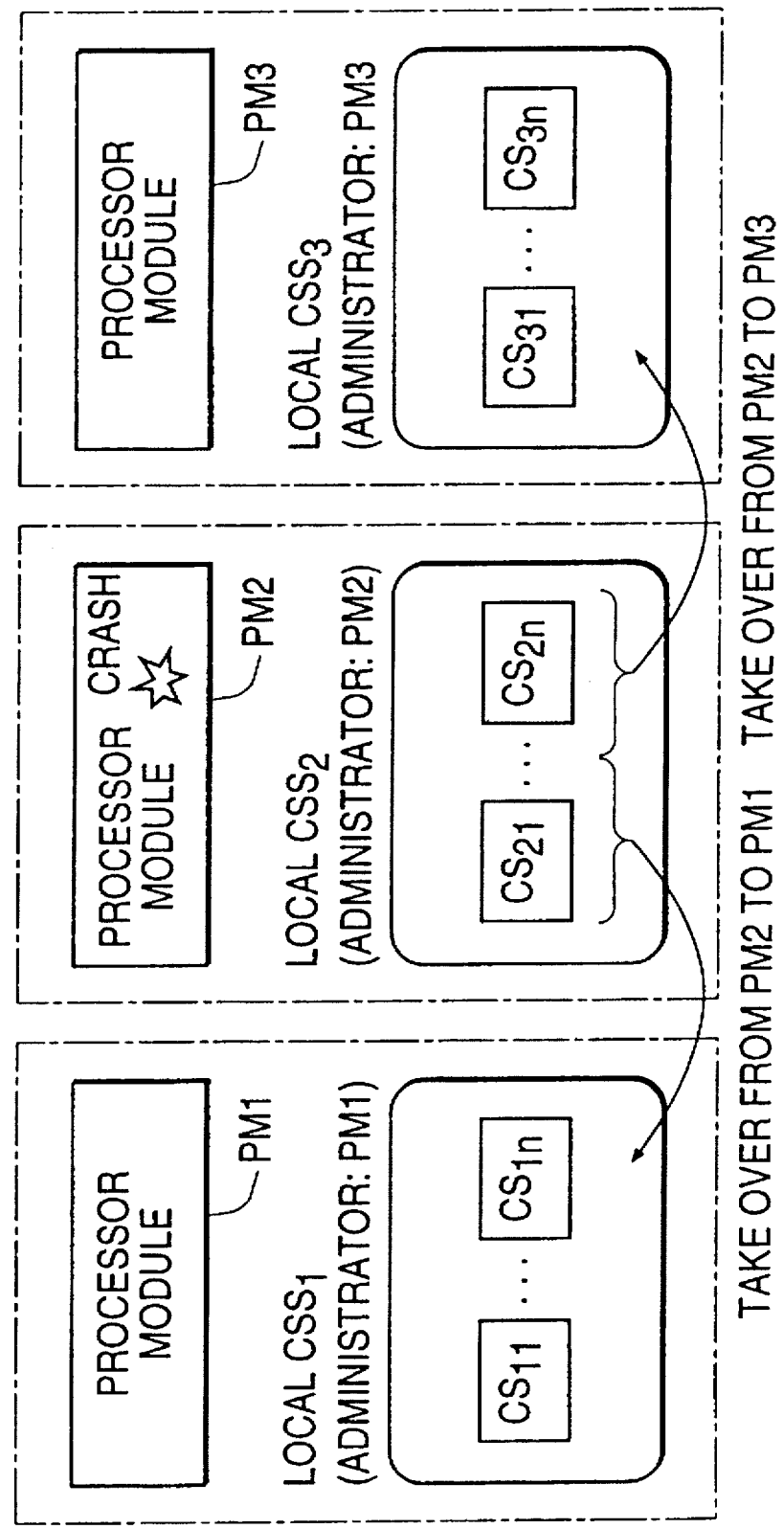
FIG. 19 is an explanatory view of a take-over unit at the time of a crash of a PM in the present invention.

FIG. 18 is an explanatory view of the framework and a dynamic switching unit of the integrity guarantee control process of the present embodiment; and FIG. 19 is an explanatory view of a replacement unit of the present invention at a clash of processor modules (PM).

In the present embodiment, optional data organization can be defined according to the logical structure of a database. A data unit stored in a database based on this definition is called "a composite structure (CS)".

CSs, composite structures of a database, are classified into several groups from the viewpoint of the multi-processor system operation. A group of CSs to be accessed by each processor module forming a multi-processor system is defined as CSS (Composite Structure Set). The present embodiment is expected to improve the process performance and reliability simultaneously by establishing the integrity guarantee control mechanism with the CSS. As shown in FIG. 18, the CSS refers to the main part of the integrity guarantee control process by each processor module. In the example of FIG. 18, a processor module PM1 refers to an administrator of a local $CSS_1$ comprising a group of $CS_{11}$ . . . $CS_{1n}$. Likewise, a processor module PM2 refers to an administrator of a local $CSS_2$ comprising a group of $CS_{21}$, ... $CS_{2n}$.

CS refers to a dynamic switching unit of the integrity guarantee control process for accessing data by an application program on the processor module. Dynamic switching refers to switching the integrity guarantee control from a local process to a shared process, or from a shared process to a local process. An integrity guarantee control process for all CSs in a CSS can be switched completely. This CS control process is maintained in the optimum state, that is, in the state of either a local process or a shared process, thereby improving the accessing efficiency and reducing process cost through the reduction of communication overhead, etc.

As shown in FIG. 19, in the operation continuing process, at a crash of a processor module PM2, a replacing unit for replacing the processor module PM2 with substitute administrator processor modules PM1 and PM3 for a local $CSS_2$ refers to one or a plurality of composite structure CSs.

One substitute processor module can collectively take over the administration job for a plurality of CSs in a local $CSS_2$ under the crashed processor module PM2, or a plurality of substitute processor modules can take them over in a divisional manner.

A high speed continuing operation can be realized without stopping an access from an application program in other normal processor modules by performing a recovery process from an abnormal condition based on the integrity guarantee control process (local process or shared process) for each CSS at the point of a clash. This improves the reliability of the whole system.

Associated technologies to the present embodiment are described in by Japanese Application No. HEI-1-68815 (Title: A database processing system by a multi-processor) and in Japanese Patent Application No. HEI 1-147064 (Title: A local recovery system from an abnormal condition in database processing). The present embodiment is a further improved version of these techniques. As shown in FIGS. 18 and 19, the present embodiment can be considered novel because it gives a specific configuration for defining a highly independent storage structure for a logical structure of a database, and adopts a control process comprising local and shared control processes for a composite structure and a CSS, a group of composite structures based on the definition described above.

EXAMPLE

Figure 21:
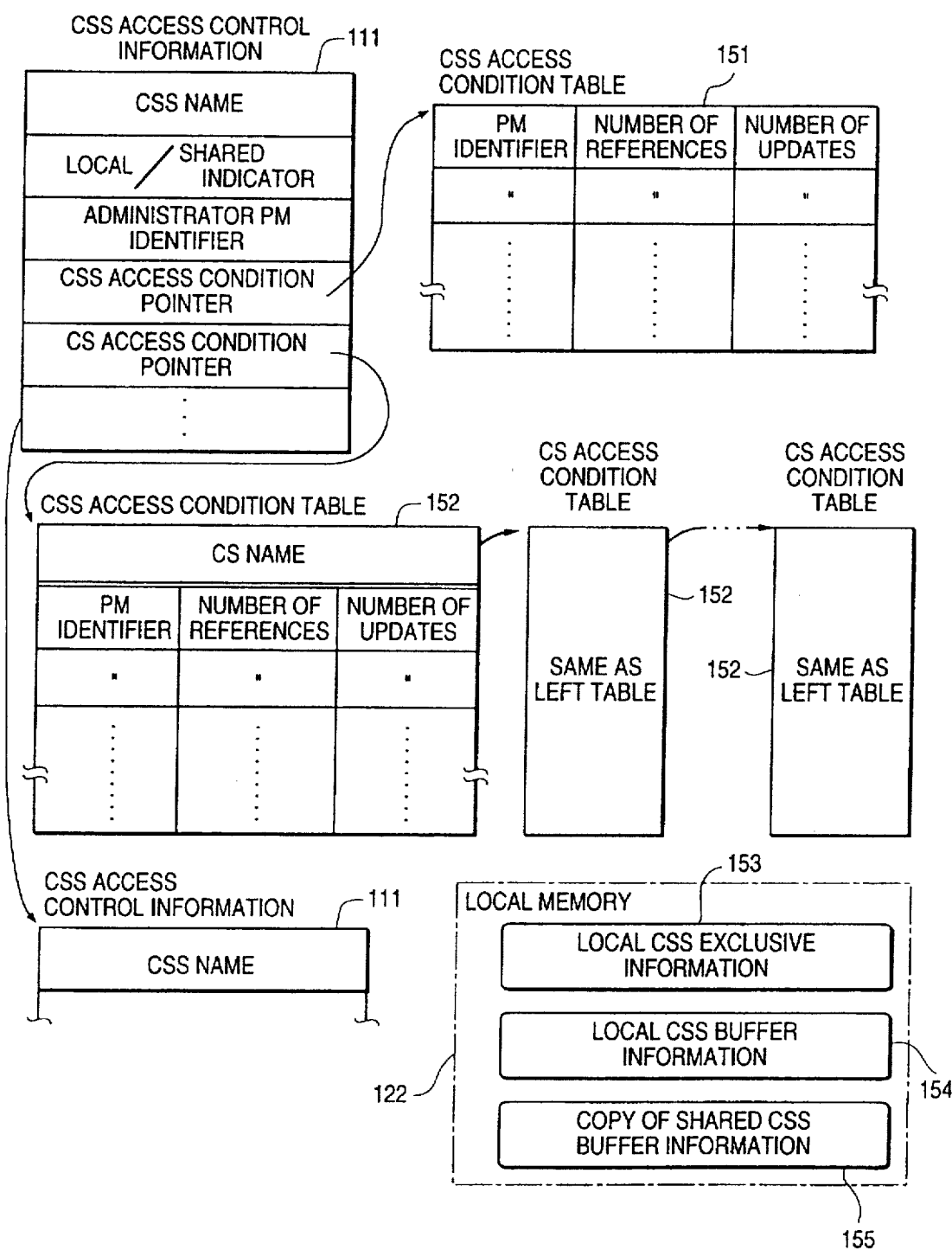
FIG. 21 is an explanatory view of control data used in an embodiment of the present invention.

FIGS. 20A and 20B are an explanatory view of a composite structure associated with a first embodiment of the present invention; FIG. 21 is an explanatory view of controlling data used in the first embodiment of the present invention; FIG. 22 is a process example of a CSS definition control unit shown in FIG. 17; FIG. 23A to 23E are a process example of a maintenance/selection control unit in the optimum CSS control process shown in FIG. 17; and FIGS. 24A to 24D are a process example of a continuing operation control unit shown in FIG. 17.

The composite structure (CS) 142 shown in FIG. 20A is a data unit to be stored in a database, and has an independent structure in physical media according to each data organization (represented by Btree and Hash) which controls an arrangement and access to records. The relation between a logical structure definition 140 and a composite structure 142 can be explicitly defined by a generic composite structure (GCS) 141. That is, a storage structure which is conventionally decided automatically by a logical structure is defined explicitly, and at the same time, a storage structure not limited by the logical structure definition 140 can be defined.

The logical structure definition 140 and the generic composite structure 141 do not always correspond one-to-one, but may correspond n-to-k ($n, k \geq 0$). One generic composite structure 141 can contain a plurality of (m) composite structures 142. Here, n or k is usually an integer larger than 1, but either n or k can be 0 considering either the logical structure definition 140 or the generic composite structure 141 is to be still indefinable.

For example, the mapping of a table defined by the logical structure definition 140 and a composite structure (CS) 142 through the generic composite structure 141 comprises a plurality of basic patterns as shown in FIG. 20B.

FIG. 20B (a) shows Simple mapping.

Simple mapping comprises mapping a whole table to a single composite structure CS.

FIG. 20B (b) shows Compound mapping.

Compound mapping comprises mapping a plurality of tables into a single composite structure CS. In this method, the record structure of each table remains unchanged, and data may be stored closely by a key value or stored by combining a plurality of records as one record. The close-storage by a key value refers to locating records having an equal key value closely in physical media.

FIG. 20B (c) shows Column selection mapping.

Column selection mapping comprises mapping a part of a table to different composite structures CS1 and CS2 according to the column selection. A record in the logical structure expression is, when stored, divided into a plurality of records. Therefore, to show the relation between these records, information such as a prime key value for uniquely identifying a record in the logical structure or a record identification number assigned when a record is stored is used.

FIG. 20B (d) shows Duplicate mapping.

Duplicate mapping comprises mapping a duplicate column of a plurality of composite structures CS1 and CS2. Indexes in conventional storage structures are realized by this method.

The present invention realizes higher performance and reliability with little influence on the logical structure by converting such composite structures and those groups into dynamically variable structures in the integrity guarantee control process.

Various controlling data are used as shown in FIG. 21 to dynamically switch the control process of CSs and CSSs, according to the actual access for each processor module, from a local control process to a shared control process or from a shared control process to a local control process.

The following information is used for each CSS as CSS access control information 111;

(a) A CSS name: A name for identifying each CSS.

(b) A local/shared indicator: An indicator of flags, etc. for indicating whether a CSS is in the local control process or in the shared control process.

(c) An identifier of an administrator PM: An identifier for indicating if a CSS is in the shared control process.

(d) A CSS access condition pointer: A pointer for pointing to an CSS access condition table 151.

(e) A CS access condition pointer: A pointer for pointing to the leading CS access condition table 152.

The CSS access condition table 151 for controlling the access condition of each CSS has the following information which indicates how many times each processor module has accessed a specific CSS.

(a) A PM identifier: An identifier of a processor module which accesses a specific CSS directly or indirectly through an access request.

(b) Number of references/updates: The number of references or updates per processor module. A CS access condition table 152 stores a CS name for identifying a CS, a PM identifier, and the number of references/updates per processor module for a specific CS for controlling the access condition for each CS, a component of a CSS.

These controlling data are stored in a shared memory 110 as a rule, and taken in a local memory 122 if necessary in consideration of the accessing efficiency.

As shown in FIG. 17, local CSS exclusive information 112, shared SCC buffer information 113, log information 114, etc. are located in the shared memory 110. As shown in FIG. 21, local CSS exclusive information 153, local CSS buffer information 154, a copy of shared CSS buffer information 155, etc. are located in the local memory 122 of each processor module.

The configuration example of FIG. 17 is explained in more detail as follows:

The shared memory 110 is connected to processor modules PM1, PM2, ... through a high speed bus 115; and database entity storage units 124-1, 124-2, ... are connected to processor modules PM1, PM2, ... through an I/O bus 123.

(1) A CSS definition control unit

A CSS definition control unit 116 defines a CSS, a framework of a controlling mechanism of integrity guarantee control. A composite structure CS of a database which is accessed by an application program operated in each processor module according to the user's operation process is properly grouped. That is, a plurality of CSs accessed by an application program in a specific processor module are defined as a local CSS administered by the processor module. However, a plurality of CSs accessed equally by application programs in each processor module are defined as a shared CSS. The definition information is reflected on CSS access control information unit 111 in the shared memory 110. The CSS access control information unit 111 can be stored in the local memory 122 of each processor module in consideration of the accessing efficiency.

The outline of the process of the CSS definition control unit 116 is indicated in FIG. 22.

1 The CSS definition information is registered in a system dictionary.

2 The first activated processor module in the multiprocessor system is executed in step 3 and the following processes, and the other processor modules are executed in step 5.

3 The CSS definition information is read from the system dictionary and reflected on the CSS access control information unit 111 in the shared memory 110.

4 The CSS access control information 111 is taken in the local memory 122 if necessary in consideration of the accessing efficiency.

5 As in step 4, the CSS access control information unit 111 is taken in the local memory 122 if necessary in consideration of the accessing efficiency.

(2) A maintenance/selection control unit in the optimum CSS control process

A dynamic switch of control processes based on the basic unit of CS and an access process are performed, in a maintenance/selection control unit in the optimum CSS control process 117.

According to the actual access condition for each processor module, the control process of CSs or CSSs defined in the CSS definition control unit 116 are dynamically switched from a local control process to a shared control process or from a shared control process to a local control process.

Figure 23A:
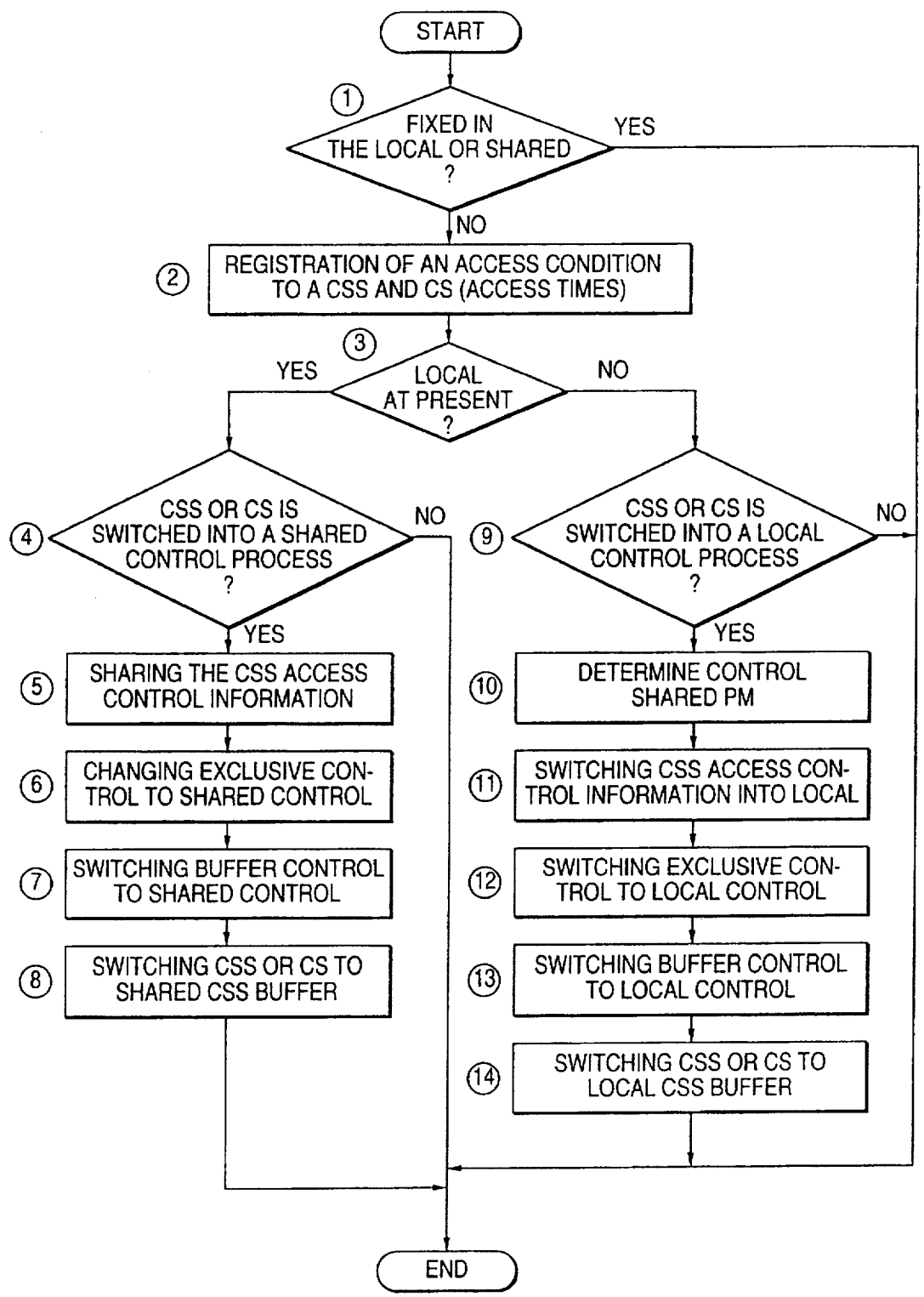
FIGS. 23A, 23B, 23C, 23D, and 23E are a processing example of the maintenance/selection control unit in the optimum CSS control process shown in FIG. 17.

That is, the maintenance/selection control unit 117 in the optimum CSS control process performs steps 1–14 as shown in FIG. 23A.

1 It is determined whether or not a CSS or CS to be accessed is fixed in the local control process or in the shared control process. If it is fixed, a dynamic switch of the control process is not performed. Thus, the process is terminated.

2 If it is not fixed, an access condition to a CSS and CS is registered in the CSS access condition table 151 and in the CS access condition table 152 shown in FIG. 21.

3 A determination is made to see whether or not data are treated in a local control process. If they are to be treated in the local control process, the operation proceeds to step 4; and if they are to be treated in the shared control process, the operation proceeds to step 9.

4 Check whether or not a CSS or a CS is to be switched into a shared control process. If an access is performed evenly by each processor module, the operation is switched into the shared control process. Otherwise, the operation is terminated. An action should be taken (for example, leveling switch concept, a time table, etc.) as a determination standard so that excessive switching between a local and shared control processes may be suppressed.

5 The CSS access control information 111 and the data involved are shared.

6 Exclusive control is switched to shared control.

7 Buffer control is switched to shared control.

8 A CSS or CS is switched to a shared CSS buffer, thereby terminating the switching to a shared control process.

9 A determination is made according to the access condition whether or not a CSS or CS is switched to a local control process. If accesses are concentrated on a specific processor module, the operation must be switched to a local control process. Otherwise, the operation is terminated. At this time, an action should be taken (for example, a leveling switch concept, a timetable, etc.) as a determination standard so that excessive switching between local and shared control processes may be suppressed.

10 A processor module specifically subject to a number of accesses is referred to as an administrative processor module.

11 The CSS access controlling information 11 and the data involved are switched into a local control process.

12 Exclusive control is switched to local control process.

13 Buffer control is switched to local control. 14 A CSS or CS is switched to a local CSS buffer, thereby terminating the switching to local control.

(3) Continuing operation control unit

A continuing operation control unit 118 comprises a crash detection and take-over PM selection/switch unit 119, a polluted or unrecovered portion access prohibitive unit 120, a polluted or unrecovered portion restoring control unit 121, and the like.

(i) Crash detection or take-over PM selection/switch unit

A crash detection part detects a crashing processor module in the reciprocal monitoring method, and the like. A crashing processor module notifies all the other normal processor modules of the crashing event.

Each processor module, on recognizing the crash, blocks the crashing processor module (a temporary action until a polluted resource access prohibitive process is completed). Starting from this point, all communication with the crashing processor module is avoided.

Then, a take-over PM selection/switch part selects a processor module which takes over the administrative job for a local CSS, substituting for the clashing processor module. The administrative job for all CSs in the local CSS under control of the crashing processor module can be taken over either collectively by a single processor module or individually by a plurality of processor modules for each CS according to the load condition or the takeover priority of processor modules.

(ii) Polluted portion access prohibitive unit

Based on the CSS access control information 111 at the crash, a portion polluted by a crash is specified for each local CSS or shared CSS where an access is prohibited. A polluted portion refers to resources in process of updating by a transaction in a clashing processor module, or to resources where an update result of a complete transaction existing only in the local memory 122 of the crashing processor module is lost due to the crash.

(a) An access prohibitive process on a local CSS

An access prohibitive process is performed by extracting from the log information a polluted portion in the local CSS under control of a clashing processor module. An access must be prohibited on each CS taken over by each processor module when the CSs in the local CSS are taken over divisionally by a plurality of processor modules.

On the other hand, a polluted portion in the local CSS under control of a processor module other than a crashing processor module is extracted from the log information, and an access is prohibited to the portion where the clashing processor module is just updating. Furthermore, the lock of a crashing processor module on the local CSS not under control of the crashing processor module is unlocked.

(b) An access prohibitive process on a shared CSS

An access prohibitive process on a shared CSS is executed so that a polluted portion can be extracted.

After the corresponding log information of the corresponding shared CSS is detected in the shared memory 110, the actually updated portion is specified. Additionally, the resources locked by the crashing processor module can be specified by the shared CSS exclusive information 112 in the shared memory 110.

The latest information of the resources not locked by a crashing processor module exists in the shared CSS buffer information 113 or in a copy of the shared CSS buffer information in a normal processor module. This is ensured by the transmission of the latest information between the shared memory 110 and the local memory 122 through the shared process of the maintenance/selection control unit 117 in the optimum CSS control process. A location of the latest information is stored in the shared memory 110.

A copy (in a local memory) of the latest shared CSS buffer information is reflected on the shared CSS buffer information 11 3 in the shared memory 110. However, this is not always interlocked with the exclusive control. Therefore, the latest information exists only in a copy of the shared CSS buffer information of a clashing processor module, and may be lost due to a clash.

As described above, the actually polluted portion can be extracted in the resources where a shared CSS is updated and a crashing processor module placed a lock, and in the latest information that exists only in a copy of the shared CSS buffer information of a crashing processor module and may have been lost. Therefore, only the portion extracted as described above is put into the access prohibitive state.

Furthermore, the lock of a crashing processor module on the resources in the corresponding shared CSS is unlocked.

(iii) Authorization of a take-over PM

After the completion of the access prohibitive process to a polluted portion, a take-over processor module authorizes that it has taken over a local CSS to all normal processor modules. After this authorization is notified to each processor module, a message indicated as a locking error due to a crash (a re-entry message to a message assigned to a crashing processor module and to an incomplete message due to a clash) is transmitted to a take-over processor module.

(iv) A polluted portion restoring control unit

The polluted portion restoring control unit 121 shown in FIG. 17 restores the resources which were actually kept in the access prohibitive state by a polluted portion access prohibitive unit 120 using the log information in the shared memory 110. Then, on completion of the restoring process, the access prohibitive state is released.

Figure 23B:
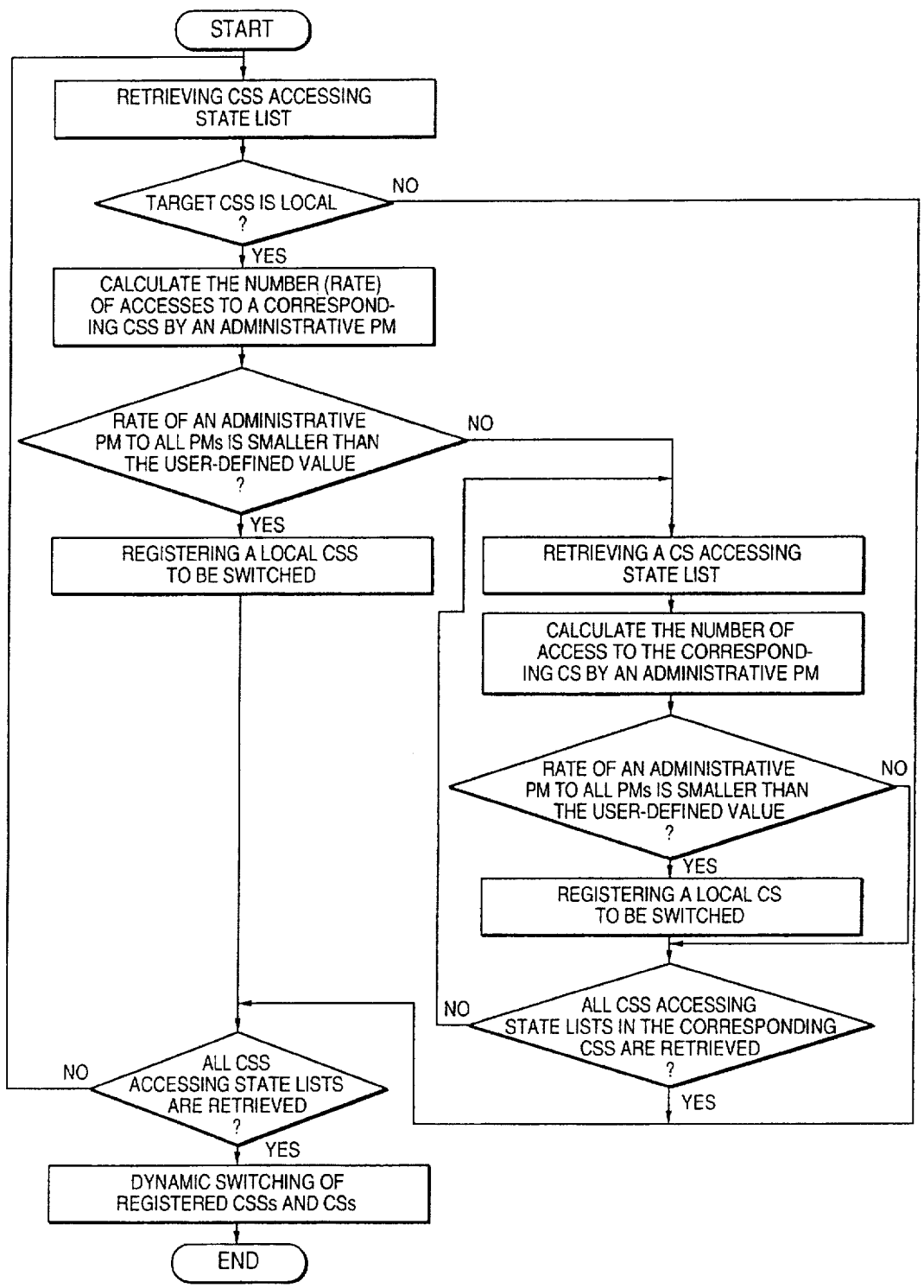

FIG. 23B shows a flowchart of an embodiment explaining a dynamic switching from a local CSS (CS) to a shared CSS (CS). This embodiment refers to the lower limit of the bias rate by a specific processor module to a local CSS or a CS.

When a composite structure set being processed is in a local process, a ratio of the number of accesses to said composite structure set from respective processor module is calculated; when a ratio of the number of accesses from respective processor module is smaller than the defined value the composite structure set from respective processor module is switched to a management of a shared control; when a ratio of the number of accesses is larger than the defined value, a ratio of the number of accesses to respective composite structure from respective processor module is calculated; and when a ratio of the number of accesses is smaller than the defined value, the composite structure is switched to a management of a shared control.

Figure 23C:
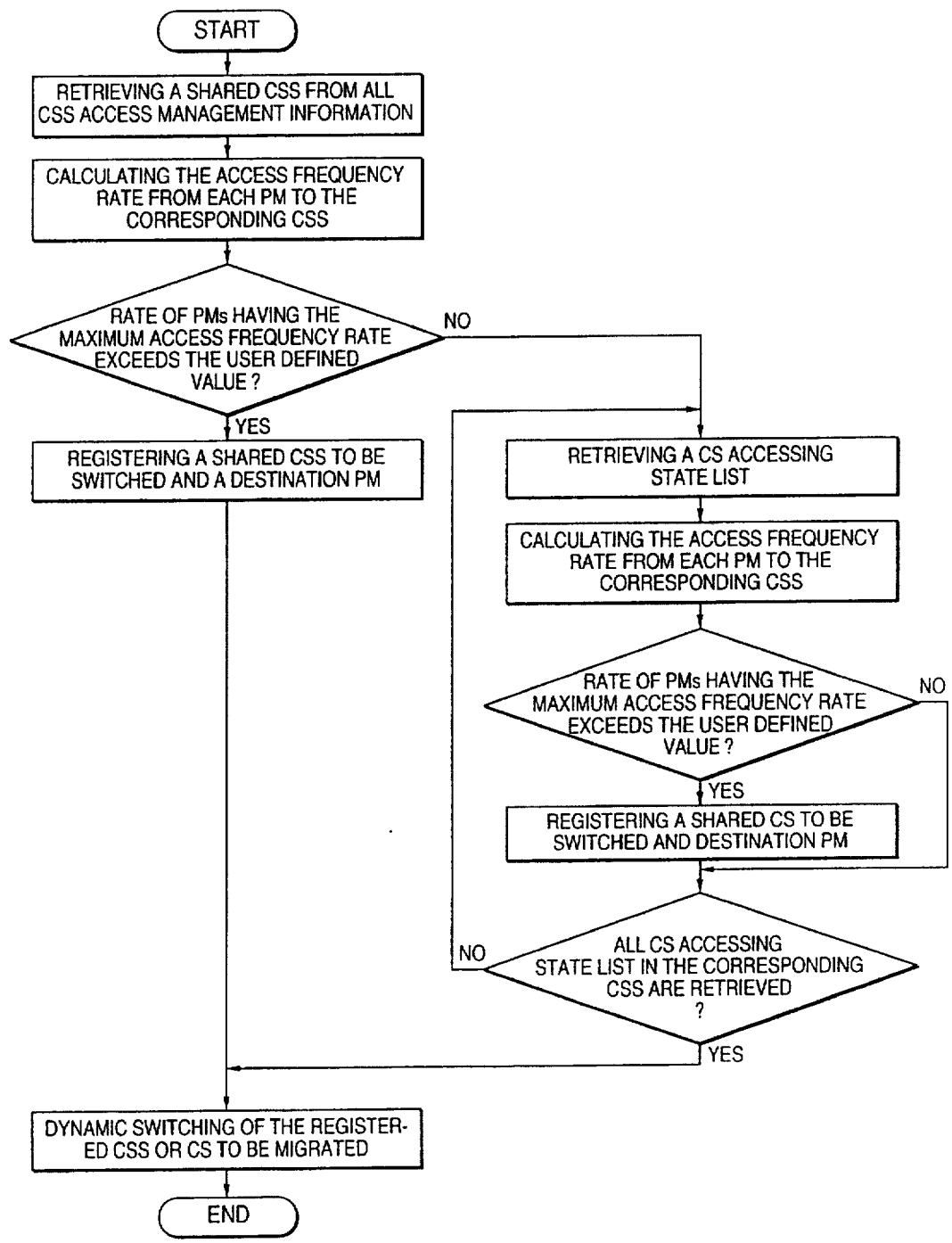

FIG. 23C shows an embodiment of the selection logic of the destination PM of the dynamic transference. FIG. 23C refers to the upper limit of the bias rate by a specific processor module to a local CSS or a local CS.

When a composite structure set being processed is in a shared process, a ratio of the number of accesses to said composite structure set is calculated; when a ratio of the number of accesses is larger than the defined value the composite structure set is switched to a management of a local control; when a ratio of the number of accesses is smaller than the defined value, a ratio of the number of accesses to respective composite structure is calculated; and when a ratio of the number of accesses is larger than the defined value, the composite structure is switched to a management of a local control.

Additionally, the load on a destination processor module can be controlled by storing the CPU load and I/O load of each processor module in a shared memory. The following selection can be permitted if the CPU load and I/O load is saturated by the dynamic migration of a shared CSS or a shared CS.

1 A shared CSS or a shared CS are not switched dynamically.

2 The dynamic switching range is reduced (from a CSS unit to a CS unit).

3 A processor module having the second highest frequency is selected.

Figure 23D:
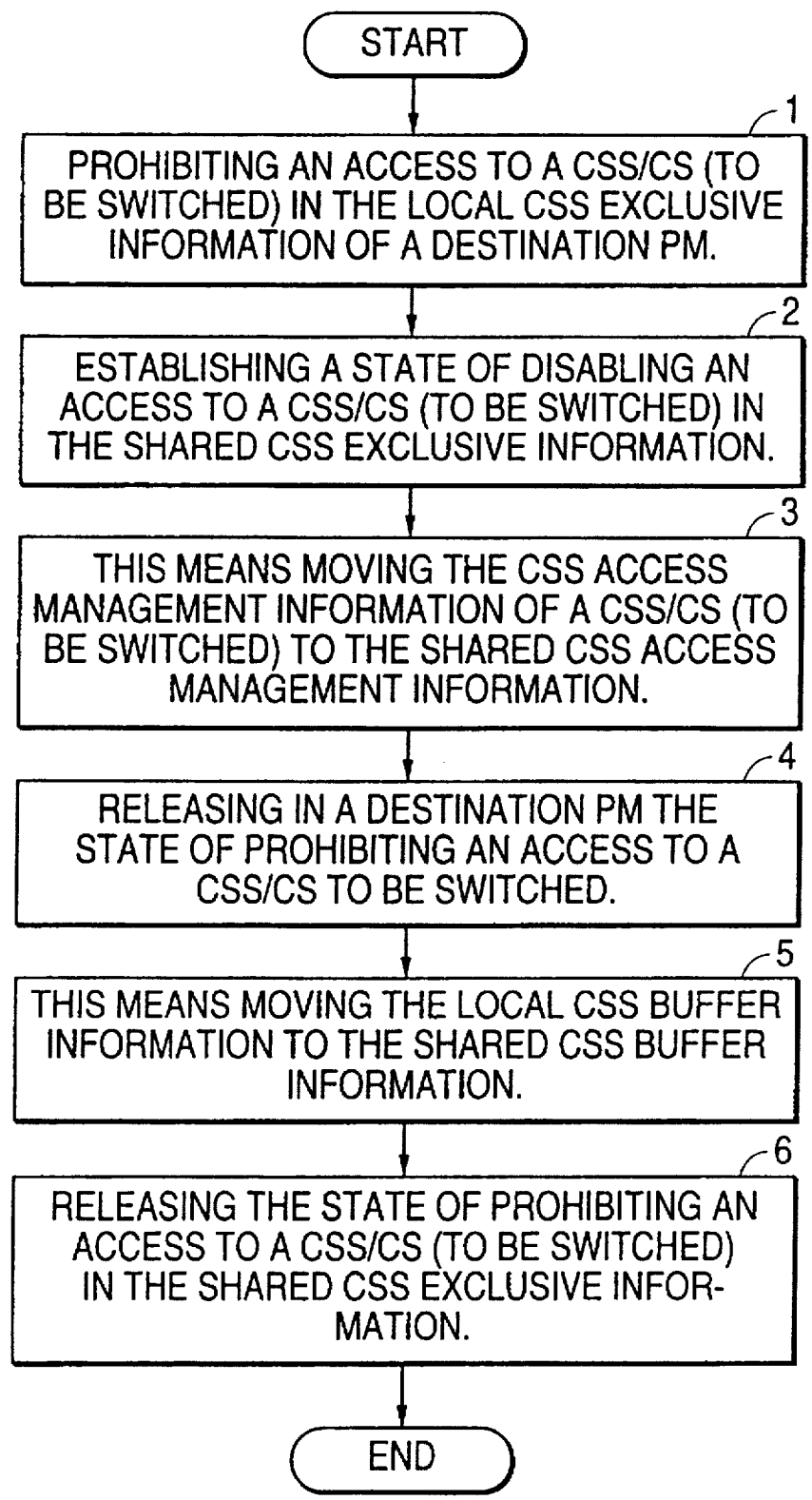
Figure 23E:
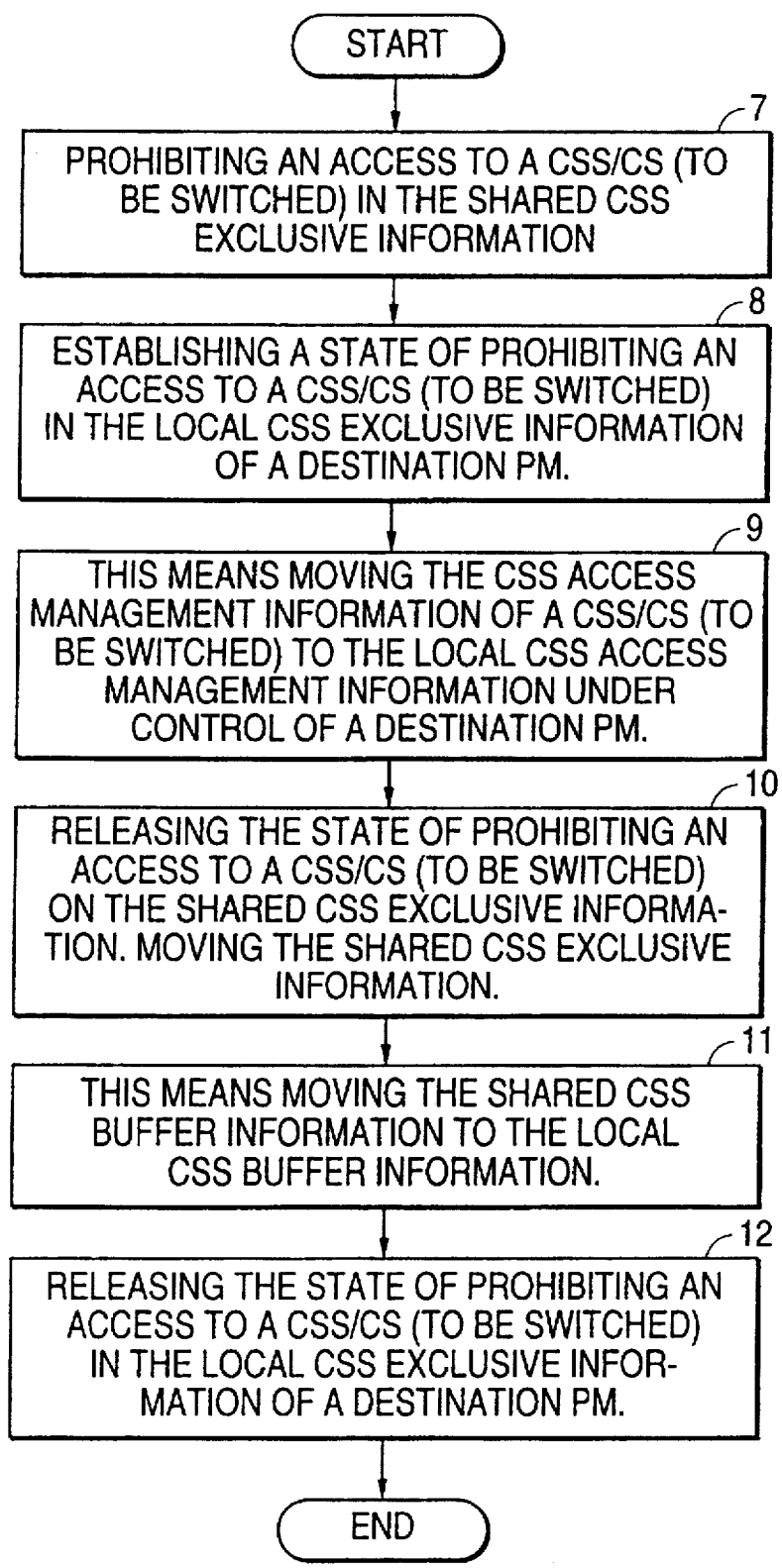

FIGS. 23D and 23E show a dynamic switching method for controlling CSS/CS in detail.

Step 1 Prohibiting an access to a CSS/CS (to be switched) in the local CSS exclusive information of a destination PM.

Step 2 Establishing a state of prohibiting an access to a CSS/CS (to be switched) in the shared CSS exclusive information.

Step 3 Moving the CSS access management information of a CSS/CS (to be switched) to the shared CSS access management information.

Step 4 Releasing in a destination PM the state of disabling an access to a CSS/CS to be switched.

This means moving the local CSS exclusive information.

Step 5 Moving the local CSS buffer information to the shared CSS buffer information.

Step 6 Releasing the state of prohibiting an access to a CSS/CS (to be switched) in the shared CSS exclusive information.

Step 7 Prohibition an access to a CSS/CS (to be switched) in the shared CSS exclusive information.

Step 8 Establishing the state of disabling an access to a CSS/CS (to be switched) in the local CSS exclusive information of a destination PM.

Step 9 Moving the CSS access management information of a CSS/CS (to be switched) to the local CSS access management information under control of a destination PM.

step 10 Releasing the state of prohibiting an access to a CSS/CS (to be switched) in the shared CSS exclusive information.

This means moving the shared CSS exclusive information.

Step 11 Moving the shared CSS buffer information to the local CSS buffer information.

Step 12 Releasing the state of prohibiting an access to a CSS/CS (to be switched) in the local CSS exclusive information of a destination PM.

In the access prohibition stated in steps 1 and 7 a transaction that has locked a CSS/CS to be switched must be completed with a synchronous release. An access request from a new transaction that has not locked a CSS/CS to be switched must be set in the state of waiting for release from access. Thus, the state of locking a CSS/CS by a transaction can be avoided during the switching process.

Figure 24A:
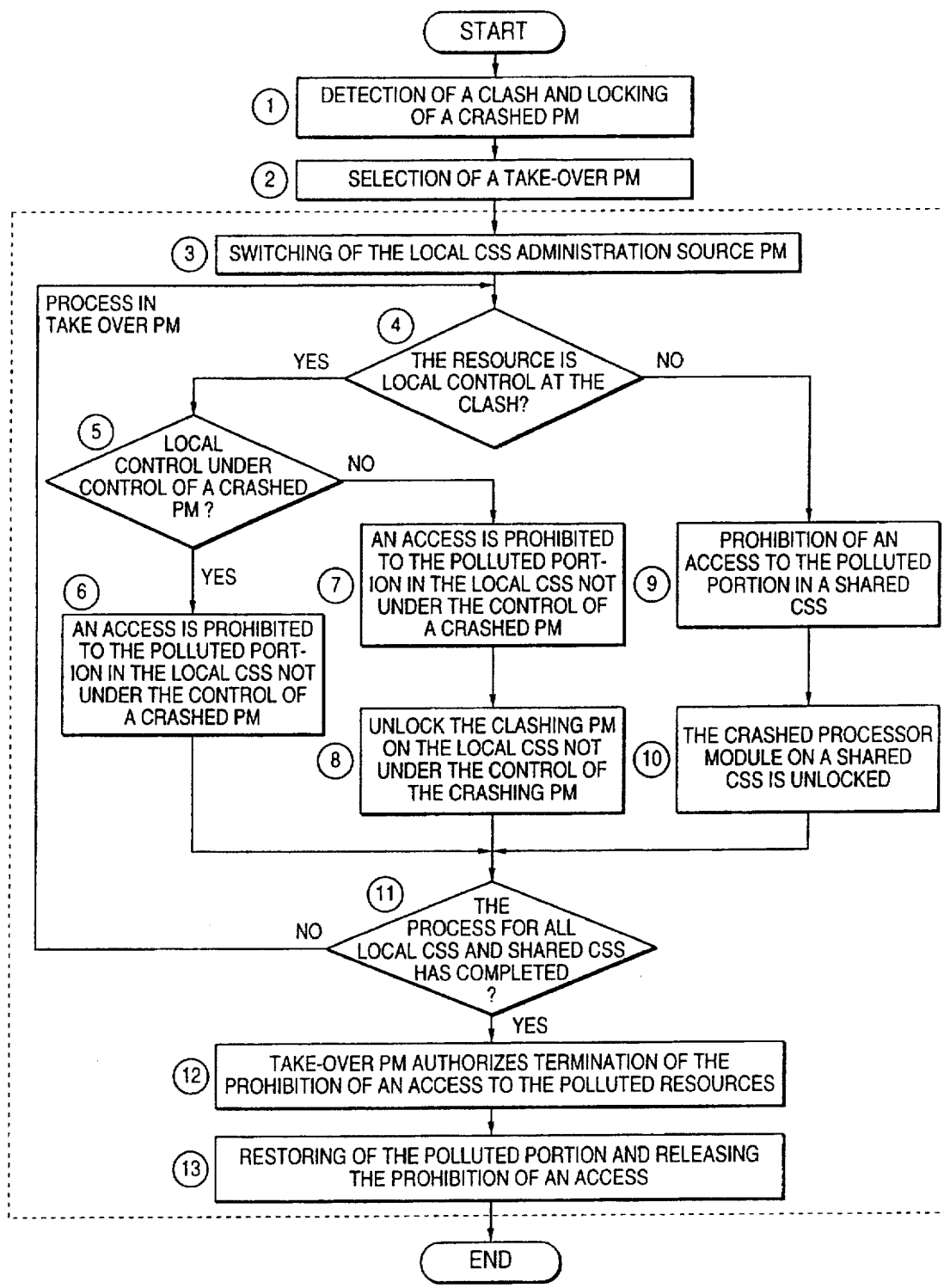

FIG. 24A is a flowchart of the process outline of the above described continuing operation control unit 118.

1 When a crash is detected, a crashing processor module is blocked.

2 A take-over processor module substituting for the clashing processor module is selected to take over the administration of a local CSS. Then, step 3 and the following steps are performed by the take-over processor module. Plurality of processor modules can take over the administrative job, too.

3 The administration of the local CSS by the crashing processor module is switched to the take-over processor module.

4 A determination is made as to whether the resources involved at the point of the clash are locally controlled or shared controlled. If they are locally controlled, proceed to step 5; and if they are shared controlled, proceed to step 9.

5 A determination is made as to whether or not the resources are those of a local CSS under the control of the crashing processor module. If not, proceed to step 7.

6 An access is prohibited to the polluted portion in the local CSS under the control of the crashing processor module. Then, proceed to step 11.

7 An access is prohibited to the polluted portion in the local CSS not under the control of the crashing processor module.

8 The lock of the crashing processor module on the local CSS not under the control of the clashing processor module is released. Then, proceed to step 11.

9 An access is prohibited to the polluted portion in a shared CSS which is in the shared control process at the time of the clash.

10 The lock of the clashing processor module on a shared CSS is released.

11 A determination is made as to whether or not the process for all local CSSs and shared CSSs has completed. If not, return to step 4 and repeat the same procedure.

12 If the process has completed, a take-over processor module authorizes the termination of the prohibition of an access to the polluted resources.

13 Restore the polluted portion using the log information, and release the prohibition of an access.

In recovering from a crash, log information is read from a shared memory, and an access is prohibited to the unrecovered portion to be restored. An example of the recovery is shown in FIG. 24A.

Figure 24B:
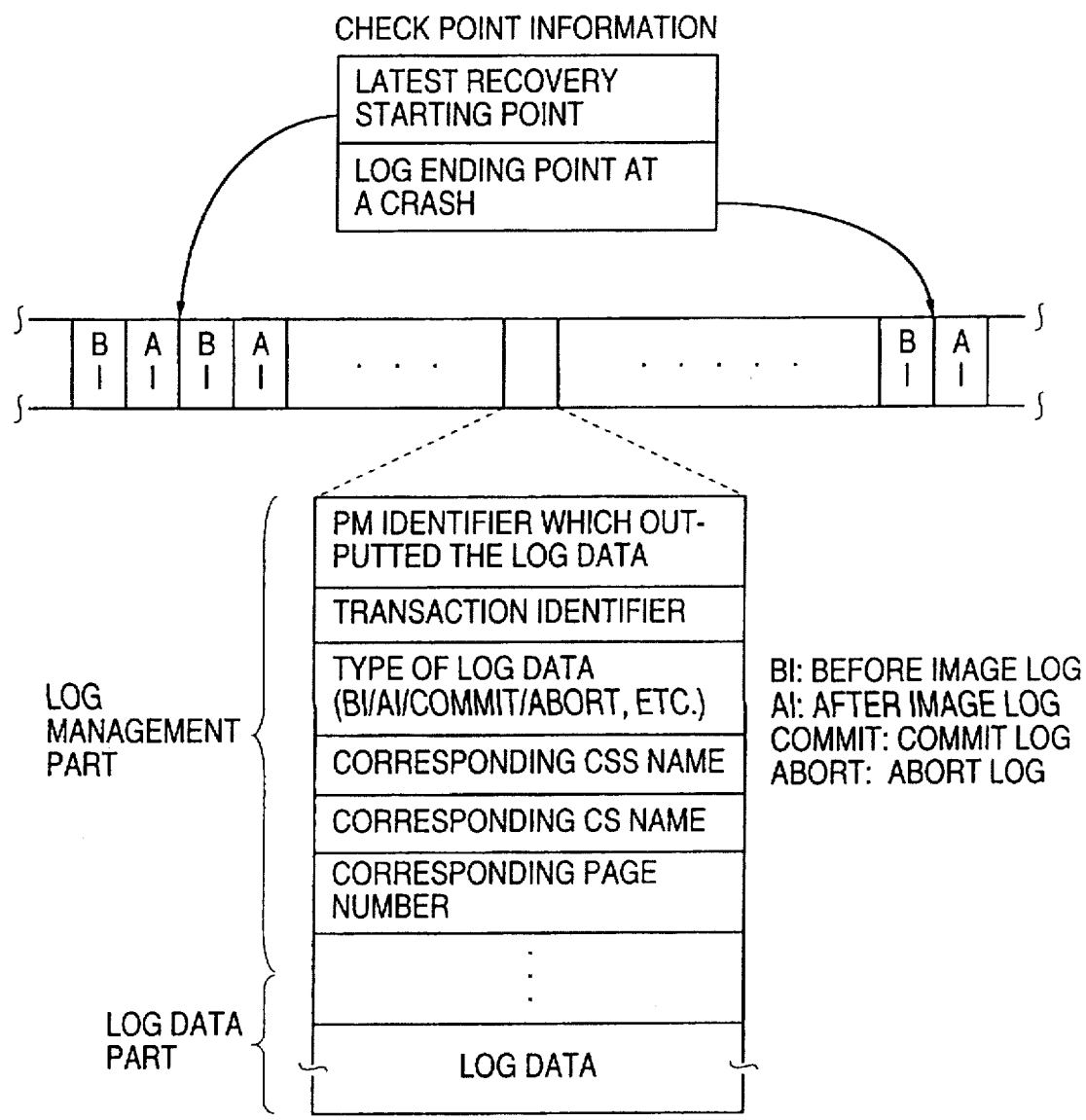

The structure of the log information to be read in the recovery process is shown in FIG. 24B. FIG. 24B explains the data in the log information.

The log data processing is explained as follows. (1) The latest recovery starting point in the check point information is updated periodically during the data base processing operation. At this time, the following log data before the latest recovery starting point is placed out of the target range of crash recovery. The log data corresponds to the following information 1 and 2.

1 The local CSS buffer information (in a local memory) is stored in the data base entity storage.

2 A copy of the shared CSS buffer information (in a local memory) is stored in the shared CSS buffer information in the shared memory.

(2) The log ending point at a crash is recorded by a processor module when the crash is detected in it.

(3) In recovering from a crash, log data which are stored in the range between the latest recovery starting point and the log ending point at a crash are used.

(4) The log data within the range described in (3) above is sequentially read to extract AI log data outputted by a committed transaction.

CSS access management information can be retrieved in a shared memory using a CSS name and a CS name in the AI log data as the keys. The identification of local/shared and an administrative processor module can be made using "a local/shared indicator" and "an administrative PM identifier" in the corresponding access management information. According to the above described information, and based on the logic shown in FIGS. 24C and 24D, an access is prohibited to the unrecovered portion of a local CSS and a shared CSS. Then, the access-prohibited portion is restored (re-execution of a transaction).

(5) The BI log data outputted by a transaction in progress (not completed) is extracted.

CSS access management information is retrieved using a CSS name and a CS name in the BI log data as the keys. The identification of local/shared and an administrative processor module can be made using "a local/shared indicator" and "an administrative PM identifier" in the corresponding access management information. According to the above described information, and based on the logic shown in FIGS. 24C and 24D, an access is prohibited to the unrecovered portion of a local CSS and a shared CSS. Then, the access-prohibited portion is restored (deletion of a transaction).

FIG. 24C shows a range of a prohibited access to a local CSS. Respective item members in FIG. 24C are explained as follows and the detailed explanation is omitted, Item 1 Resources specified by the log of the committed transaction.
Item 2 Resources specified by the log of the transaction in progress.
Item 3 A local CSS under control of the crashing PM.
Item 4 Resources corresponding to the log outputted by the crashing PM.
Item 5 An access is prohibited to the corresponding resources other than those used by a non-crashing PM.
Item 6 An access is prohibited to the corresponding resources.
Item 7 Resources corresponding to the log outputted by a non-crashing PM.
Item 8 An access is prohibited to the corresponding resources.
Item 9 An access is not prohibited because the transaction is being processed in a non-clashing PM.
Item 10 A local CSS under control of non-crashing PM.
Item 11 Resources corresponding to the log outputted by a crashing PM.
Item 12 An access prohibition request message is sent to a resource administrative PM.
Item 13 An access is prohibited only to the resources being used by a crashing PM.

After the commission of a transaction, a crash can be encountered before the latest information is notified to the administrative source PM. In this case, as the latest information after the commission is lost, an access must be prohibited. The above latest information means local CSS buffer information which is on the crashed PM and reflects the result updated of a committed transaction.

Item 14 An access prohibition request message is sent to a resource administrative PM.
Item 15 An access is prohibited to the corresponding resources.
Item 16 Resources corresponding to the log outputted by a non-crashing PM.
Item 17 An access is not prohibited.
Item 18 An access is not prohibited.

The administrative PM (non-clashing PM) that received an access prohibition request message prohibits, in cooperation with the shared buffer management function, only an access to the page being used by a clashing PM.

FIG. 24D designates a range of a prohibited access to a shared CSS. The respecting item members in FIG. 24D are explained as follows and the detailed explanation is omitted.
Item 1 Resources specified by the log of the committed transaction
Item 2 Resources specified by the log of the transaction in progress
Item 3 Shared CSS
Item 4 Resources corresponding to the log outputted by a clashing PM
Item 5 An access is prohibited only to the resources that is being locked by a clashing PM and that a copy of the shared CSS buffer information in a clashing PM (the latest data) is not reflected in the shared CSS buffer in a shared memory.
Item 6 An access is prohibited to the corresponding resources.
Item 7 Resources corresponding to the log outputted by a non-clashing PM
Item 8 An access is not prohibited.
Item 9 An access is not prohibited.

As described above, in the present embodiment, the access control is dynamically switched between local control and shared control, thus realizing efficient access control and a high-speed continuing operation even at the clash of a processor module.

What is claimed is:

1. A database processing system using a multiprocessor including a plurality of processor modules each having a local memory connected to an external shared memory, said database processing system comprising:

a composite structure definition control part for defining an administrative processor module for controlling an access to a composite structure of a database which has a storage structure independent of a logical structure; and a maintenance/selection control part in an optimum control processor for providing a function of access-controlling a shared process and a local process when an access request arises for a database composite structure, and for dynamically switching the access control process for said composite structure according to an access frequency notified by each said processor module.

2. The data base processing system for use in a multiprocessor system according to claim 1, wherein said maintenance/section control part calculates a sum of the number of accesses to said composite structure or a composite structure set from a respective said processor modules per predetermined time period, thereby switching an access management between a local process and a shared process.

3. The data base processing system for use in a multiprocessor system according to claim 1, wherein said maintenance/selection control part calculates a ratio or rate of the number of accesses from a respective said processor modules per unit time.

4. The data base processing system for use in a multiprocessor system according to claim 1, wherein said maintenance/selection control part calculates a ratio of the number of accesses to said composite structure from respective said processor modules and transfers a management of said composite structure or composite structure set to a particular said processor module exceeding a defined value.

5. The data base processing system for use in a multiprocessor system according to claim 1, wherein, when a composite structure set being processed is in a local process, a ratio of the number of accesses to said composite structure set from a respective said processor module is calculated; when a ratio of the number of accesses from a respective said processor module is smaller than the defined value the composite structure set from said respective processor module is switched to a management of a shared control; when a ratio of the number of accesses is larger than the defined value, a ratio of the number of accesses to a respective said composite structure from a respective said processor module is calculated; and when a ratio of the number of accesses is smaller than the defined value, the composite structure is switched to a management of a shared control.

6. The data base processing system for use an a multiprocessor system according to claim 1, wherein, when a composite structure set being processed is in a shared process, a ratio of the number of accesses to said composite structure set is calculated; when a ratio of the number of accesses is larger than the defined value, the composite structure set is switched to a management of a local control; when a ratio of the number of accesses is smaller than the defined value, a ratio of the number of accesses to respective composite structure is calculated; and when a ratio of the number of accesses is larger than the defined value, the composite structure is switched to a management of a local control.

7. The data base processing system for use in a multi-processor system according to claim 1, wherein said processor module for performing a transferring operation prohibits an access to a composite structure or a composite structure set from other said processor modules, a management of said composite structure or composite structure set is switched between said shared and local processes, and a prohibition of an access to said composite structure or composite structure set is released after completion of the switching operation.

8. A database processing system using a multiprocessor including a plurality of processor modules each having a local memory connected to an external shared memory, said database processing system comprising:

a composite structure definition control part for defining an administrative processor module for controlling an access to a composite structure of a database which has a storage structure independent of a logical structure; and an operation continuing control part for providing a controlling function for a recovery process for said composite structure of a database to be locally processed or shared-processed, and for performing a recovery process according to an access control process type for said composite structure of the database when a processor module falls in error, by replacing the erroneous said processor module with another single said processor module or a plurality of said processor modules.

9. The data base processing system for use in a multi-processor system according to claim 8, wherein said operation continuing control part performs said recovery process from the crash by reading log information existing in the shared memory and prohibiting or releasing an access to the unrecovered portion.

10. The data base processing system for use in a multi-processor system according to claim 8, wherein said operation continuing control part performs said recovery process from the crash by using log data provided within a range from the most recent recovery starting point in check point information until a log terminating point upon an occurrence of the crash.

* * * * *

UNITED STATES PATENT AND TRADEMARK OFFICE
CERTIFICATE OF CORRECTION

PATENT NO. : 5,553,303
DATED : September 3, 1996
INVENTOR(S) : Katsumi HAYASHI, et al.

It is certified that error appears in the above-indentified patent and that said Letters Patent is hereby corrected as shown below:

Col. 2, line 35, change "PM2" to --PM 2--.

Col. 11, line 41, change "3Starting" to --3 Starting--.

Col. 12, line 63, change "11 A and 11 B" to --11A and 11B--.

Col. 13, line 55, change "11 I" to --11I--.

Col. 26, line 55, Claim 6 , change "an" to --in--.

Signed and Sealed this

Tenth Day of December, 1996

Attest:

BRUCE LEHMAN

*Attesting Officer*          *Commissioner of Patents and Trademarks*